US011500373B2

(12) United States Patent
Woodruff, III et al.

(10) Patent No.: US 11,500,373 B2
(45) Date of Patent: Nov. 15, 2022

(54) ON-BOARD CHARGING STATION FOR A REMOTE CONTROL DEVICE

(71) Applicant: Crown Equipment Corporation, New Bremen, OH (US)

(72) Inventors: Vern I. Woodruff, III, Kenton, OH (US); Trisha M. Luthman, Covington, OH (US); James Schloemer, New Bremen, OH (US); Steven R. Pulskamp, New Bremen, OH (US); Donald T. Meiring, Osgood, OH (US); Matthew T. Shinew, Ada, MI (US); Kent D. Pilcher, Holland, MI (US); Paul Duckworth, Holland, MI (US); Audrey Hendon, Grand Rapids, MI (US)

(73) Assignee: Crown Equipment Corporation, New Bremen, OH (US)

( * ) Notice: Subject to any disclaimer, the term of this patent is extended or adjusted under 35 U.S.C. 154(b) by 124 days.

(21) Appl. No.: 16/718,411

(22) Filed: Dec. 18, 2019

(65) Prior Publication Data
US 2020/0247264 A1 Aug. 6, 2020

Related U.S. Application Data

(60) Provisional application No. 62/800,032, filed on Feb. 1, 2019.

(51) Int. Cl.
*G01D 1/00* (2006.01)
*G05D 1/00* (2006.01)
(Continued)

(52) U.S. Cl.
CPC ............ *G05D 1/0022* (2013.01); *B60L 53/65* (2019.02); *B60L 53/665* (2019.02); *B60L 53/68* (2019.02);
(Continued)

(58) Field of Classification Search
CPC .. G05D 1/0022; G05D 1/0016; G05D 1/0027; G05D 2201/0216; B60L 53/65;
(Continued)

(56) References Cited

U.S. PATENT DOCUMENTS 1,835,808 A 12/1931 Pitts
2,959,260 A 11/1960 Johnson et al.
(Continued)

FOREIGN PATENT DOCUMENTS

CN 1460082 A 12/2003
CN 1864199 A 11/2006
(Continued)

OTHER PUBLICATIONS

International Search Report and Written Opinion of the International Searching Authority dated Oct. 28, 2021; International Application No. PCT/US2021/040796; European Patent Office; Rijswijk, Netherlands.
(Continued)

*Primary Examiner* — Nha T Nguyen
(74) *Attorney, Agent, or Firm* — Stevens & Showalter LLP

(57) ABSTRACT

A system includes a remote control device that is useable by an operator interacting with a materials handling vehicle. The remote control device includes a wireless communication system including a wireless transmitter and a rechargeable power source. The system further comprises: a receiver at the vehicle for receiving transmissions from the wireless transmitter; a controller at the vehicle that is communicably coupled to the receiver, the controller being responsive to receipt of transmissions from the remote control device; and a charging station at the vehicle, the charging station for charging the rechargeable power source of the remote control device.

49 Claims, 19 Drawing Sheets

(51) Int. Cl.
    *H04W 76/20*    (2018.01)
    *H04W 4/80*     (2018.01)
    *H04W 76/11*    (2018.01)
    *H04W 76/36*    (2018.01)
    *H04W 4/40*     (2018.01)
    *B60L 53/65*    (2019.01)
    *B60L 53/68*    (2019.01)
    *B60L 58/12*    (2019.01)
    *B60L 53/66*    (2019.01)
    *H02J 7/00*     (2006.01)
    *H02J 13/00*    (2006.01)

(52) U.S. Cl.
    CPC ............ *B60L 58/12* (2019.02); *G05D 1/0016* (2013.01); *G05D 1/0027* (2013.01); *H02J 7/00034* (2020.01); *H02J 7/0048* (2020.01); *H02J 13/00022* (2020.01); *H04W 4/40* (2018.02); *H04W 4/80* (2018.02); *H04W 76/11* (2018.02); *H04W 76/20* (2018.02); *H04W 76/36* (2018.02); *B60L 2200/42* (2013.01); *B60L 2240/70* (2013.01); *G05D 2201/0216* (2013.01); *H02J 2207/50* (2020.01)

(58) Field of Classification Search
    CPC ........ B60L 53/665; B60L 53/68; B60L 58/12; B60L 2200/42; B60L 2240/70; B60L 2200/36; B60L 1/006; B60L 2250/16; B60L 1/00; B60L 53/66; H02J 7/00034; H02J 7/0048; H02J 13/00022; H02J 2207/50; H04W 4/40; H04W 4/80; H04W 76/11; H04W 76/20; H04W 76/36; H04W 76/14; Y02B 90/20; Y02P 90/60; Y02T 10/70; Y02T 10/7072; Y02T 90/12; Y02T 90/14; Y02T 90/16; Y04S 40/126; G08C 2201/20; G08C 17/02; Y02E 60/00
    See application file for complete search history.

(56) References Cited

U.S. PATENT DOCUMENTS

| | | |
|---|---|---|
| 3,016,973 A | 1/1962 | Williamson |
| 3,047,783 A | 7/1962 | Van Oort et al. |
| 3,587,784 A | 6/1971 | Tait |
| 3,825,130 A | 7/1974 | Lapham |
| 3,831,963 A | 8/1974 | Placko et al. |
| 3,946,882 A | 3/1976 | Koch |
| 3,968,893 A | 7/1976 | Lapham |
| 4,074,120 A | 2/1978 | Allred et al. |
| 4,077,486 A | 3/1978 | Blakeslee et al. |
| 4,106,584 A | 8/1978 | Matsubara |
| 4,252,495 A | 2/1981 | Cook |
| 4,258,825 A | 3/1981 | Collins |
| 4,287,966 A | 9/1981 | Frees |
| 4,362,458 A | 12/1982 | Jantzi |
| 4,384,695 A | 5/1983 | Nohmi et al. |
| 4,476,954 A | 10/1984 | Johnson et al. |
| 4,518,043 A | 5/1985 | Anderson et al. |
| 4,527,651 A | 7/1985 | Thiermann, Sr. |
| 4,546,840 A | 10/1985 | Yukishige et al. |
| 4,551,059 A | 11/1985 | Petoia |
| 4,623,032 A | 11/1986 | Kemmer |
| 4,644,237 A | 2/1987 | Frushour et al. |
| 4,665,487 A | 5/1987 | Ogawa et al. |
| 4,714,140 A | 12/1987 | Hatton et al. |
| 4,716,980 A | 1/1988 | Butler |
| 4,727,492 A | 2/1988 | Reeve et al. |
| 4,785,664 A | 11/1988 | Reebs |
| 4,849,735 A | 7/1989 | Kirtley et al. |
| 4,878,003 A | 10/1989 | Knepper |
| 4,893,689 A | 1/1990 | Laurich-Trost |
| 4,954,817 A | 9/1990 | Levine |
| 4,967,362 A | 10/1990 | Schutten et al. |
| 5,023,790 A | 6/1991 | Luke, Jr. |
| 5,036,935 A | 8/1991 | Kohara |
| 5,044,472 A | 9/1991 | Dammeyer et al. |
| 5,107,946 A | 4/1992 | Kamimura et al. |
| 5,117,935 A | 6/1992 | Hall |
| 5,141,381 A | 8/1992 | Kato et al. |
| 5,151,696 A | 9/1992 | Kasahara et al. |
| 5,170,351 A | 12/1992 | Nemoto et al. |
| 5,220,319 A | 6/1993 | Kendel |
| 5,245,144 A | 9/1993 | Stammen |
| 5,307,271 A | 4/1994 | Everett et al. |
| 5,357,560 A | 10/1994 | Nykerk |
| 5,361,861 A | 11/1994 | Miller |
| 5,402,257 A | 3/1995 | Hasselmann et al. |
| 5,502,638 A | 3/1996 | Takenaka |
| 5,652,486 A | 7/1997 | Mueller et al. |
| 5,682,313 A | 10/1997 | Edlund et al. |
| 5,709,523 A | 1/1998 | Ware |
| 5,778,327 A | 7/1998 | Simmons et al. |
| 5,816,741 A | 10/1998 | Troppman |
| 5,892,855 A | 4/1999 | Kakinami et al. |
| 5,913,919 A | 6/1999 | Bauer et al. |
| 5,928,292 A | 7/1999 | Miller et al. |
| 5,938,710 A | 8/1999 | Lanza et al. |
| 5,939,986 A | 8/1999 | Schiffbauer et al. |
| 5,964,313 A | 10/1999 | Guy |
| 6,030,169 A | 2/2000 | Rossow et al. |
| 6,112,839 A | 9/2000 | Ostler et al. |
| 6,137,404 A | 10/2000 | O'Connor |
| 6,148,255 A | 11/2000 | Van Der Lely |
| 6,157,892 A | 12/2000 | Hada et al. |
| 6,173,215 B1 | 1/2001 | Sarangapani |
| 6,179,390 B1 | 1/2001 | Guzorek et al. |
| 6,226,902 B1 | 5/2001 | Heyne |
| 6,276,485 B1 | 8/2001 | Eriksson et al. |
| 6,285,925 B1 | 9/2001 | Steffen |
| 6,364,328 B1 | 4/2002 | Stabler |
| 6,382,359 B1 | 5/2002 | Lohmann |
| 6,390,496 B1 | 5/2002 | Eicher |
| 6,459,955 B1 | 10/2002 | Bartsch et al. |
| 6,464,025 B1 | 10/2002 | Koeper et al. |
| 6,481,525 B1 | 11/2002 | Bloch et al. |
| 6,507,366 B1 | 1/2003 | Lee |
| 6,548,982 B1 | 4/2003 | Papanikolopoulos et al. |
| 6,552,661 B1 | 4/2003 | Lastinger et al. |
| 6,571,176 B1 | 5/2003 | Shinmura et al. |
| 6,587,787 B1 | 7/2003 | Yokota |
| 6,595,306 B2 | 7/2003 | Trego et al. |
| 6,686,951 B1 | 2/2004 | Dickson et al. |
| 6,688,836 B2 | 2/2004 | Gourand |
| 6,691,015 B1 | 2/2004 | Levine |
| 6,748,292 B2 | 6/2004 | Mountz |
| 6,750,780 B1 | 6/2004 | Bitelli |
| 6,764,012 B2 | 7/2004 | Connolly et al. |
| 6,784,800 B2 | 8/2004 | Orzechowski |
| 6,801,125 B1 | 10/2004 | McGregor et al. |
| 6,809,680 B2 | 10/2004 | Tojima |
| 6,810,319 B2 | 10/2004 | Manaka |
| 6,961,561 B2 | 11/2005 | Himmel et al. |
| 7,017,689 B2 | 3/2006 | Gilliland et al. |
| 7,025,727 B2 | 4/2006 | Brockway et al. |
| 7,027,920 B2 | 4/2006 | Madau |
| 7,047,132 B2 | 5/2006 | Jacobs |
| 7,076,366 B2 | 7/2006 | Simon et al. |
| 7,099,764 B2 | 8/2006 | Seto et al. |
| 7,133,537 B1 | 11/2006 | Reid |
| 7,266,477 B2 | 9/2007 | Foessel |
| 7,610,121 B2 | 10/2009 | Nishira et al. |
| 7,711,464 B2 | 5/2010 | Kaufmann |
| 7,734,419 B2 | 6/2010 | Kondoh |
| 7,765,066 B2 | 7/2010 | Braeuchle et al. |
| 7,775,317 B1 | 8/2010 | Goodwin et al. |
| 7,860,653 B2 | 12/2010 | Joe et al. |
| 7,937,219 B2 | 5/2011 | Ichinose et al. |
| 8,010,261 B2 | 8/2011 | Brubaker |
| 8,027,029 B2 | 9/2011 | Lu et al. |
| 8,060,400 B2 | 11/2011 | Wellman |
| 8,088,262 B2 | 1/2012 | Choi et al. |

(56) References Cited

U.S. PATENT DOCUMENTS

| | | | |
|---|---|---|---|
| 8,099,214 B2 | 1/2012 | Moshchuk et al. |
| 8,170,787 B2 | 5/2012 | Coats et al. |
| 8,175,772 B2 | 5/2012 | Onuma |
| 8,180,561 B2 | 5/2012 | Osanai |
| 8,193,903 B2 | 6/2012 | Kraimer et al. |
| 8,195,344 B2 | 6/2012 | Song et al. |
| 8,209,091 B2 | 6/2012 | Morichika et al. |
| 8,280,560 B2 | 10/2012 | Huang et al. |
| 8,308,174 B2 | 11/2012 | Muth et al. |
| 8,386,146 B2 | 2/2013 | Shirai |
| 8,494,718 B2 | 7/2013 | Muth et al. |
| 8,577,551 B2 | 11/2013 | Siefring et al. |
| 8,705,792 B2 | 4/2014 | James et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,970,363 B2 | 3/2015 | Kraimer et al. |
| 9,002,581 B2 | 4/2015 | Castaneda et al. |
| 9,082,293 B2 | 7/2015 | Wellman et al. |
| 9,122,276 B2 | 9/2015 | Kraimer et al. |
| 9,493,184 B2 | 11/2016 | Castaneda et al. |
| 9,522,817 B2 | 12/2016 | Castaneda et al. |
| 9,643,638 B1 * | 5/2017 | Wittliff, III ........... B62B 5/0033 |
| 9,908,527 B2 | 3/2018 | Elston et al. |
| 10,163,334 B1 | 12/2018 | Capps et al. |
| 10,179,723 B2 | 1/2019 | Kraimer et al. |
| 10,301,155 B2 | 5/2019 | Dues et al. |
| 10,404,801 B2 | 9/2019 | Martch |
| 2001/0035729 A1 | 11/2001 | Graiger et al. |
| 2002/0035331 A1 | 3/2002 | Brockway et al. |
| 2002/0049539 A1 | 4/2002 | Russell et al. |
| 2002/0163495 A1 | 11/2002 | Doynov |
| 2002/0172017 A1 | 11/2002 | Tarnowski et al. |
| 2002/0178830 A1 | 12/2002 | Kazerooni et al. |
| 2003/0014162 A1 | 1/2003 | Sadano |
| 2003/0020808 A1 | 1/2003 | Luke et al. |
| 2003/0029647 A1 | 2/2003 | Trego et al. |
| 2003/0029648 A1 | 2/2003 | Trego et al. |
| 2003/0150663 A1 | 8/2003 | Farbotnik et al. |
| 2003/0205433 A1 | 11/2003 | Hagman |
| 2003/0209604 A1 | 11/2003 | Harrison, Jr. |
| 2003/0216854 A1 | 11/2003 | Katakura et al. |
| 2003/0235489 A1 | 12/2003 | Hoff |
| 2004/0099453 A1 | 5/2004 | Guy |
| 2004/0193349 A1 | 9/2004 | Flann et al. |
| 2004/0193363 A1 | 9/2004 | Schmidt et al. |
| 2004/0193374 A1 | 9/2004 | Hac et al. |
| 2005/0017858 A1 | 1/2005 | Gross |
| 2005/0052412 A1 | 3/2005 | McRae et al. |
| 2005/0073433 A1 | 4/2005 | Gunderson et al. |
| 2005/0075785 A1 | 4/2005 | Gray et al. |
| 2005/0216124 A1 | 9/2005 | Suzuki |
| 2005/0243058 A1 | 11/2005 | Morris et al. |
| 2005/0244259 A1 | 11/2005 | Chilson et al. |
| 2005/0246073 A1 | 11/2005 | Needelman et al. |
| 2005/0247508 A1 | 11/2005 | Gilliland et al. |
| 2005/0269145 A1 | 12/2005 | Schmidt |
| 2006/0025893 A1 | 2/2006 | Fischer et al. |
| 2006/0041271 A1 | 2/2006 | Bosma et al. |
| 2006/0058645 A1 | 3/2006 | Komistek et al. |
| 2006/0084422 A1 | 4/2006 | Huang et al. |
| 2006/0125806 A1 | 6/2006 | Voyles et al. |
| 2006/0229744 A1 | 10/2006 | Patzwald et al. |
| 2006/0231302 A1 | 10/2006 | Rose |
| 2006/0238156 A1 | 10/2006 | Kim |
| 2006/0250255 A1 | 11/2006 | Flanagan |
| 2006/0255961 A1 | 11/2006 | Hofer et al. |
| 2006/0265166 A1 | 11/2006 | Mäkelä |
| 2007/0002808 A1 | 1/2007 | Twitchell |
| 2007/0016341 A1 | 1/2007 | Nagasawa |
| 2007/0056157 A1 | 3/2007 | Hirata et al. |
| 2007/0078455 A1 | 4/2007 | Rashidi |
| 2007/0088477 A1 | 4/2007 | Brewer et al. |
| 2007/0109110 A1 | 5/2007 | Ohmura et al. |
| 2007/0112461 A1 | 5/2007 | Zini et al. |
| 2007/0116548 A1 | 5/2007 | Cooper |
| 2007/0129870 A1 | 6/2007 | Lange et al. |
| 2007/0137904 A1 | 6/2007 | Rose et al. |
| 2007/0171090 A1 | 7/2007 | Newman et al. |
| 2007/0194882 A1 | 8/2007 | Yokota et al. |
| 2007/0219720 A1 | 9/2007 | Trepagnier et al. |
| 2007/0255451 A1 | 11/2007 | Lewis et al. |
| 2008/0011554 A1 | 1/2008 | Broesel et al. |
| 2008/0071429 A1 | 3/2008 | Kraimer et al. |
| 2008/0129445 A1 | 6/2008 | Kraimer et al. |
| 2008/0187175 A1 | 8/2008 | Kim et al. |
| 2008/0188900 A1 | 8/2008 | Levin et al. |
| 2008/0189005 A1 | 8/2008 | Chilson et al. |
| 2008/0201044 A1 | 8/2008 | Yamada et al. |
| 2008/0202243 A1 | 8/2008 | Gross |
| 2008/0225271 A1 | 9/2008 | Ohmura |
| 2008/0253834 A1 | 10/2008 | Colvard |
| 2009/0032560 A1 | 2/2009 | Strandberg et al. |
| 2009/0069967 A1 | 3/2009 | Reed et al. |
| 2009/0076664 A1 | 3/2009 | McCabe et al. |
| 2009/0192710 A1 | 7/2009 | Eidehall et al. |
| 2009/0306835 A1 | 12/2009 | Ellermann et al. |
| 2009/0326763 A1 | 12/2009 | Rekow |
| 2010/0021006 A1 | 1/2010 | Kim et al. |
| 2010/0063663 A1 | 3/2010 | Tolstedt et al. |
| 2010/0063680 A1 | 3/2010 | Tolstedt et al. |
| 2010/0114405 A1 | 5/2010 | Elston et al. |
| 2010/0145551 A1 | 6/2010 | Pulskamp et al. |
| 2010/0204866 A1 | 8/2010 | Moshchuk et al. |
| 2010/0209888 A1 | 8/2010 | Huang et al. |
| 2011/0018699 A1 | 1/2011 | Chen et al. |
| 2011/0035086 A1 | 2/2011 | Kim et al. |
| 2011/0046813 A1 | 2/2011 | Castaneda et al. |
| 2012/0242455 A1 | 9/2012 | Hale et al. |
| 2013/0197720 A1 | 8/2013 | Kraimer et al. |
| 2013/0294306 A1 | 11/2013 | Borges et al. |
| 2014/0074341 A1 | 3/2014 | Weiss |
| 2015/0057843 A1 | 2/2015 | Kraimer et al. |
| 2015/0310722 A1 | 10/2015 | Sousa |
| 2015/0315001 A1 | 11/2015 | Choi |
| 2016/0358389 A1 | 12/2016 | Menard et al. |
| 2017/0010619 A1 | 1/2017 | Foster et al. |
| 2017/0023945 A1 | 1/2017 | Cavalcanti et al. |
| 2018/0182236 A1 * | 6/2018 | Hor-Lao ............. A43B 3/0005 |
| 2019/0172340 A1 | 6/2019 | Goepner |

FOREIGN PATENT DOCUMENTS

| | | |
|---|---|---|
| CN | 101005981 A | 7/2007 |
| CN | 101162395 A | 4/2008 |
| CN | 101267958 A | 9/2008 |
| CN | 101999102 A | 3/2011 |
| CN | 108599283 A | 9/2018 |
| DE | 10033857 A1 | 1/2002 |
| DE | 202005003366 U1 | 7/2005 |
| DE | 102005059226 A1 | 7/2006 |
| DE | 60210360 T2 | 3/2007 |
| DE | 102007027494 A1 | 1/2009 |
| EP | 406070 A1 | 1/1991 |
| EP | 556031 A2 | 8/1993 |
| EP | 0732641 A2 | 9/1996 |
| EP | 1237062 A1 | 9/2002 |
| EP | 1288882 A1 | 3/2003 |
| EP | 1462880 A2 | 9/2004 |
| EP | 1475297 A1 | 11/2004 |
| EP | 1653251 A2 | 5/2006 |
| EP | 1813569 A1 | 8/2007 |
| EP | 2036763 A2 | 3/2009 |
| EP | 3173371 B1 | 1/2019 |
| FR | 2764091 A1 | 12/1998 |
| FR | 2819596 A1 | 7/2002 |
| FR | 2849160 A1 | 6/2004 |
| FR | 2867593 A3 | 9/2005 |
| GB | 1002825 A | 9/1965 |
| GB | 2197799 A | 6/1988 |
| GB | 2360500 B | 10/2003 |
| GB | 2398394 B | 5/2006 |
| JP | 02152898 A | 6/1990 |

(56) References Cited

FOREIGN PATENT DOCUMENTS

| | | |
|---|---|---|
| JP | 07138000 A | 5/1995 |
| JP | 2002104800 A | 4/2002 |
| JP | 2002179196 A | 6/2002 |
| JP | 2005094425 A | 4/2005 |
| JP | 2005241651 A | 9/2005 |
| JP | 2006259877 A | 9/2006 |
| JP | 2006293975 A | 10/2006 |
| RU | 60486 U1 | 1/2007 |
| WO | 8702483 A1 | 4/1987 |
| WO | 9215977 A1 | 9/1992 |
| WO | 9639679 A1 | 12/1996 |
| WO | 02088918 A2 | 11/2002 |
| WO | 2004057553 A2 | 7/2004 |
| WO | 2006078604 A2 | 7/2006 |
| WO | 2008039649 A2 | 4/2008 |
| WO | 2010065864 A2 | 6/2010 |
| WO | 2010095128 A2 | 8/2010 |
| WO | 2011002478 A2 | 1/2011 |
| WO | 2011022026 A1 | 2/2011 |
| WO | 2012054443 A1 | 4/2012 |

OTHER PUBLICATIONS

International Search Report and Written Opinion of the International Searching Authority dated Apr. 14, 2020; International Application No. PCT/US2019/067068; European Patent Office; Rijswijk, Netherlands.
International Preliminary Report on Patentability dated Aug. 12, 2021; International Application No. PCT/US2019/067068; The International Bureau of WIPO; Geneva, Switzerland.
International Preliminary Report on Patentability dated Aug. 12, 2021; International Application No. PCT/US2019/067075; The International Bureau of WIPO; Geneva, Switzerland.
Patent Application Entitled "On-Board Charging Station for a Remote Control Device" dated Jul. 8, 2021; U.S. Appl. No. 17/305,463; United States Patent and Trademark Office; Alexandria, Virginia.
Youtube video dated Mar. 8, 2016 entitled "STILL iGo neo CX 20—oder picking the intelligent way"; https://www.youtube.com/watch?v=pRjn9s9VBho.
Youtube video dated Nov. 29, 2017 entitled "Toyota t-mote: remote drive solution"; https://www.youtube.com/watch?v=HBxFqCBp8r0.
Weber et al.; "Ein tragbares Funk-Fernsteuergerat fur Gewinnungsmaschinen", Gluckauf, Minova Carbo Tech GmbH; Jul. 13, 1967; pp. 375-378; XP002093388; ISSN; 0340-7896; Essen DE.
Weber, Karl-Heinz et al.; "A Portable Wireless Remote Control Device for Mining Equipment"; Apr. 13, 1967; XP002093388; pp. 375-378, Essen, Germany.
Bourdon, G. et al.; Instantaneous Fuzzy Modelling for Obstacle Avoidance; Systems, Man and Cybernetics; Intelligent Systems for the 21st Century; IEEE International Conference; vol. 3; Oct. 22, 1995; pp. 2546-2551; New York, NY; USA.
Durrant-Whyte, Hugh F., "An Autonomous Guided Vehicle for Cargo-Handling Applications;" The International Journal of Robotics Research, vol. 15, Oct. 1996, pp. 407-440.
BT Products AB; "Swedish Industry Standard"; Swedish Industry Standard; 1998.
Urban Challenge; http://www.darpa.mil/grandchallenge/index.asp; Nov. 3, 2007.
Urban Challenge; http://www.darpa.mil/grandchallenge/resources.asp; Nov. 2007.
Congmin, Zhu et al.; AGV Navigation System With Multiple Sensors; Chinese Journal of Scientific Instrument; Nov. 2008; China.
Photograph 3; RS409 Wearable Ring Scanner; http://www.motorola.com/business/v/index.jsp?vgnextoid=5dbee90e3ae95110VgnVCM10; First publication date unknown, and first discovered by the inventors on Oct. 30, 2008.
Yong, Zhou et al.; "Obstacle Detection For AGVS Based On Computer Vision"; Machine Design and Research; May 2008; China.
Photograph 2; TINYOM Hand Free Scanning; http://txcom.com/public/?page=tinyom; First publication date unknown, and first discovered by the inventors on Aug. 10, 2009.
Photograph 4; Peregrine; http://www.theperegrine.com/; First publication date unknown, and first discovered by the inventors on Nov. 23, 2009.
Photograph 1; AirMouse; http://theairmouse.com/; Deanmark Ltd; Ontario, Canada; First publication date unknown, and first discovered by the inventors on Jan. 28, 2010.
Wayback Machine, "Getting Started: a Wall following Robot"; Feb. 2, 2011; <www.mobotsoft.com>.
http://www.cajunbot.com/technology; 2011; Cajun Bot Labs.
http://www.cajunbot.com; 2011; Cajun Bot Labs.
International Search Report & Written Opinion; International Application No. PCT/US2019/067075; dated Mar. 6, 2020; European Patent Office; Rijswijk, Netherlands.
Dungaie, D. et al.; "Higher-order Kalman filter to support fast target tracking in a multi-function radar system;" Publication Year: 1999; pp. 14/1-14/3.
Bhatt, R. et al.; "A real-time guidance system for an autonomous vehicle," vol. 4; Publication Year: 1987; pp. 1785-1791.
Patent application; U.S. Appl. No. 16/718,473 entitled "Pairing a Remote Control Device to a Vehicle"; filed Dec. 18, 2019 with inventors Vern I. Woodruff III et al.
CajunBot Wiki; http:cajunbot.com/wiki/Main_Page; Apr. 18, 2010.
Garcia, Gregory; B.O.S.S. A Battery Operated Smart Servant; EEL 5666c; Intelligent Machines Design Lab; Sensor Presentation; Center for Intelligent Machines and Robotics; University of Florida; Aug. 17, 2006.
Kovacs, S. et al.; Interpolation-based Fuzzy Logic Controller, as a Simplified Way for Constructing the Fuzzy Rulebase of the Path Tracking and Collision Avoidance Strategy of an AGV; Systems, Man and Cybernetics; IEEE International Conference; vol. 2; Oct. 11, 1998; pp. 1317-1322; New York, NY; USA.
Office Action dated Feb. 1, 2022; U.S. Appl. No. 16/718,473; United States Patent and Trademark Office; Alexandria, Virginia.
Extended European Search Report dated Feb. 7, 2022; European Application No. 21204537.1; European Patent Office; Munich, Germany.
Notice of Allowance dated May 4, 2022; U.S. Appl. No. 16/718,473; United States Patent and Trademark Office; Alexandria, Virginia.
Examination Report No. 1 dated May 31, 2022; Australian Application No. 2021209146; IP Australia.
Examination Report No. 1 dated Jun. 24, 2022; Australian Application No. 2019426894; IP Australia.
Office Action dated Jun. 24, 2022; U.S. Appl. No. 17/305,463; United States Patent and Trademark Office; Alexandria, Virginia.
Patent Application entitled "On-Board Charging Station for a Remote Control Device"; filed Jul. 26, 2022; U.S. Appl. No. 17/873,602; United States Patent and Trademark Office; Alexandria, Virginia.
Examination Report No. 2 dated Aug. 29, 2022; Australian Application No. 2021209146; IP Australia.

* cited by examiner

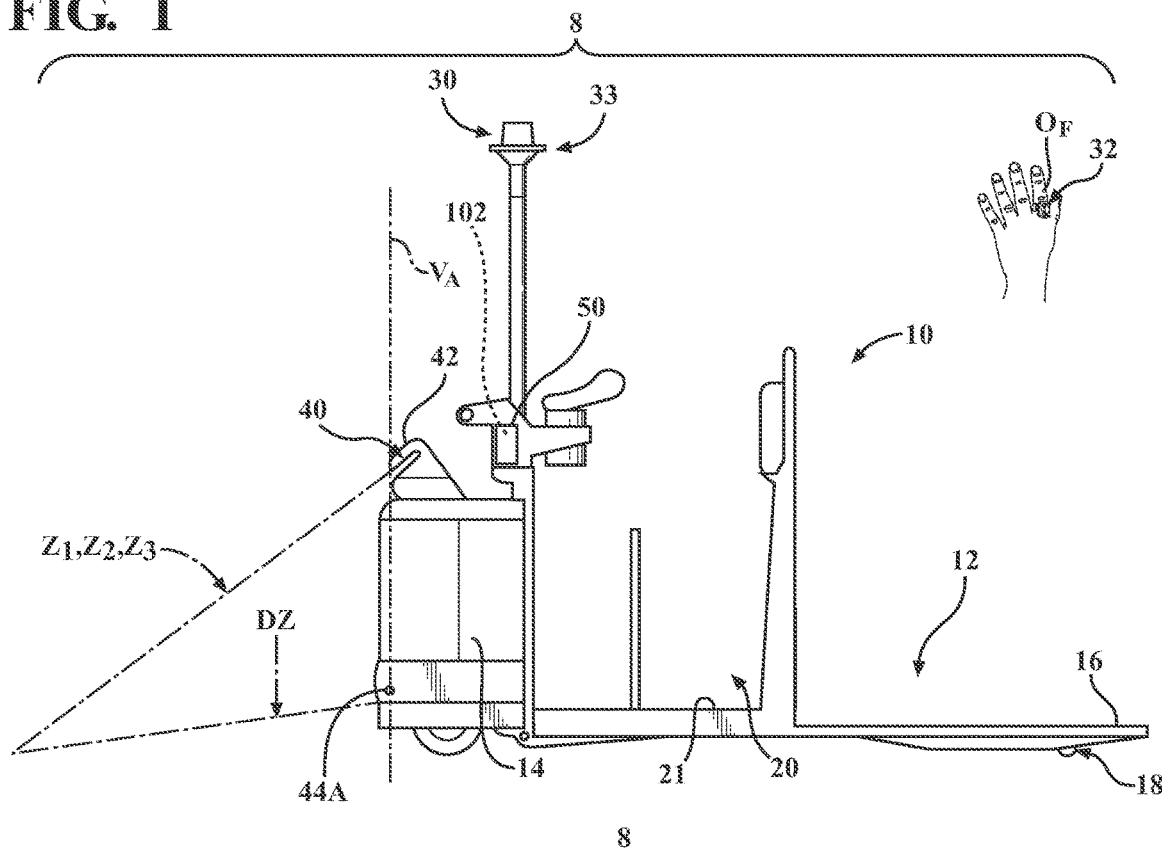
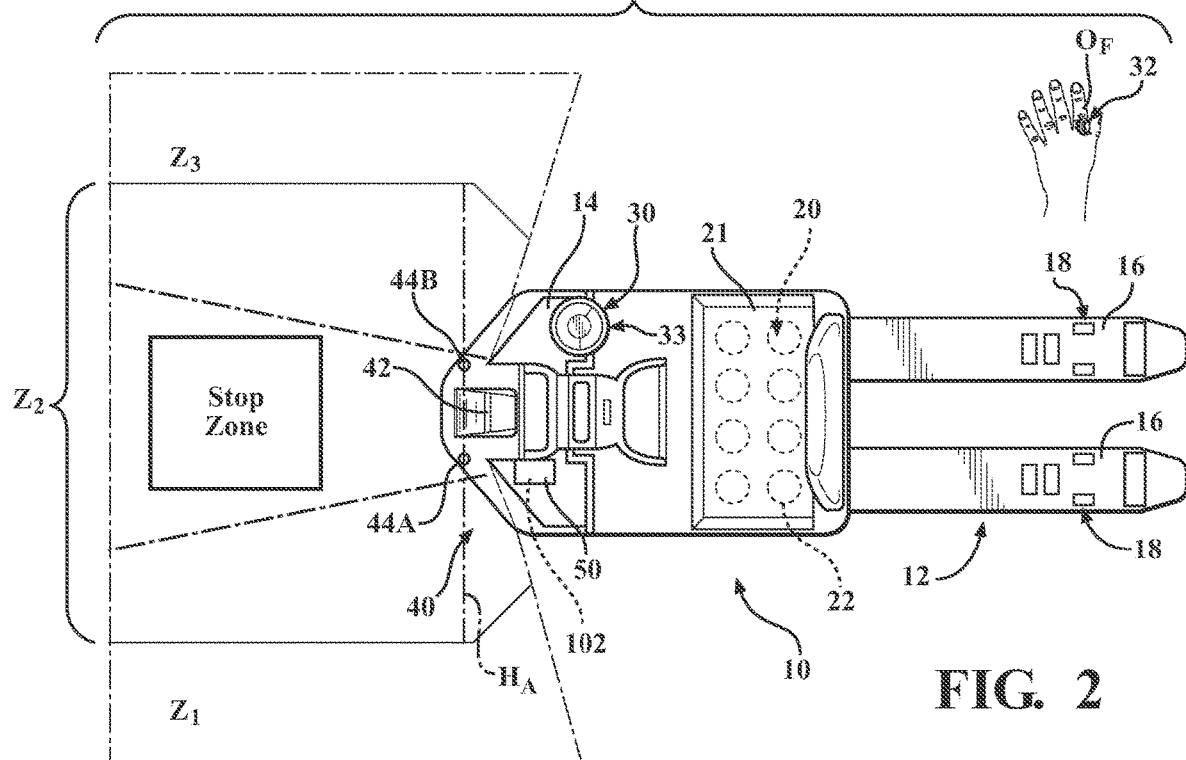

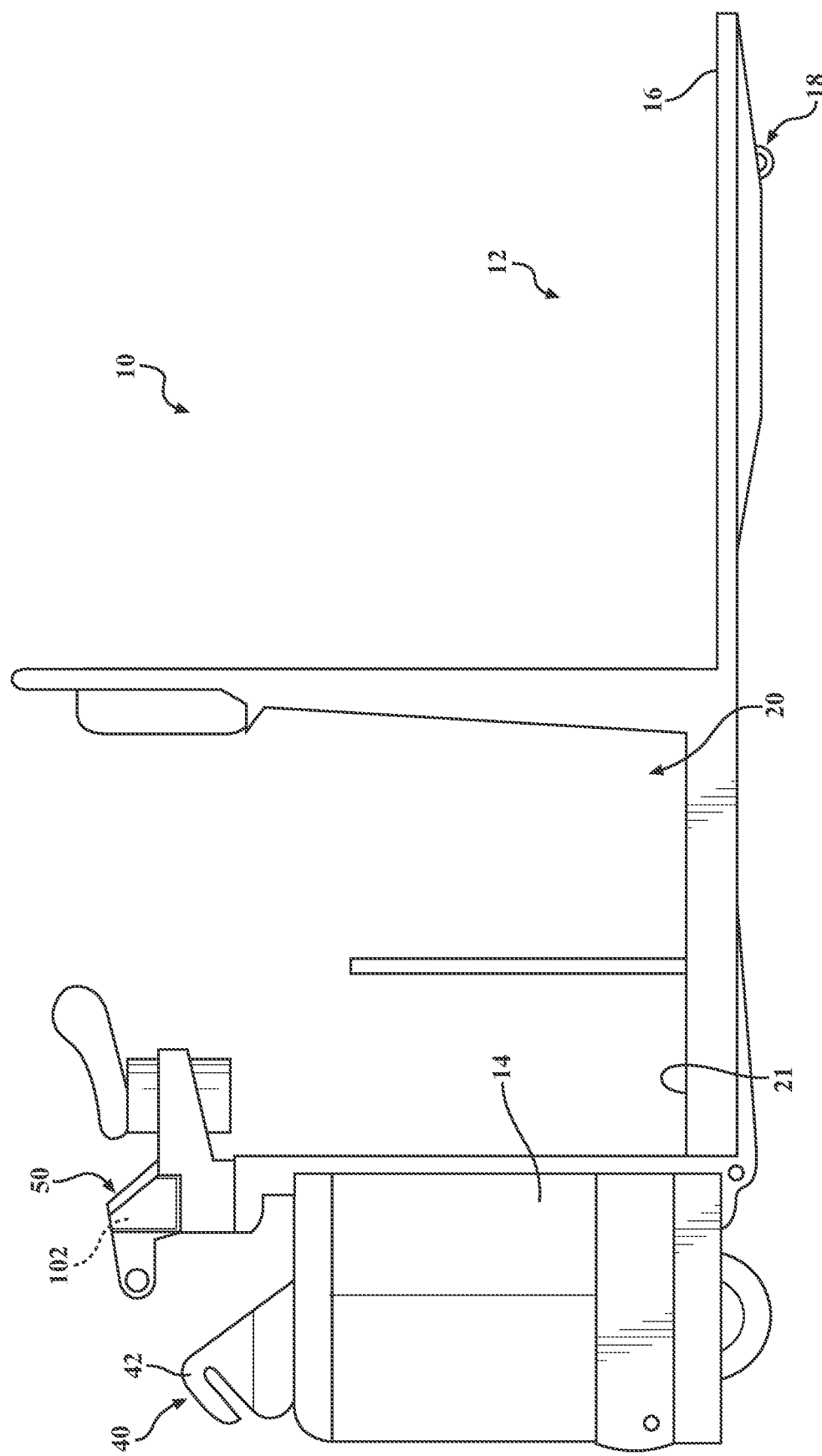

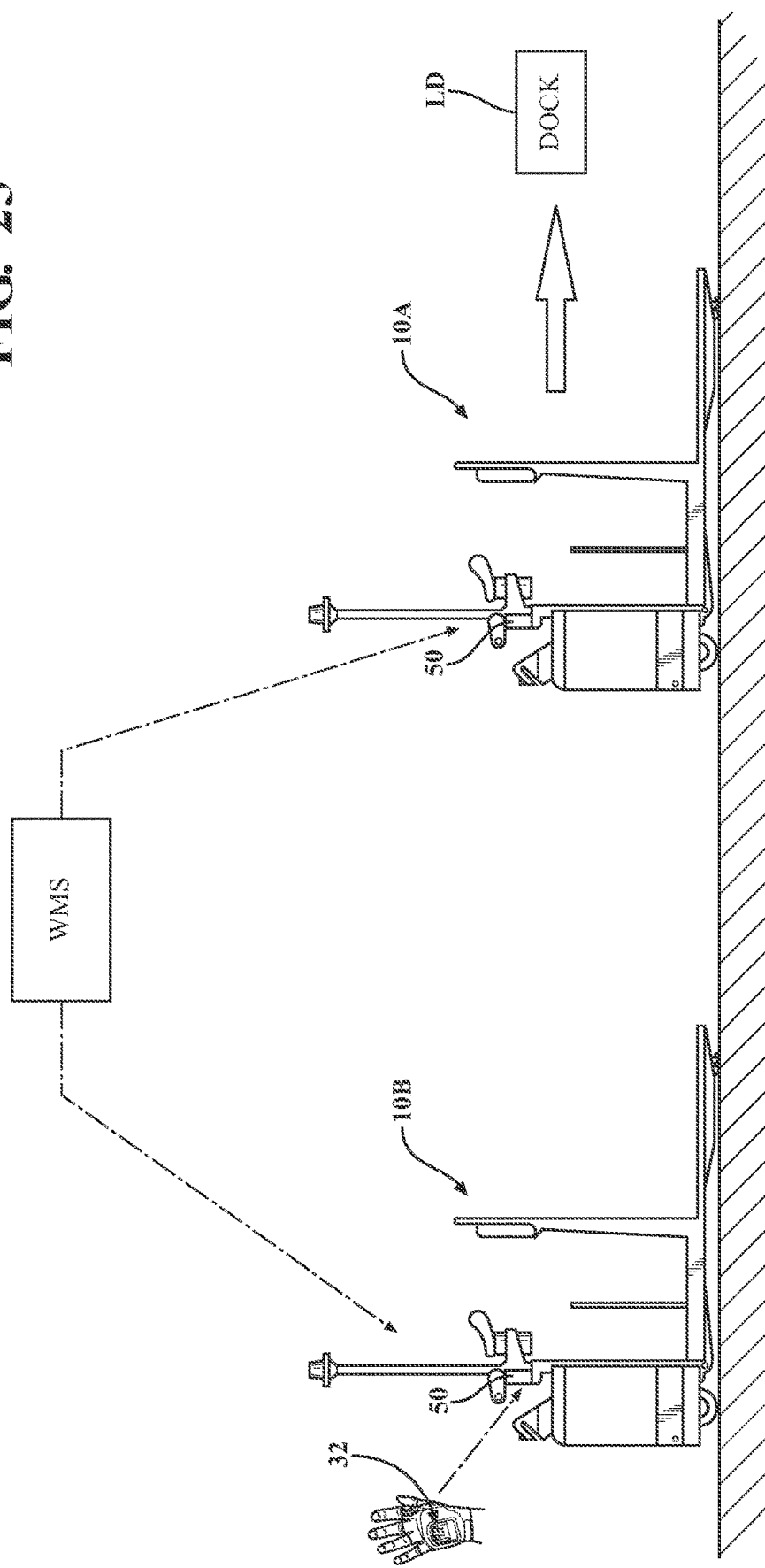

ON-BOARD CHARGING STATION FOR A REMOTE CONTROL DEVICE

CROSS REFERENCE TO RELATED APPLICATION

This application claims the benefit of U.S. Provisional Patent Application No. 62/800,032, filed Feb. 1, 2019 and entitled "ON-BOARD CHARGING STATION FOR A REMOTE CONTROL DEVICE", the entire disclosure of which is incorporated herein by reference.

FIELD OF THE INVENTION

The present invention relates to an on-board charging station for a remote control device, such as may be used by an operator interacting with a materials handling vehicle.

BACKGROUND OF THE INVENTION

Materials handling vehicles are commonly used for picking stock in warehouses and distribution centers. Such vehicles typically include a power unit and a load handling assembly, which may include load carrying forks. The vehicle also has control structures for controlling operation and movement of the vehicle.

In a typical stock picking operation, an operator fills orders from available stock items that are located in storage areas provided along one or more aisles of a warehouse or distribution center. The operator drives the vehicle between various pick locations where item(s) are to be picked. The operator may drive the vehicle either by using the control structures on the vehicle, or via a wireless remote control device that is associated with the vehicle, such as the remote control device disclosed in commonly owned U.S. Pat. No. 9,082,293, the entire disclosure of which is hereby incorporated by reference herein.

BRIEF SUMMARY OF THE INVENTION

In accordance with various aspects of the present invention, a system comprises a materials handling vehicle, and a remote control device, which may be useable by an operator interacting with the materials handling vehicle. The remote control device comprises a wireless communication system including a wireless transmitter and a rechargeable power source. The system further comprises a receiver at the vehicle for receiving transmissions from the wireless transmitter; a controller at the vehicle that is communicably coupled to the receiver, the controller being responsive to receipt of the transmissions from the remote control device; and a charging station at the vehicle, the charging station for charging the rechargeable power source of the remote control device.

The rechargeable power source may be a super capacitor.

The system may further comprise a pairing system for establishing communication between the remote control device and the vehicle.

The communication between the remote control device and the vehicle may be established concurrently during charging of the rechargeable power source at the charging station.

The communication between the remote control device and the vehicle, and charging of the rechargeable power source at the charging station may be initiated with a single action. The single action may comprise physically contacting a component of the remote control device with an element of the charging station.

The system may further comprise a pairing indicator that confirms the establishment of communication between the remote control device and the vehicle.

A time period that it takes to establish communication between the remote control device and the vehicle may be less than or equal to a pairing period.

If no vehicle-related activity takes place for greater than a first predetermined amount of time after communication between the remote control device and the vehicle is established, the communication between the remote control device and the vehicle may be terminated and must be re-established using a pairing system. If no vehicle-related activity takes place for less than a second predetermined amount of time after the communication between the remote control device and the vehicle is established, the second predetermined amount of time equal to or less than the first predetermined amount of time, the communication between the remote control device and the vehicle may be terminated but can be re-established, without using the pairing system, by performing a confirmation method utilizing the remote control device. The confirmation method may comprise carrying out a button sequence on the remote control device.

A substantially full charge state of the rechargeable power source may be achieved by charging the rechargeable power source at the charging station in five seconds or less, four seconds or less, or three seconds or less. The substantially full charge state of the rechargeable power source may yield a use period of the remote control device of at least two hours or at least eight hours.

The charging station may include guide structure to align the remote control device in the proper orientation for charging the rechargeable power source.

The system may further comprise an indicator at the vehicle for indicating a state of charge of the rechargeable power source. The indicator may indicate the state of charge of the rechargeable power source both when charging the rechargeable power source at the charging station and during use of the remote control device. The indicator may comprise a series of lights, each light representing a level of the state of charge of the rechargeable power source.

The remote control device may include securing structure for securing the remote control device to one or more fingers of a hand of the operator.

The remote control device may comprise at least one charging contact that engages at least one corresponding charging element on the charging station. The at least one charging contact may be recessed from an outer surface of the remote control device. At least one of the remote control device or the charging station may include a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station. The arrangement of the remote control device and the charging station may be configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element.

The remote control device may comprise at least two charging contacts that are positioned to engage corresponding charging elements on the charging station.

The charging station may be implemented in a driving control of the vehicle, and the rechargeable power source may be charged by the operator grasping the driving control.

The rechargeable power source may be discharged to a high temperature state of charge if a sensed temperature is determined to be above a predetermined setpoint temperature. The sensed temperature may be an ambient temperature or a temperature of the rechargeable power source.

The rechargeable power source may be charged at the charging station to a predetermined charge level less than a 100% charge level if a sensed temperature is determined to be above a predetermined threshold temperature.

The requests sent by the remote control device may comprise travel requests that request the vehicle to advance across a floor surface.

The charging station may be located on a side portion of the vehicle or in proximity to a steering wheel.

The wireless communication system may enter a low power mode when the rechargeable power source of the remote control device is being charged at the charging station.

One or more components of the remote control device may be turned off or the power supplied thereto is reduced when an operator is positioned on the vehicle.

If the voltage of the rechargeable power source is below a voltage threshold before being charged by the charging station, the charging station may charge the rechargeable power source at a first power level, and if the voltage of the rechargeable power source is above the voltage threshold before being charged by the charging station, the charging station may charge the rechargeable power source at a second power level. The first power level may be greater than the second power level. The charging station may charge the rechargeable power source to a substantially full charge state in about the same time regardless of whether the voltage of the rechargeable power source is above or below the voltage threshold before being charged by the charging station.

The remote control device may include at least one control communicably coupled to the wireless communication system, wherein actuation of the control causes the wireless transmitter to wirelessly transmit a request to the vehicle.

In accordance with other aspects of the present invention, a kit is provided for retrofitting to a materials handling vehicle, the vehicle including a controller that is responsive to transmissions from an associated remote control device that comprises a wireless communication system including wireless transmitter and is used by an operator interacting with the vehicle. The kit comprises a charging station at the vehicle, the charging station being configured to be electrically coupled to a vehicle power source of the vehicle for charging a rechargeable power source of the remote control device.

The kit may further comprise a pairing system for establishing communication between the remote control device and the vehicle.

Communication between the remote control device and the vehicle may be established concurrently during charging of the rechargeable power source at the charging station.

Communication between the remote control device and the vehicle, and charging of the rechargeable power source at the charging station may be initiated with a single action. The single action may comprise physically contacting a component of the remote control device with an element of the charging station.

The kit may further comprise a pairing indicator that confirms the establishment of communication between the remote control device and the vehicle.

A time period that it takes to establish communication between the remote control device and the vehicle may be less than or equal to a pairing period.

A substantially full charge state of the rechargeable power source may be achieved by charging the rechargeable power source at the charging station in five seconds or less, four seconds or less, or three seconds or less. The substantially full charge state of the rechargeable power source may yield a use period of the remote control device of at least two hours or at least eight hours.

The charging station may include guide structure to align the remote control device in proper orientation for charging the rechargeable power source.

The kit may further comprise an indicator at the vehicle for indicating a state of charge of the rechargeable power source. The indicator may indicate the state of charge of the rechargeable power source both when charging the rechargeable power source at the charging station and during use of the remote control device. The indicator may comprise a series of lights, each light representing a level of the state of charge of the rechargeable power source.

The remote control device may comprise at least one charging contact that engages at least one corresponding charging element on the charging station. At least one of the remote control device or the charging station may include a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station. The arrangement of the remote control device and the charging station may be configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element. The remote control device may comprise at least two charging contacts that are positioned to engage corresponding charging elements on the charging station.

The charging station may be implemented in a driving control of the vehicle, and the rechargeable power source is charged by the operator grasping the driving control.

The rechargeable power source may be charged at the charging station to a predetermined charge level less than a 100% charge level if a sensed temperature is determined to be above a predetermined threshold temperature. The sensed temperature may be an ambient temperature.

The charging station may be located on a side portion of the vehicle.

In accordance with other aspects of the present invention, a method is provided for charging a remote control device, the remote control device comprising a wireless communication system including a wireless transmitter and a rechargeable power source. The method comprises: initiating contact between a component of the remote control device and an element of a charging station, the charging station located at the vehicle; sensing the contact between the remote control device component and the charging station element; upon the sensing of contact, supplying power from the charging station to the rechargeable power source; interrupting the contact between the remote control device component and the charging station element; sensing the interruption of the contact between the remote control device component and the charging station element; and upon the sensing of the interruption, ceasing the supply of power from the charging station to the rechargeable power source.

The rechargeable power source may be a super capacitor.

The method may further comprise, while the remote control device component is in contact with the charging station element, establishing communication between the remote control device and the vehicle.

Communication between the remote control device and the vehicle may be established concurrently during charging of the rechargeable power source at the charging station.

Communication between the remote control device and the vehicle may take place during a pairing period, and charging of the rechargeable power source to a substantially full charge at the charging station may take place during a charging period, wherein the pairing period and the charging period may overlap. The pairing period may be less than or equal to the charging period.

The method may further comprise confirming the establishment of communication between the remote control device and the vehicle with at least one of an audible or visual queue.

A substantially full charge state of the rechargeable power source may be achieved by charging the rechargeable power source at the charging station in five seconds or less, four seconds or less, or three seconds or less.

The substantially full charge state of the rechargeable power source may yield a use period of the remote control device of at least two hours or at least eight hours.

The method may further comprise displaying a state of charge of the rechargeable power source at the vehicle. The state of charge of the rechargeable power source may be displayed at the vehicle both when charging the rechargeable power source and during use of the remote control device. The state of charge of the rechargeable power source may be displayed via a series of lights, each light representing a level of a state of charge of the rechargeable power source.

Initiating contact between a component of the remote control device and an element of a charging station may comprise initiating contact between at least one charging contact of the remote control device and at least one corresponding charging element on the charging station.

If no vehicle-related activity takes place for greater than a first predetermined amount of time after communication between the remote control device and the vehicle is established, the communication between the remote control device and the vehicle may be terminated and must be re-established using a pairing system. If no vehicle-related activity takes place for less than a second predetermined amount of time after the communication between the remote control device and the vehicle is established, the second predetermined amount of time equal to or less than the first predetermined amount of time, the communication between the remote control device and the vehicle may be terminated but can be re-established by performing a confirmation method utilizing the remote control device. The confirmation method may comprise carrying out a button sequence on the remote control device.

The charging station may be implemented in a driving control of the vehicle, and the rechargeable power source may be charged by the operator grasping the driving control.

The method may further comprise discharging the rechargeable power source to a high temperature state of charge if a sensed temperature is determined to be above a predetermined setpoint temperature. The sensed temperature may be an ambient temperature or a temperature of the rechargeable power source.

The rechargeable power source may be charged at the charging station to a predetermined charge level less than a 100% charge level if a sensed temperature is determined to be above a predetermined threshold temperature.

The charging station may be located on a side portion of the vehicle.

BRIEF DESCRIPTION OF THE SEVERAL VIEWS OF THE DRAWINGS

FIGS. 1 and 2 are side and top views of a materials handling vehicle capable of remote wireless operation according to various aspects of the present invention;

FIG. 2A is a side view of another materials handling vehicle capable of remote wireless operation according to various aspects of the present invention;

FIG. 25 is a schematic diagram illustrating various aspects of the present invention.

DETAILED DESCRIPTION OF THE INVENTION

Figure 3:
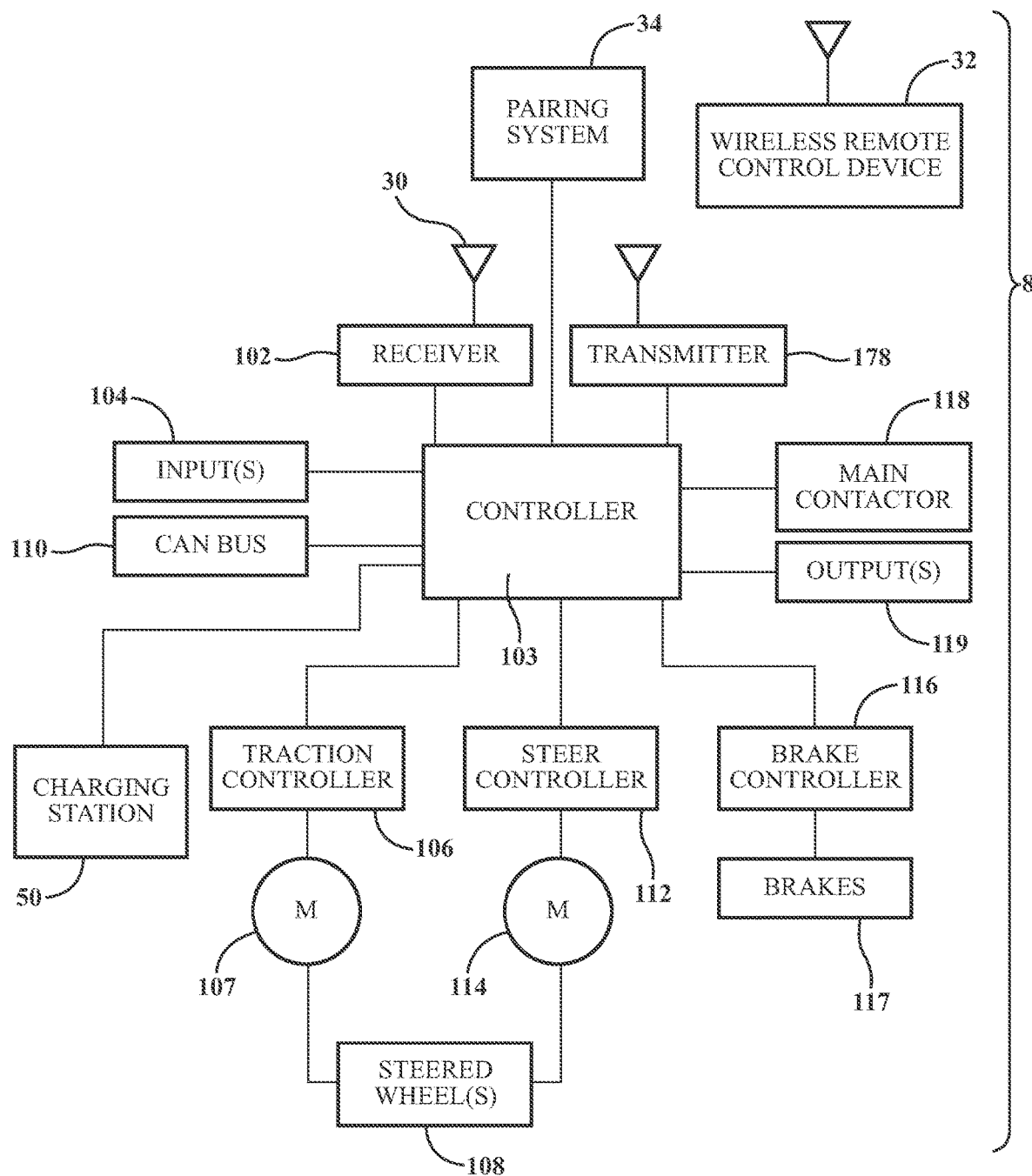
FIG. 3 is a schematic diagram of several components of a materials handling vehicle capable of remote wireless operation according to various aspects of the present invention.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Low Level Order Picking Truck

Referring now to the drawings, and particularly to FIGS. 1 and 2, a materials handling vehicle 10, which is illustrated as a low level order picking truck, includes a load handling assembly 12 that extends from a power unit 14. The vehicle 10 forms part of a system 8 according to aspects of the invention, which system 8 will be more fully described below. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks, as a few examples. Still further, the load handling assembly 12 may include load handling features such as a mast, a load platform, a collection cage or other support structure carried by the forks 16 or otherwise provided for handling a load supported and carried by the vehicle 10. While the present disclosure is made with reference to the illustrated vehicle 10, it will be apparent to those of skill in the art that the vehicle 10 may comprise a variety of other industrial vehicles, such as a forklift truck, a reach truck, etc., and that the following description of the invention with reference to the Figures should not be limited to an order picking truck unless otherwise specified. Additionally, the vehicle 10 may be implemented in other formats, styles and features, including a vehicle 10 that does not include a load handling assembly, such as a tugger vehicle, etc.

The illustrated power unit 14 comprises a step-through operator's station 20 dividing a first end section of the power unit 14 (opposite the forks 16) from a second end section (proximate the forks 16). The operator's station 20 includes a platform 21 upon which an operator may stand to drive the vehicle 10 and/or to provide a position from which the operator may operate various included features of the vehicle 10.

Presence sensors 22 (see FIG. 2) may be provided to detect the presence of an operator on the vehicle 10. For example, presence sensors 22 may be located on, above or under the platform 21, or otherwise provided about the operator's station 20. In the exemplary vehicle 10 of FIG. 2, the presence sensors 22 are shown in dashed lines indicating that they are positioned underneath the platform 21. Under this arrangement, the presence sensors 22 may comprise load sensors, switches, etc. As an alternative, the presence sensors 22 may be implemented above the platform 21, such as by using ultrasonic, capacitive or other suitable sensing technology. The utilization of presence sensors 22 will be described in greater detail herein.

According to one embodiment shown in FIG. 2, the vehicle 10 may include a pole that extends vertically from the power unit 14 and includes an antenna 30 that is provided for receiving control signals from a corresponding wireless remote control device 32. The pole may include a light 33 at the top, as shown in FIGS. 1 and 2. According to another embodiment as shown in FIG. 2A, the antenna may be located within other vehicle components, such that the control signals from the remote control device 32 are received elsewhere on the vehicle 10, as will be discussed below. The remote control device 32 comprises an additional component of the system 8 to be described in more detail below.

The remote control device 32 is manually operable by an operator, e.g., by pressing a button or other control, to cause the remote control device 32 to wirelessly transmit at least a first type signal designating a travel request to a vehicle 10 that is paired to the remote control device 32. The travel request is a command that requests the vehicle 10 to travel, as will be described in greater detail herein. Although the remote control device 32 is illustrated in FIGS. 1 and 2 as a finger-mounted structure, numerous implementations of the remote control device 32 may be implemented, including for example, a glove structure, a lanyard or sash mounted structure, etc. Still further, the vehicle 10 and the remote control device 32 may comprise any additional and/or alternative features or implementations, examples of which are disclosed in U.S. Provisional Patent Application Ser. No. 60/825,688, filed Sep. 14, 2006, entitled "SYSTEMS AND METHODS OF REMOTELY CONTROLLING A MATERIALS HANDLING VEHICLE;" U.S. patent application Ser. No. 11/855,310, filed Sep. 14, 2007, entitled "SYSTEMS AND METHODS OF REMOTELY CONTROLLING A MATERIALS HANDLING VEHICLE" now U.S. Pat. No. 9,082,293; U.S. patent application Ser. No. 11/855,324, filed Sep. 14, 2007, entitled "SYSTEMS AND METHODS OF REMOTELY CONTROLLING A MATERIALS HANDLING VEHICLE" now U.S. Pat. No. 8,072,309; U.S. Provisional Patent Application Ser. No. 61/222,632, filed Jul. 2, 2009, entitled "APPARATUS FOR REMOTELY CONTROLLING A MATERIALS HANDLING VEHICLE;" U.S. patent application Ser. No. 12/631,007, filed Dec. 4, 2009, entitled "MULTIPLE ZONE SENSING FOR MATERIALS HANDLING VEHICLES" now U.S. Pat. No. 9,645,968; U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES;" and/or U.S. Pat. No. 7,017,689, issued Mar. 28, 2006, entitled "ELECTRICAL STEERING ASSIST FOR MATERIAL HANDLING VEHICLE;" the entire disclosures of which are each hereby incorporated by reference herein. Additional details in connection with the remote control device 32 will be discussed in detail below.

The vehicle 10 also comprises one or more contactless obstacle sensors 40, which are provided about the vehicle 10, e.g., towards the first end section of the power unit 14 as shown in FIGS. 1 and 2. The obstacle sensors 40 are operable to define at least one detection zone. For example, at least one detection zone may define an area at least partially in front of a forward traveling direction of the vehicle 10 when the vehicle 10 is traveling in response to a wirelessly received travel request from the remote control device 32, as will also be described in greater detail herein.

The obstacle sensors 40 may comprise any suitable proximity detection technology, such as ultrasonic sensors, image capture devices, infrared sensors, laser scanner sensors, etc., which are capable of detecting the presence of objects/obstacles or are capable of generating signals that can be analyzed to detect the presence of objects/obstacles within the predefined detection zone(s). In the exemplary embodiment illustrated in FIGS. 1 and 2, the vehicle 10 includes a first obstacle detector 42 and a pair of second obstacle detectors 44A and 44B mounted to the power unit 14. The first obstacle detector 42 is spaced apart from the second obstacle detectors 44A and 44B along a vertical axis VA of the vehicle 10 defining a vertical direction, i.e., the second obstacle detectors 44A and 44B are located below (closer to the ground than) the first obstacle detector 42, see FIG. 1. The second obstacle detectors 44A and 44B are spaced apart from each other along a horizontal axis HA of the vehicle 10 defining a horizontal direction, see FIG. 2.

The first obstacle detector 42 may comprise a sweeping laser sensor capable of detecting objects, for example, in first, second, and third zones Z1, Z2, Z3 (also referred to herein as scan zones or detection zones), which first, second, and third zones Z1, Z2, Z3 may comprise planar zones, see FIGS. 1 and 2. The second zone Z2 may comprise a "stop zone", and the first and third zones Z1 and Z3 may comprise left and right "steer bumper zones", such as the stop zone and the left and right steer bumper zones described in U.S. Pat. No. 8,452,464, issued May 28, 2013, entitled "STEER CORRECTION FOR A REMOTELY OPERATED MATERIALS HANDLING VEHICLE", the entire disclosure of which is incorporated by reference herein. It is noted that the first obstacle detector 42 may be capable of detecting objects in additional or fewer zones than the three zones Z1, Z2, Z3 illustrated. In one exemplary detection zone configuration, any or all of the detection zones may be used as disclosed in U.S. Pat. No. 9,002,581 issued Apr. 7, 2015 and entitled "OBJECT TRACKING AND STEER MANEUVERS FOR MATERIALS HANDLING VEHICLES", the entire disclosure of which is incorporated by reference herein.

The second obstacle detectors 44A and 44B may comprise point laser sensors that are capable of detecting objects between one or more of the zones Z1, Z2, Z3 of the first obstacle detector 42 and the vehicle 10, i.e., underneath one or more of the zones Z1, Z2, Z3, as illustrated in FIG. 1, and/or past the zones Z1, Z2, Z3, and are preferably capable of at least detecting objects underneath the second zone Z2. The second obstacle detectors 44A and 44B are thus capable of detecting objects located in a non-detect zone DZ of the first obstacle detector 42, see FIG. 1, i.e., which non-detect zone DZ is defined as an area below the zones Z1, Z2, Z3 and thus not sensed by the first obstacle detector 42. Hence, the first obstacle detector 42 functions to detect objects located along a path of travel of the power unit 14 beyond the non-detect zone DZ, while the second obstacle detectors 44A and 44B function to sense objects along the path of travel of the power unit 14 in the non-detect zone DZ, which is located just in front of the vehicle 10, as shown in FIG. 1.

Additional sensor configurations and/or detection zones may be used, such as discussed in the various patents and patent applications incorporated by reference herein.

The vehicle 10 shown in FIGS. 1 and 2 further includes a charging station 50 that comprises an additional component of the system 8 and that is provided for charging a rechargeable power source of the remote control device 32. Additional details in connection with the charging station 50 will be described below.

Control System for Remote Operation of a Low Level Order Picking Truck

Referring to FIG. 3, a block diagram illustrates a control arrangement for integrating remote control commands with the vehicle 10. A receiver 102, which may be a Bluetooth Low Energy (BLE) radio, for example, is provided for receiving commands issued by the remote control device 32. The receiver 102 passes the received control signals to a controller 103, which implements the appropriate response to the received commands and may thus also be referred to herein as a master controller. In this regard, the controller 103 is implemented in hardware and may also execute software (including firmware, resident software, microcode, etc.). Furthermore, aspects of the present invention may take the form of a computer program product embodied in one or more computer readable medium(s) having computer readable program code embodied thereon. For example, the vehicle 10 may include memory that stores the computer program product, which, when implemented by a processor of the controller 103, implements steer correction as described more fully herein.

Thus, the controller 103 may define, at least in part, a data processing system suitable for storing and/or executing program code and may include at least one processor coupled directly or indirectly to memory elements, e.g., through a system bus or other suitable connection. The memory elements can include local memory employed during actual execution of the program code, memory that is integrated into a microcontroller or application specific integrated circuit (ASIC), a programmable gate array or other reconfigurable processing device, etc.

The response implemented by the controller 103 in response to wirelessly received commands, e.g., via a wireless transmitter 178 of the remote control device 32 (to be discussed below) and sent to the receiver 102 on the vehicle 10, may comprise one or more actions, or inaction, depending upon the logic that is being implemented. Positive actions may comprise controlling, adjusting or otherwise affecting one or more components of the vehicle 10. The controller 103 may also receive information from other inputs 104, e.g., from sources such as the presence sensors 22, the obstacle sensors 40, switches, load sensors, encoders and other devices/features available to the vehicle 10 to determine appropriate action in response to the received commands from the remote control device 32. The sensors 22, 40, etc. may be coupled to the controller 103 via the inputs 104 or via a suitable truck network, such as a control area network (CAN) bus 110.

In an exemplary arrangement, the remote control device 32 is operative to wirelessly transmit a control signal that represents a first type signal such as a travel command to the receiver 102 on the vehicle 10. The travel command is also referred to herein as a "travel signal", "travel request" or "go signal". The travel request is used to initiate a request to the vehicle 10 to travel, e.g., for as long as the travel signal is received by the receiver 102 and/or sent by the remote control device 32, by a predetermined amount, e.g., to cause the vehicle 10 to advance or jog in a first direction by a limited travel distance, or for a limited time. The first direction may be defined, for example, by movement of the vehicle 10 in a power unit 14 first, i.e., forks 16 to the back, direction. However, other directions of travel may alternatively be defined. Moreover, the vehicle 10 may be controlled to travel in a generally straight direction or along a previously determined heading. Correspondingly, the limited travel distance may be specified by an approximate travel distance, travel time or other measure.

Thus, a first type signal received by the receiver 102 is communicated to the controller 103. If the controller 103 determines that the travel signal is a valid travel signal and that the current vehicle conditions are appropriate (explained in greater detail in U.S. Pat. No. 9,082,293, which is already incorporated by reference herein), the controller 103 sends a signal to the appropriate control configuration of the vehicle 10 to advance and then stop the vehicle 10. Stopping the vehicle 10 may be implemented, for example, by either allowing the vehicle 10 to coast to a stop or by initiating a brake operation to cause the vehicle 10 to brake to a stop.

As an example, the controller 103 may be communicably coupled to a traction control system, illustrated as a traction motor controller 106 of the vehicle 10. The traction motor controller 106 is coupled to a traction motor 107 that drives at least one steered wheel 108 of the vehicle 10. The controller 103 may communicate with the traction motor controller 106 so as to accelerate, decelerate, adjust and/or otherwise limit the speed of the vehicle 10 in response to receiving a travel request from the remote control device 32. The controller 103 may also be communicably coupled to a steer controller 112, which is coupled to a steer motor 114 that steers at least one steered wheel 108 of the vehicle 10. In this regard, the vehicle 10 may be controlled by the controller 103 to travel an intended path or maintain an intended heading in response to receiving a travel request from the remote control device 32.

As yet another illustrative example, the controller 103 may be communicably coupled to a brake controller 116 that controls vehicle brakes 117 to decelerate, stop or otherwise control the speed of the vehicle 10 in response to receiving a travel request from the remote control device 32. Still further, the controller 103 may be communicably coupled to other vehicle features, such as main contactors 118, and/or other outputs 119 associated with the vehicle 10, where applicable, to implement desired actions in response to implementing remote travel functionality.

According to various aspects of the present invention, the controller 103 may communicate with the receiver 102 and with the traction motor controller 106 to operate the vehicle 10 under remote control in response to receiving travel commands from the associated remote control device 32. Moreover, the controller 103 may be configured to perform various actions if the vehicle 10 is traveling under remote control in response to a travel request and an obstacle is detected in one or more of the detection zone(s) $Z_1$, $Z_2$, $Z_3$. In this regard, when a travel signal is received by the controller 103 from the remote control device 32, any number of factors may be considered by the controller 103 to determine whether the received travel signal should be acted upon to initiate and/or sustain movement of the vehicle 10.

Correspondingly, if the vehicle 10 is moving in response to a command received by the remote control device 32, the controller 103 may dynamically alter, control, adjust or otherwise affect the remote control operation, e.g., by stopping the vehicle 10, changing the steer angle of the vehicle 10, or taking other actions. Thus, the particular vehicle features, the state/condition of one or more vehicle features, vehicle environment, etc., may influence the manner in which the controller 103 responds to travel requests from the remote control device 32.

The controller 103 may refuse to acknowledge a received travel request depending upon predetermined condition(s), e.g., that relate to environmental or operational factor(s). For example, the controller 103 may disregard an otherwise valid travel request based upon information obtained from one or more of the sensors 22, 40. As an illustration, according to various aspects of the present invention, the controller 103 may optionally consider factors such as whether an operator is on the vehicle 10 when determining whether to respond to a travel command from the remote control device 32. As noted above, the vehicle 10 may comprise at least one presence sensor 22 for detecting whether an operator is positioned on the vehicle 10. In this regard, the controller 103 may be further configured to respond to a travel request to operate the vehicle 10 under remote control when the presence sensor(s) 22 designate that no operator is on the vehicle 10. Thus, in this implementation, the vehicle 10 cannot be operated in response to wireless commands from the remote control device 32 unless the operator is physically off of the vehicle 10. Similarly, if the obstacle sensors 40 detect that an object, including the operator, is adjacent and/or proximate to the vehicle 10, the controller 103 may refuse to acknowledge a travel request from the remote control device 32. Thus, in an exemplary implementation, an operator must be located within a limited range of the vehicle 10, e.g., close enough to the vehicle 10 to be in wireless communication range (which may be limited to set a maximum distance of the operator from the vehicle 10). Other arrangements may alternatively be implemented.

Any other number of reasonable conditions, factors, parameters or other considerations may also/alternatively be implemented by the controller 103 to interpret and take action in response to received signals from the transmitter 178. Other exemplary factors are set out in greater detail in U.S. Provisional Patent Application Ser. No. 60/825,688, entitled "SYSTEMS AND METHODS OF REMOTELY CONTROLLING A MATERIALS HANDLING VEHICLE;" U.S. patent application Ser. No. 11/855,310, entitled "SYSTEMS AND METHODS OF REMOTELY CONTROLLING A MATERIALS HANDLING VEHICLE" now U.S. Pat. No. 9,082,293; U.S. patent application Ser. No. 11/855,324, entitled "SYSTEMS AND METHODS OF REMOTELY CONTROLLING A MATERIALS HANDLING VEHICLE" now U.S. Pat. No. 8,072,309; U.S. Provisional Patent Application Ser. No. 61/222,632, entitled "APPARATUS FOR REMOTELY CONTROLLING A MATERIALS HANDLING VEHICLE;" U.S. patent application Ser. No. 12/631,007, entitled "MULTIPLE ZONE SENSING FOR MATERIALS HANDLING VEHICLES" now U.S. Pat. No. 9,645,968; and U.S. Provisional Patent Application Ser. No. 61/119,952, entitled "MULTIPLE ZONE SENSING FOR REMOTELY CONTROLLED MATERIALS HANDLING VEHICLES;" the disclosures of which are each already incorporated by reference herein.

Upon acknowledgement of a travel request, the controller 103 interacts with the traction motor controller 106, e.g., directly or indirectly, e.g., via a bus such as the CAN bus 110 if utilized, to advance the vehicle 10. Depending upon the particular implementation, the controller 103 may interact with the traction motor controller 106 and optionally, the steer controller 112, to advance the vehicle 10 for as long as a travel control signal is received. Alternatively, the controller 103 may interact with the traction motor controller 106 and optionally, the steer controller 112, to advance the vehicle 10 for a period of time or for a predetermined distance in response to the detection and maintained actuation of a travel control on the remote control device 32. Still further, the controller 103 may be configured to "time out"

and stop the travel of the vehicle 10 based upon a predetermined event, such as exceeding a predetermined time period or travel distance regardless of the detection of maintained actuation of a corresponding control on the remote control device 32.

The remote control device 32 may also be operative to transmit a second type signal, such as a "stop signal", designating that the vehicle 10 should brake and/or otherwise come to rest. The second type signal may also be implied, e.g., after implementing a "travel" command, e.g., after the vehicle 10 has traveled a predetermined distance, traveled for a predetermined time, etc., under remote control in response to the travel command. If the controller 103 determines that a wirelessly received signal is a stop signal, the controller 103 sends a signal to the traction motor controller 106, the brake controller 116 and/or other truck component to bring the vehicle 10 to a rest. As an alternative to a stop signal, the second type signal may comprise a "coast signal" or a "controlled deceleration signal" designating that the vehicle 10 should coast, eventually slowing to rest.

The time that it takes to bring the vehicle 10 to a complete rest may vary, depending for example, upon the intended application, the environmental conditions, the capabilities of the particular vehicle 10, the load on the vehicle 10 and other similar factors. For example, after completing an appropriate jog movement, it may be desirable to allow the vehicle 10 to "coast" some distance before coming to rest so that the vehicle 10 stops slowly. This may be achieved by utilizing regenerative braking to slow the vehicle 10 to a stop. Alternatively, a braking operation may be applied after a predetermined delay time to allow a predetermined range of additional travel to the vehicle 10 after the initiation of the stop operation. It may also be desirable to bring the vehicle 10 to a relatively quicker stop, e.g., if an object is detected in the travel path of the vehicle 10 or if an immediate stop is desired after a successful jog operation. For example, the controller 103 may apply predetermined torque to the braking operation. Under such conditions, the controller 103 may instruct the brake controller 116 to apply the brakes 117 to stop the vehicle 10.

Also shown in FIG. 3 is the on-vehicle charging station 50 that can communicate with the controller 103. As will be explained in more detail below, the charging station 50 can be used to charge a rechargeable power source 180 of the wireless remote control device 32. The charging station 50 may be located on a side portion of the vehicle 10, for example, proximate to the operator's station 20 near manual driving controls of the vehicle 10 as shown in FIGS. 1 and 2, or on a side panel of the power unit 14.

A pairing system 34 can utilize a close range system to wirelessly communicate with a compatible close range system on the wireless remote control device 32. Using the pairing system 34, a vehicle 10 and wireless remote control device 32 can be "paired" such that a vehicle 10 will transmit and receive messages from only its paired wireless remote control device 32. In addition to, or as an alternative to close range or other types of wireless communications, such as near-field communication (NFC), the pairing system 34 can also use physical contacts that allow electrical communication between the remote control device 32 and the vehicle 10, at least for the initial pairing procedure. For example, electrical contacts of the charging station 50 used for charging the remote control device 32 could be used for pairing the vehicle 10 to the remote control device 32, as will be described in greater detail herein. The pairing system 34 includes components that physically implement the communication method (e.g., Bluetooth, NFC, BLE, Wi-Fi, etc.) used to send messages and includes components that programmatically exchange information in an agreed upon protocol to establish and maintain a pairing. Thus, the pairing system 34 includes a device that can execute programmable instructions to implement a predetermined algorithm and protocol to accomplish pairing operations.

In FIG. 3, the charging station 50, the receiver 102, and the pairing system 34 are depicted as distinct functional blocks. However, one of ordinary skill will recognize that two or more of these components can be combined in a single element to provide a multi-function device.

System

As noted above, the vehicle 10 (including the charging station 50) and the remote control device 32 form the system 8 in accordance with an aspect of the present invention. The remote control device 32 and the charging station 50 will now be described in turn.

With reference to FIGS. 4-8, the remote control device 32 according to this embodiment is a finger-mounted device, although the remote control device 32 could take other forms, such as a glove-mounted device, a wrist-mounted device, a lanyard-mounted device, etc. The remote control device 32 may be mountable over one finger, two fingers, or more than two fingers of the operator.

The remote control device 32 illustrated in FIGS. 4-8 comprises a polymeric rigid base 172 (see FIG. 6) and a polymeric rigid upper housing 174. The base 172 and upper housing 174 are coupled together via any suitable manner and define an internal area 176 for receiving internal components of the remote control device 32, including a wireless communication system 456 including a wireless transmitter 178, such as the wireless transmitter 178 described above with reference to FIG. 3, and a rechargeable power source 180. In one exemplary embodiment, the wireless transmitter 178 comprises a model BGM121 manufactured by SiLabs. It is noted that the terms "transmitter" and "receiver" as used herein are intended to mean a device capable of one-way communication, i.e., the device only transmits or receives signals, or a device capable of two-way communication, such as a transceiver, which both transmits and receives signals.

The rechargeable power source 180 may be a super capacitor, a high capacity battery, etc. For example, an AVX supercapacitor, model SCCR20E335PRB can be used, which has a rated voltage of 3V and a capacitance of 3.3 F. The rechargeable power source 180 is small enough to fit within the internal area 176 while also having enough capacity on a substantially full charge to yield a use period of the remote control device 32 of at least two hours, at least four hours, at least eight hours, or more. A use period of up to eight hours may be preferable to correspond with an eight-hour working shift for an operator.

A supercapacitor (also called a supercap or ultracapacitor) is a high-capacity capacitor with capacitance values much higher than other capacitors but, typically with lower voltage limits that bridge the gap between electrolytic capacitors and rechargeable batteries. They typically store 10 to 100 times more energy per unit volume or mass than electrolytic capacitors, can accept and deliver charge much faster than batteries, and tolerate many more charge and discharge cycles than rechargeable batteries. Because supercapacitors can be used in applications requiring many rapid charge/discharge cycles, some embodiments of the remote control device 32 can include a supercapacitor as the rechargeable power source 180. In embodiments of the present invention, the current supplied to the supercapacitor can be limited to about 2 A and can accomplish charging to a full charge in about 2 seconds or less. Regardless of the specific type of rechargeable power source 180 used, embodiments of the present invention contemplate recharging the rechargeable power source 180 to a desired amount, such as to a full charge state, or to a charge state less than a substantially full charge state (as will be discussed in detail herein) via the charging station 50 within a desired charging period. The power supplied to the rechargeable power source 180 by the charging station 50 may be varied in accordance with the capacity of the rechargeable power source 180, the desired charge amount, and/or the desired charging period, as will be discussed in greater detail herein.

Figure 6:
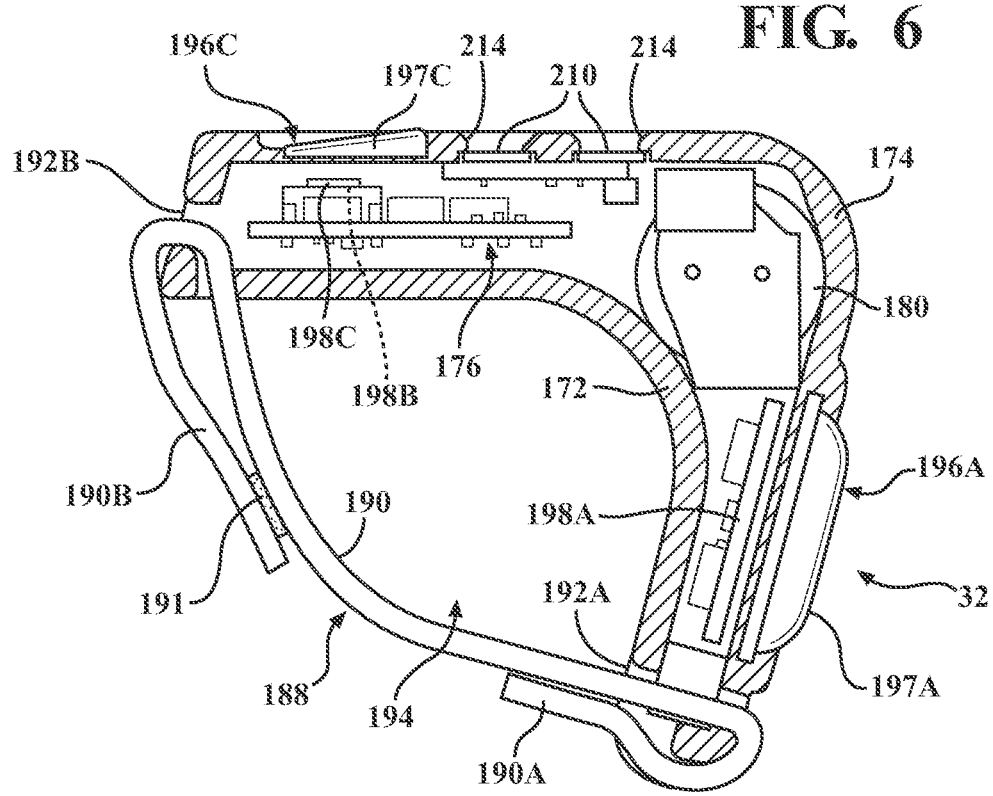
Figure 7:
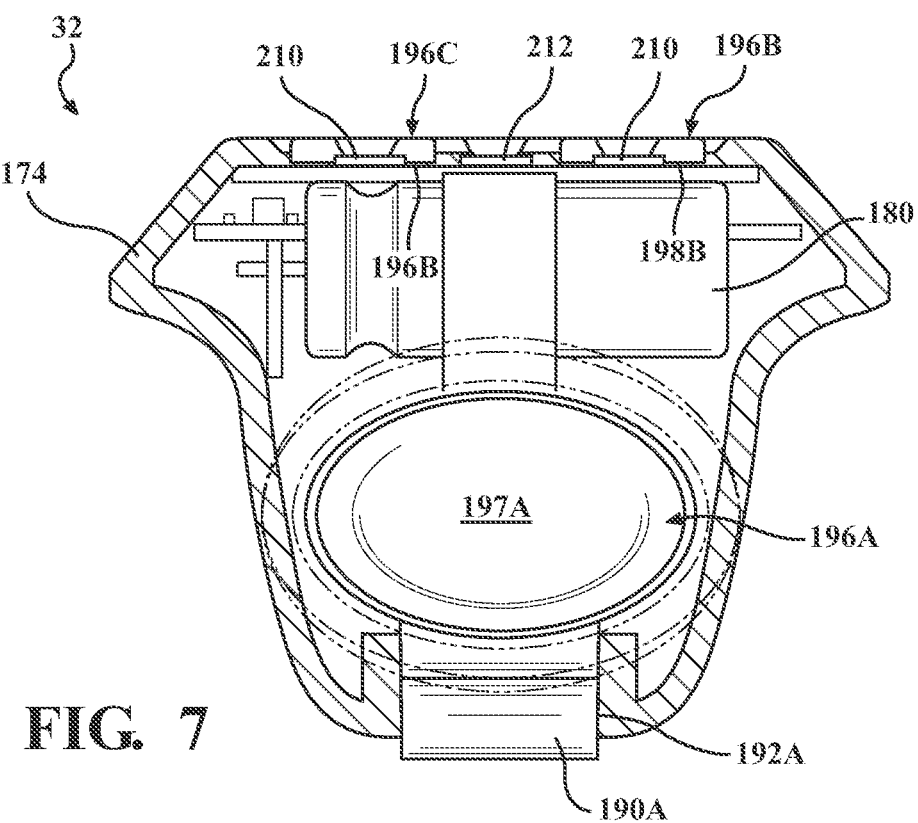

With reference to FIG. 6, the remote control device 32 further comprises securing structure 188 for securing the remote control device 32 to one or more fingers of the operator's hand. The securing structure 188 in the embodiment shown in FIG. 6 comprises a holding strap 190 that includes, for example, hook and loop tape fasteners 191 to secure the holding strap 190 to a single finger, e.g., the index finger, of the operator. The remote control device 32 is provided with first and second slots 192A and 192B located on opposed ends of the remote control device 32 for receiving the holding strap 190.

The holding strap 190 shown in FIG. 6 defines a first finger receiving area 194 for receiving the single finger OF (see FIGS. 1 and 2) of an operator using the remote control device 32. Both right and left hand versions of the remote control device 32 may be created. The remote control device 32 is releasably held on the operator's index finger via the holding strap 190. In one exemplary embodiment, a first end 190A of the holding strap 190 is threaded through the first slot 192A and a second end 190B of the holding strap 190 is threaded through the second slot 192B. The first end 190A of the holding strap 190 may be permanently fastened to the rigid base 172, e.g., via stitching or gluing, while the second end 190B of the holding strap 190 may be releasably inserted through the second slot 192B and doubled back such that the hook and loop tape fasteners 191 are engaged with one another to fasten the holding strap 190 to the operator's finger. The holding strap 190 can be adjusted to accommodate fingers of different sizes or such that the remote control device 32 could be worn over a glove (not shown). It is noted that other types of holding straps 190 may be used.

The remote control device 32 further comprises at least one control, depicted in FIGS. 4-8 as first, second, and third controls 196A-C. The controls 196A-C each comprise a button 197A-C and a two-state switch 198A-C located underneath the corresponding button 197A-C. The switches 198A-C are communicably coupled to the wireless communication system 456, such that actuation of each one of the controls 196A-C causes the wireless transmitter 178 to wirelessly transmit a respective request to the vehicle 10. In the exemplary remote control device 32 depicted in FIGS. 4-8: the first control 196A comprises a travel button 197A that, when pressed, causes the wireless transmitter 178 to wirelessly transmit a request for the vehicle 10 to travel across a floor surface; the second control 196B comprises a horn button 197B that, when pressed, causes the wireless transmitter 178 to wirelessly transmit a request for the vehicle 10 to sound a horn/audible alarm; and the third control 196C comprises a brake button 197C that, when pressed, causes the wireless transmitter 178 to wirelessly transmit a request for the vehicle to stop (if moving under wireless control) and, optionally, power down.

The remote control device 32 is compact, and substantially the entirety of the remote control device 32 is mountable and positioned directly over the index finger of the operator. Hence, interference of the operator performing working tasks caused by wearing the remote control device 32 is minimal or non-existent. The remote control device 32 is durable and long lasting since the rigid base 172 and the upper housing 174 are preferably formed from a durable and rigid polymeric material, such as acrylonitrile butadiene styrene (ABS), polycarbonate or nylon. The rigid base 172 and the upper housing 174 define a durable, generally non-flexible and rigid structure.

An operator can easily actuate the travel button 197A manually via his/her thumb to cause the wireless transmitter 178 to wirelessly transmit at least a first type signal designating a travel request or command to the vehicle 10. It is contemplated that the travel request may result in the vehicle 10 traveling for as long as the operator holds down the travel button 197A, or by a predetermined distance or for a predetermined amount of time. The horn button 197B and the brake button 197C can be actuated by the operator's opposite hand, for example.

Figure 4:
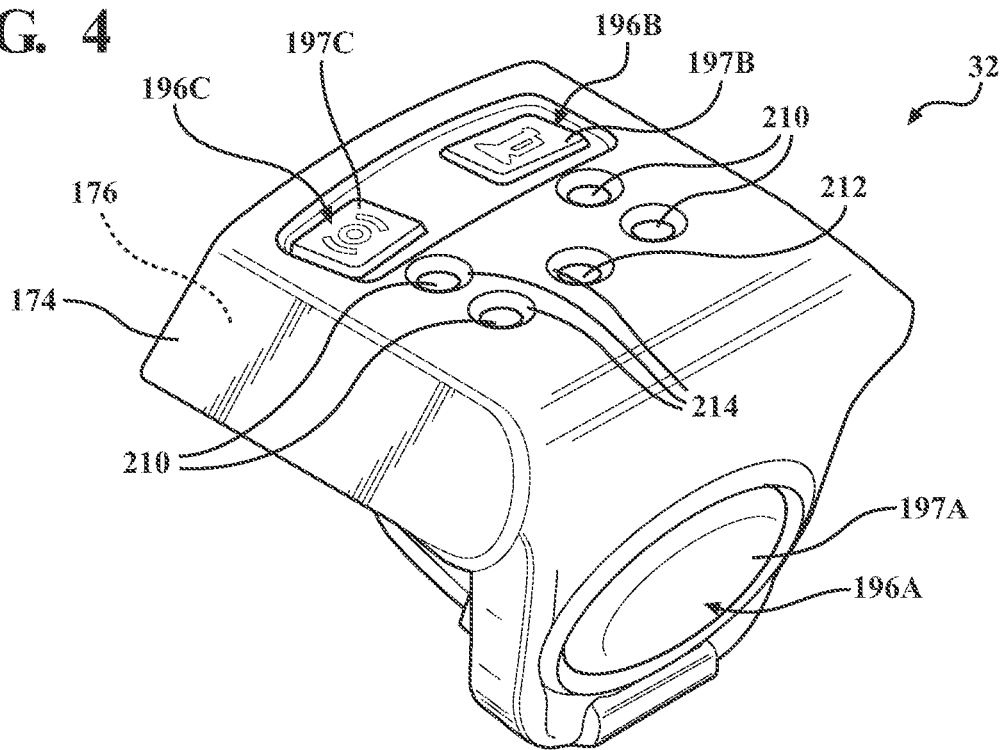
FIGS. 4-7 are views of a remote control device according to various aspects of the present invention.
Figure 5:
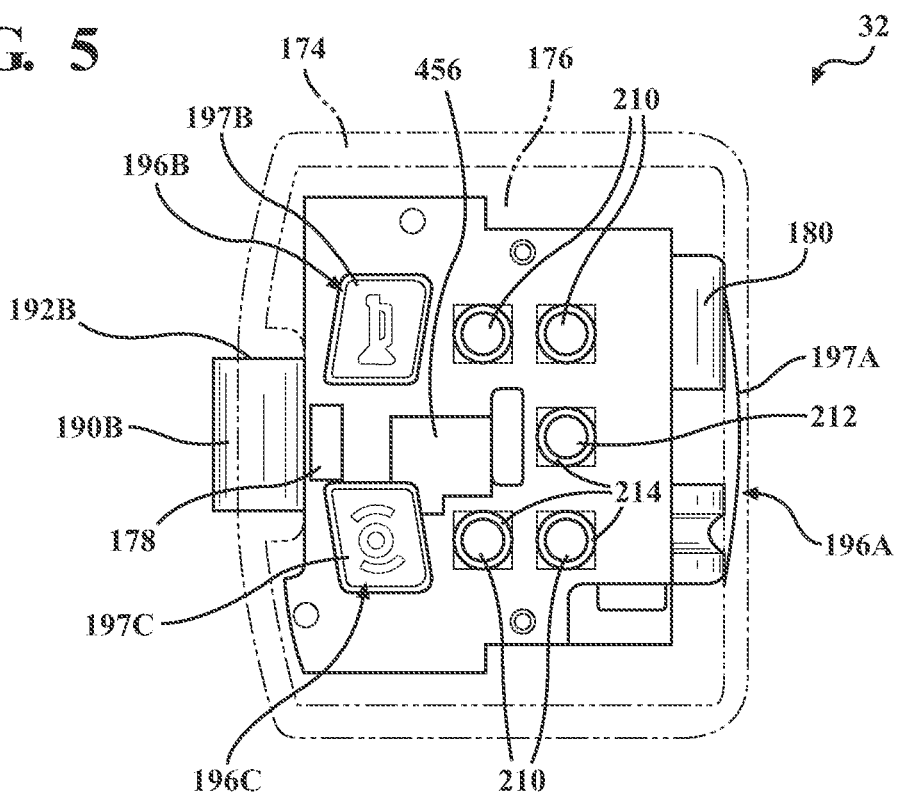

As shown in FIGS. 4 and 5, the remote control device 32 further comprises one or more charging contacts 210, it being noted that additional or fewer charging contacts 210 than the four shown may be used, e.g., one charging contact 210 or two or more charging contacts 210 may be used. Additionally, the remote control device 32 further includes one or more sensors in the form of first presence contacts 212, illustrated in FIGS. 4 and 5 as a single first presence contact 212 located intermediate the four charging contacts 210. The charging and first presence contacts 210, 212 may be arranged within openings 214 formed in an outer surface of the upper housing 174 of the remote control device 32. The tops of the charging and first presence contacts 210, 212 may be positioned below the outer surface of the upper housing, i.e., the charging and first presence contacts 210, 212 may be recessed within the openings 214, which may prevent damage to the charging and first presence contacts 210, 212 due to accidental contact. It is noted that other configurations for the number, orientation, and placement of the charging contacts 210 and the first presence contact(s) 212 could be used without departing from the scope and spirit of the invention.

Figure 8A:
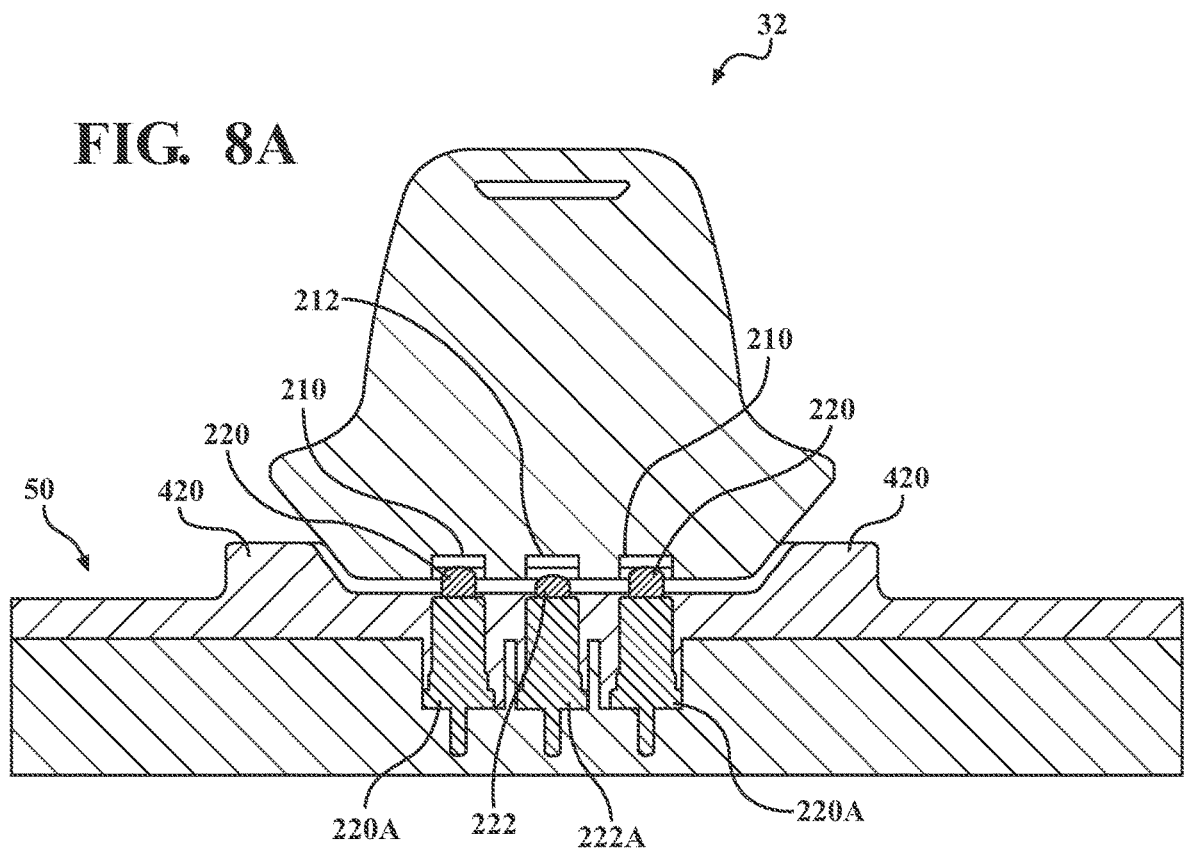
FIGS. 8A and 8B are cut away views showing a remote control device being engaged with a charging station according to various aspects of the present invention.
Figure 8B:
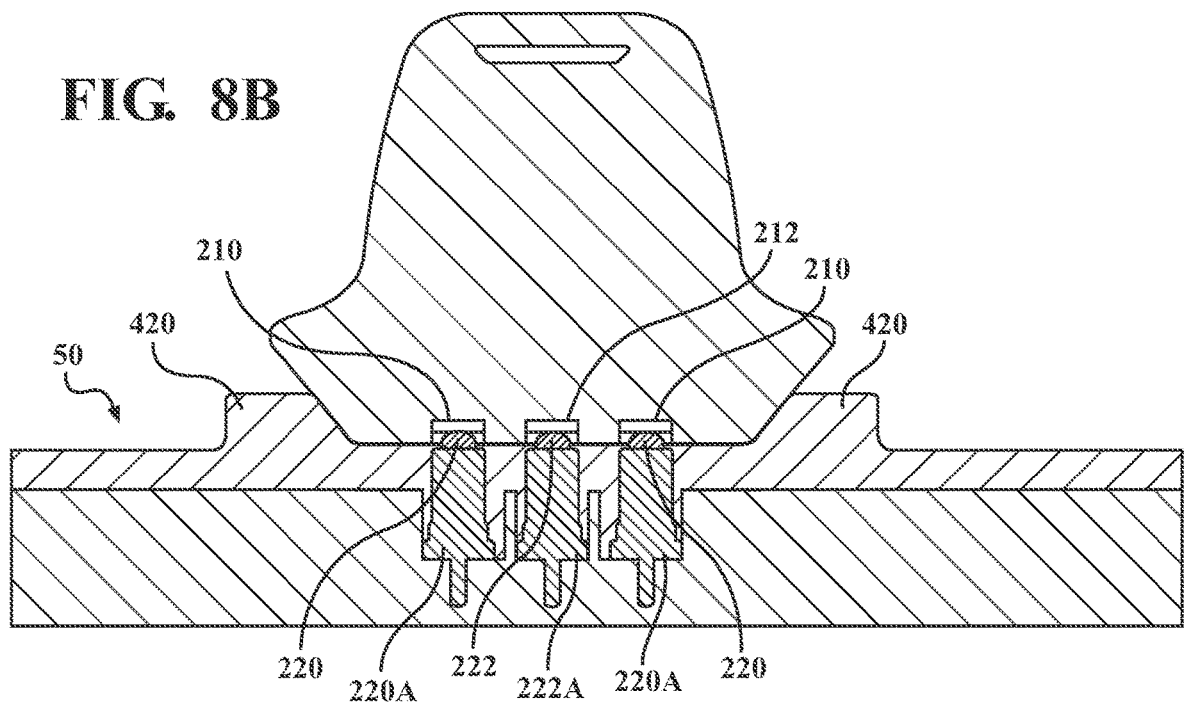

In embodiments, the charging contacts 210 mate or engage with elements, e.g., electrical contacts or charging elements 220 of the on-vehicle charging station 50 (to be discussed below), and the first presence contact 212 mates or engages with a complementary second sensor in the form of a second presence contact 222, such as a switch, pogo pin or pressure pin, for example, of the on-vehicle charging station 50, as shown in FIGS. 8A and 8B and will be described in more detail herein. It is noted that one or more of the charging contacts 210 and corresponding charging elements 220 may be provided for redundancy. In one example, the four charging contacts 210 illustrated in FIGS. 4-7 and four charging elements 220 illustrated in FIGS. 12-14 could be set up as two pairs of redundant contacts/elements 210/220, where charging of the rechargeable power source 180 (as discussed below) is enabled as long as one charging contact 210 from each pair is engaged with and in electrical communication with its corresponding charging element 220.

Embodiments of the present invention also contemplate contactless, or induction, charging in which the rechargeable power source 180 of the remote control device 32 can be charged by the remote control device 32 being in close proximity to, or on the surface of, a compatible induction charging station (not shown). Such an induction charging station may be located, for example, in a driving or steering control of the vehicle 10 such that the rechargeable power source 180 may be charged while the operator is manually driving the vehicle 10 from the operator's station 20.

Figure 9:
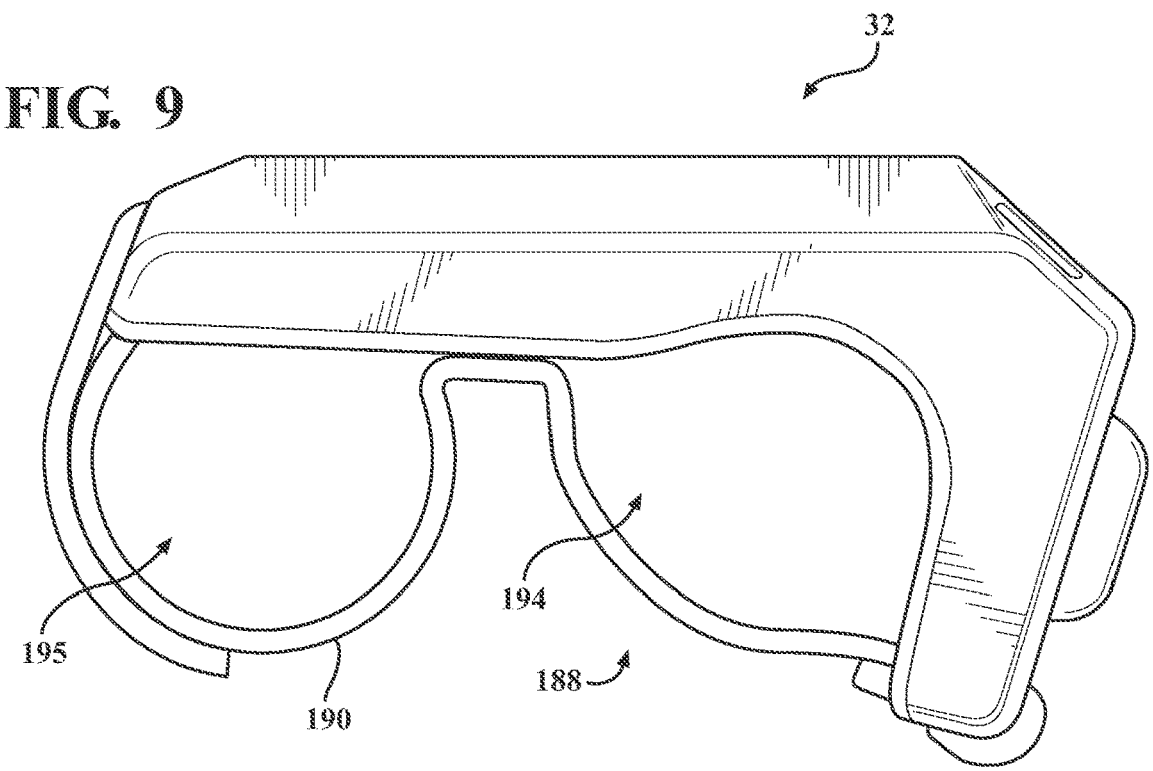
FIGS. 9 and 10 are views of another remote control device according to various aspects of the present invention.
Figure 10:
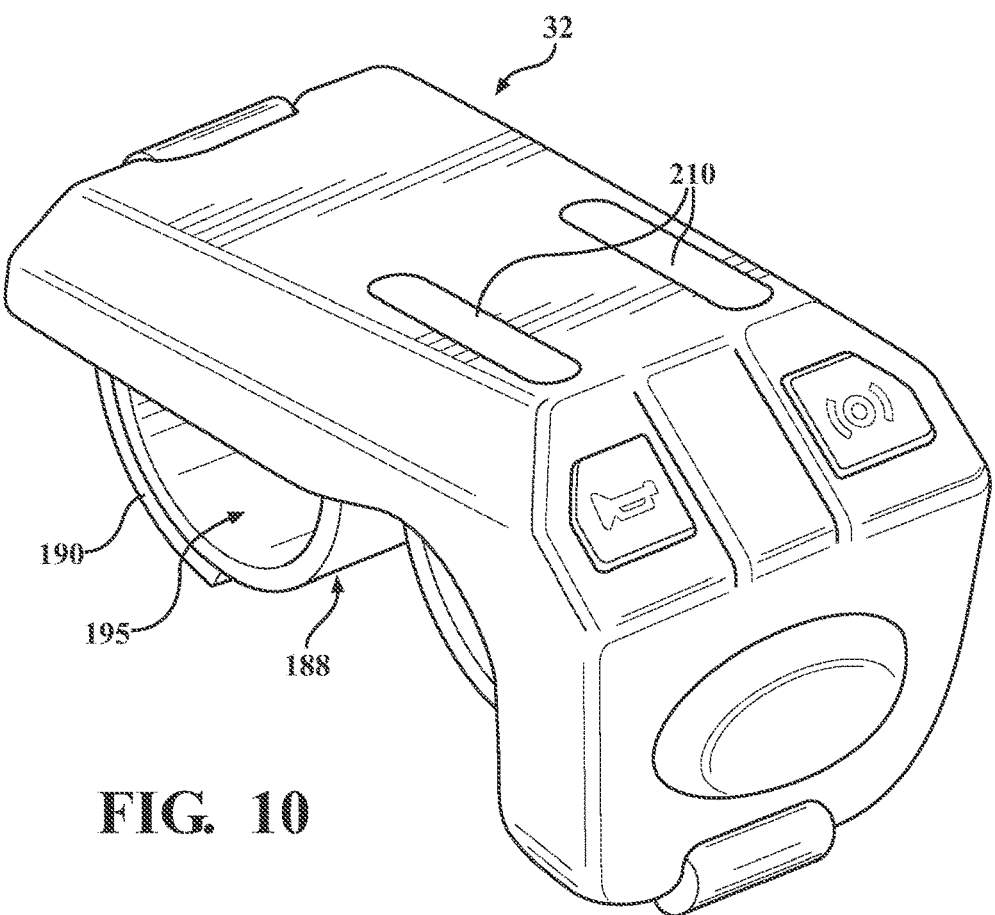

FIGS. 9 and 10 illustrate another exemplary remote control device 32, where like reference numbers correspond to similar components to those listed above for FIGS. 4-8. The remote control device 32 according to this embodiment is intended as a two-finger design, i.e., the securing structure 188 in the embodiment shown in FIGS. 9 and 10 comprises a holding strap 190 that defines first and second finger receiving areas 194, 195 for receiving the index and middle fingers of an operator using the remote control device 32. The remote control device 32 according to FIGS. 9 and 10 includes two charging contacts 210 instead of four charging contacts 210 in the remote control device 32 of FIGS. 4-8. The remaining components of the remote control device 32 of FIGS. 9 and 10 may be generally the same as the remote control device 32 of FIGS. 4-8 and thus will not be described in detail herein.

Figure 11:
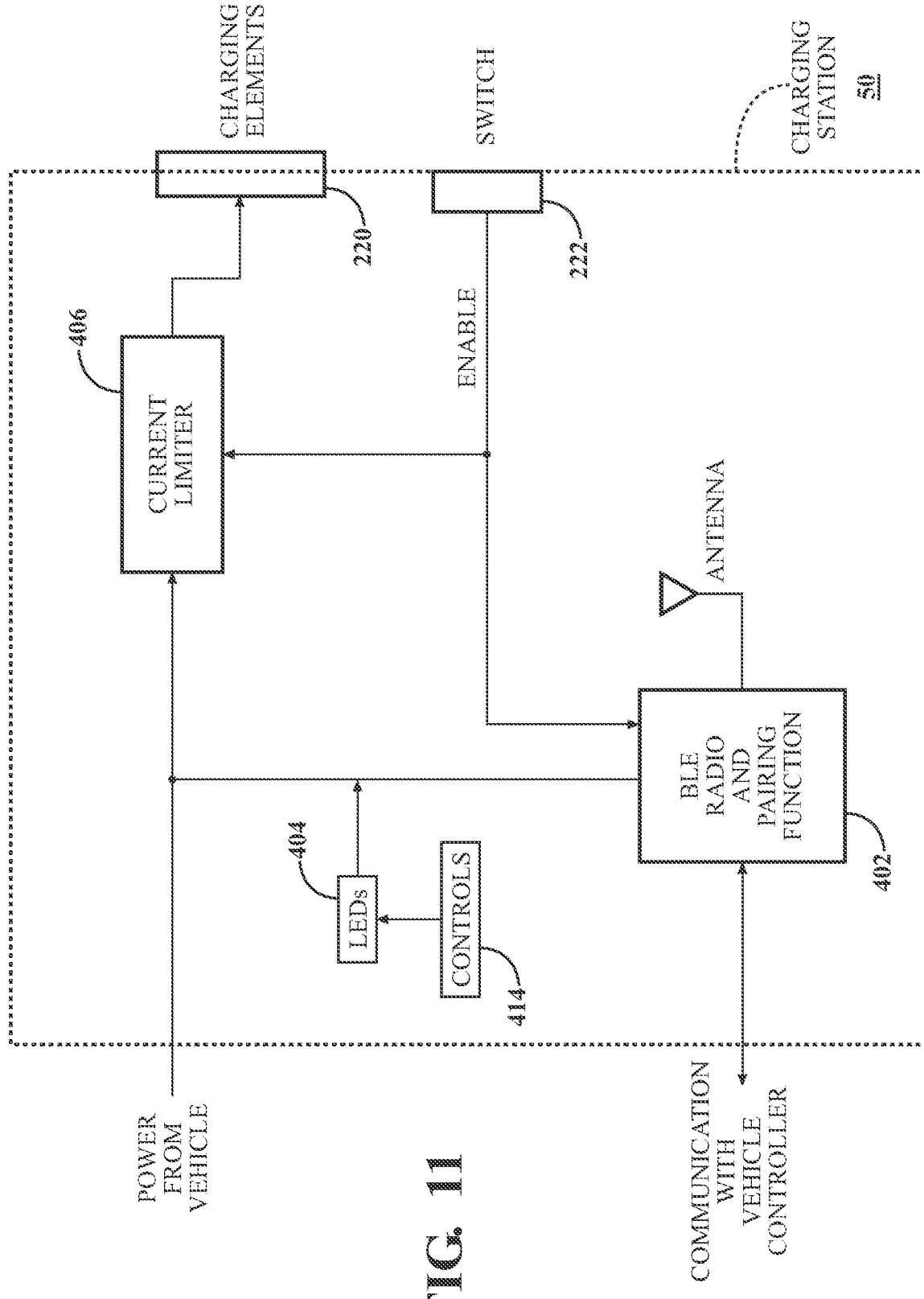
FIG. 11 is a schematic diagram of several components of a charging station according to various aspects of the present invention.

FIG. 11 provides a functional block-level diagram of a vehicle charging station 50 in accordance with the principles of the present invention in which the pairing system 34 is incorporated into the charging station 50. As explained in more detail below, the charging station 50 can include the receiver 102, e.g., a Bluetooth Low Energy (BLE) radio 402 that can communicate with the vehicle's controller 103. Although not shown, the communication can be through the vehicle's CAN bus and, thus, the charging station 50 can include a CAN bus interface. The charging station 50 can also include one or more light emitting diodes (LEDs) 404 or other visual indicators that help convey information to an operator. For example, one LED may be used to indicate that a remote control device 32 is presently coupled with the charging station 50. Other LEDs may indicate a current state of charge of the remote control device's rechargeable power source 180. A current limiter 406 or other protection circuitry can be provided that helps ensure a remote control device 32 is safely recharged as the current limiter 406 allows the voltage from the vehicle's power source to be provided to the charging elements 220 of the charging station 50 for charging the remote control device's rechargeable power source 180. These charging elements 220 interface with the charging contacts 210 of the remote control device 32 and provide the electrical connection between the vehicle's power source and the rechargeable power source 180 of the remote control device 32. The second presence contact 222 engages with the first presence contact 212 to detect when a remote control device 32 is physically connected to the charging station 50 such that the charging contacts 210 are engaged with the charging elements 220. According to embodiments, upon the second presence contact 222 being engaged by the first presence contact 212, the pairing process is initiated.

It is noted that the first and second presence contacts 212, 222 can respectively be provided on either the remote control device 32 or the charging station 50. That is, while the second presence contact 222 is illustrated on the charging station 50 and the first presence contact 212 on the remote control device 32, the second presence contact 222 could be located on the remote control device 32 and the first presence contact 212 could be located on the charging station 50.

The relationship between the second presence contact 222 and the charging elements 220 is such that the charging contacts 210 of the remote control device 32 and the charging elements 220 of the charging station 50 are in contact with one another before the second presence contact 222 engages the first presence contact 212 when a charging procedure is being initiated, see FIG. 8A, which shows that the height of the second presence contact 222 is less than the height of the charging elements 220, the heights measured with respect to top surfaces of element housings 220A and a second presence contact housing 222A from which the respective charging elements 220 and second presence contact 222 extend. The supply of power from the charging station 50 to the remote control device 32 via the charging elements/charging contacts 220/210 is only initiated after the second presence contact 222 engages the first presence contact 212. During a charging procedure, the charging contacts 210 of the remote control device 32 are engaged with the charging elements 220 of the charging station 50, and the second presence contact 222 is engaged with the first presence contact 212, thus enabling the supply of power from the charging station 50 to the remote control device 32 via the charging elements/charging contacts 220/210, see FIG. 8B. After the rechargeable power source 180 is charged to the desired amount, e.g., fully charged or charged to a desired amount less than fully charged as described herein, the supply of power from the charging station 50 to the remote control device 32 via the charging elements/charging contacts 220/210 is cut off. In the case that the remote control device 32 is removed from the charging station 50 before the rechargeable power source 180 is charged to the desired amount, as the remote control device 32 is removed from the charging station 50, the second presence contact 222 disengages from the first presence contact 212 prior to the charging elements 220 disengaging from the charging contacts 210. The supply of power from the charging station 50 to the rechargeable power source 180 of the remote control device 32 via the charging elements/charging contacts 220/210 is cut off when the second presence contact 222 disengages from the first presence contact 212. This arrangement is intended to prevent arcing between the charging elements 220 and the charging contacts 210. Using the first presence contact 212 and second presence contact 222 in the form of a pogo pin provides the following advantages: a precise control of the relative heights of the second presence contact 222 and the charging elements 220; a small footprint, a good seal, e.g., to prevent moisture from entering the second presence contact housing 222A from around the second presence contact 222; and it allows for the differentiation between the first presence contact 212 and a foreign object, such as a piece of metal, which prevents electrical current from flowing into such a foreign object if it were to be placed in contact with the second presence contact 222 and one or more of the charging elements 220.

As an alternative to the presence contacts 212, 222 being used to initiate the supply of power from the charging station 50 to the remote control device 32, a separate switch may be present that the operator engages to begin a charging operation. In one specific embodiment using induction charging, such a switch can be incorporated into the vehicle's steering control, such that the operator's gripping of the steering control is detected and charging is subsequently enabled.

Controls 414 for providing controlling signals to operate the LEDs 404 can be from various sources. While the remote control device 32 is operated within range of the charging station 50, the controller 103 can receive information about the state of charge of the rechargeable power source 180 and drive the display of the LEDs 404 to convey this information utilizing a CAN bus interface, for example. When the remote control device 32 is coupled with the charging station 50 the LEDs 404 can be used to convey a) that a remote control device 32 is physically connected to charging station 50, b) that there is a remote control device 32 presently paired with the controller 103 of the vehicle, c) the progress/charging state of a current charging operation, and/or d) the charging state of the rechargeable power source 180. The information for items c) and d) may be sent to the charging station 50 by the remote control device 32, for example, over a Bluetooth Low Energy (BLE) connection, which BLE connection will be discussed in greater detail below. According to one aspect, since the pairing and charging processes are performed very quickly, the progress/charging state of a current charging operation may not be displayed by the LEDs 404. The remote control device 32 may store its charging profile and then send the charging profile to the charging station 50, e.g., over the BLE connection, after the remote control device 32 is removed from the charging station 50, wherein the charging profile may be evaluated, for example, by the controller 103, to determine if a proper charge of the rechargeable power source 180 occurred. The second presence contact 222 can also send control signals to controls 414 that indicate whether charging contacts 210 of the remote control device 32 are properly coupled with corresponding charging elements 220 of the charging station 50.

Figure 12:
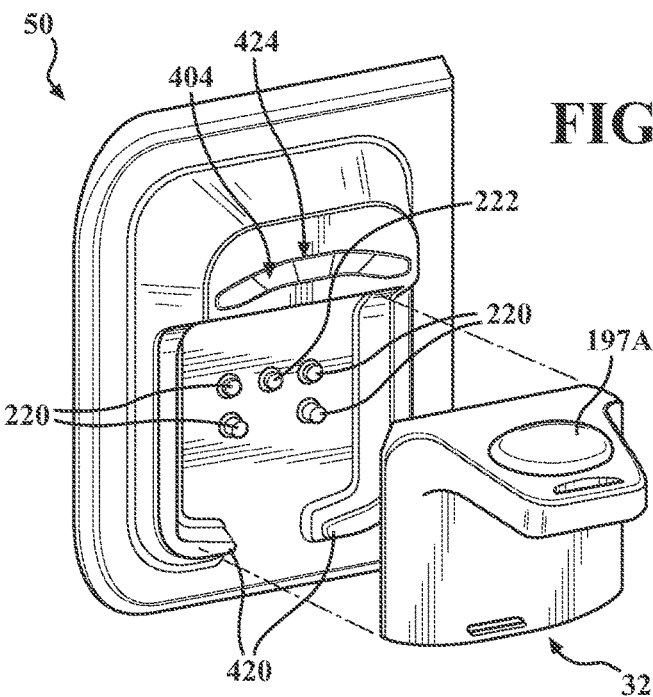
FIGS. 12-14 are views showing a remote control device and a charging station according to various aspects of the present invention.
Figure 13:
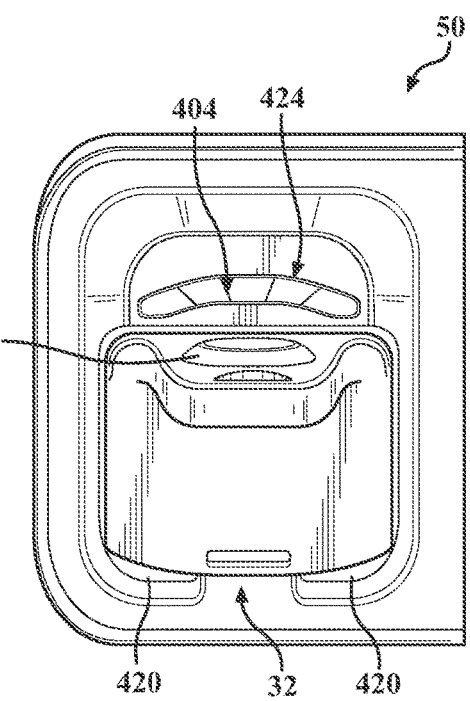
Figure 14:
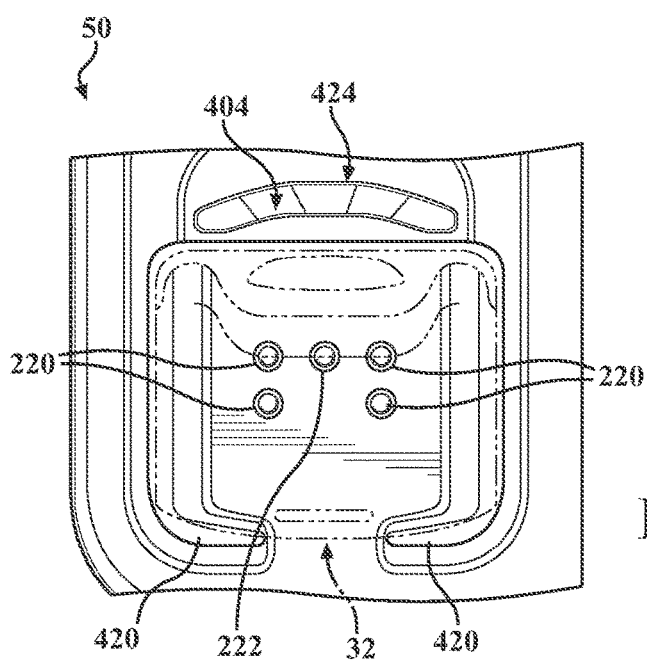

FIGS. 12-14 illustrate other features of the charging station 50 located at the vehicle 10. The charging station 50 can include one or more physical protrusions or guide structures 420 that help guide the remote control device 32 into correct alignment so that the station's charging elements 220 are aligned with the charging contacts 210 of the remote control device 32, i.e., the guide structure(s) 420 align the remote control device 32 in the proper orientation for charging the rechargeable power source 180. In FIG. 12, a single guide structure 420 including a plurality of guide surfaces is shown. The guide structure(s) 420 can be placed around the location of the charging elements 220 and can be shaped or slanted so that the remote control device 32 is physically guided to correct alignment as the operator places the remote control device 32 in the charging station 50.

In FIG. 13, the LEDs 404 include a visual indicator 424 that indicates a remote control device 32 is attached to the charging station 50. The visual indicator 424 may illuminate, flash, or progressively fill as a first color to indicate that the remote control device 32 is attached to the charging station 50, and as a second color or fully filled first color to indicate that the remote control device 32 has been paired to the vehicle controller 103, i.e., the visual indicator 424 may use the second color or fully filled first color to serve as a pairing indicator that confirms the establishment of communication between the remote control device 32 and the vehicle 10. Additionally, according to one optional aspect of the invention, the LEDs 404 may flash, illuminate as a second color, or provide some other visual indication after establishment of communication between the remote control device 32 and the vehicle 10 as a cue for the operator to perform an action as a test to confirm that the remote control device 32 is functional and can communicate to the vehicle 10, such as by pressing the horn button 197B and brake button 197C concurrently. It is understood that separate indicators may be used for the purposes of indicating that a remote control device 32 is attached to the charging station 50 and to indicate that the remote control device 32 has been paired to the vehicle 10, as opposed to a single indicator that can serve both functions.

The LEDs 404 can further serve as an indicator to identify the progress of a recharging operation when the remote control device 32 is attached. When the remote control device 32 is not attached to the charging station 50, the LEDs 404 may serve as an indicator to indicate the present state of charge of the rechargeable power source 180 of the remote control device 32. Thus, the LEDs 404 can indicate the state of charge of the rechargeable power source 180 both when charging the rechargeable power source 180 at the charging station 50 and during use of the remote control device 32, i.e., while the operator is using the remote control device 32 to assist in performing work operations. In one exemplary embodiment, the LEDs 404 can comprise a series of lights, each light representing a level of the state of charge of the rechargeable power source 180.

In FIGS. 12 and 14, an exemplary location of the second presence contact 222 is shown within the charging station 50. It is noted that the remote control device 32 illustrated in FIGS. 12-14 is the single-finger embodiment of FIGS. 4-7. It is also noted that the charging contacts 210 and first presence contact 212 of the single-finger and the two-finger embodiments could be arranged to mirror one another. Thus, the same charging station 50 could be used for instances of the single-finger or two-finger remote control devices 32.

The charging station 50 may be located at various locations on the vehicle 10. Its location should be such that it does not interfere with normal operation of the vehicle 10, but where it is accessible and convenient for the operator. In embodiments the charging station 50 is located in the operator's station 20 (see FIGS. 1 and 2, where the charging station 50 is located in the operator's station 20 but is also accessible from outside of the vehicle 10), on a surface of one of the sides of the vehicle 10, or, for the induction charging embodiment, within the steering control of the vehicle 10.

The charging station 50 may include a voltage regulator (not shown) that transforms the power from the vehicle 10 received by the charging station 50 into a regulated direct current (DC) voltage signal selected based on the charging characteristics of the rechargeable power source 180. For example, in an embodiment in which the rechargeable power source 180 is an AVX supercapacitor described above or equivalent device, a 3V DC (1%) supply voltage could be provided to the current limiter 406.

It is noted that the remote control device 32 is described herein as having an exemplary configuration and may be structurally modified without departing from the spirit and scope of the invention. For example, one or more components of the remote control device 32 may be combined in an integral component, or components may be substituted for alternate components that effect a similar/identical purpose.

In one embodiment, charging of the rechargeable power source 180 via the charging station 50 occurs when one or more charging contacts 210 engage a corresponding charging element 220 of the charging station 50. In some embodiments, at least two charging contacts 210 or at least four charging contacts 210 and corresponding charging elements 220 are present. In some embodiments, one or more pairs of charging contacts 210 are provided, wherein at least one charging contact 210 from each pair must engage a corresponding charging element 220 for charging to occur. As described above, at least one of the remote control device 32 and the charging station 50 can include a second presence contact 222, such as a switch, for example. The second presence contact 222 detects whether or not the at least one charging contact 210 is correctly engaged with the at least one corresponding charging element 220 for charging the rechargeable power source 180, wherein if a correct engagement is detected, the transfer of power to the rechargeable power source 180 is enabled by the charging station 50, and if a correct engagement is not detected, the transfer of power to the rechargeable power source 180 is not enabled by the charging station 50.

Furthermore, the arrangement of the remote control device 32 and the charging station 50 is configured such that the second presence contact 222 indicates the removal of the remote control device 32 from the charging station 50, which ceases the transfer of power to the rechargeable power source 180 from the charging station 50, before the at least one charging contact 210 is disengaged from the at least one corresponding charging element 220. Hence, the transfer of power from the charging station 50 to the rechargeable power source 180 is ceased before the at least one charging contact 210 is disengaged from the at least one corresponding charging element 220. This may be effected, for example, by setting the heights of the charging elements 220 and the second presence contact 222 as shown in FIG. 8A, wherein the charging elements 220 are pushed down into respective element housings 220A before the second presence contact 222 engages the first presence contact 212, as the remote control device 32 is inserted into the charging station 50.

Figure 15:
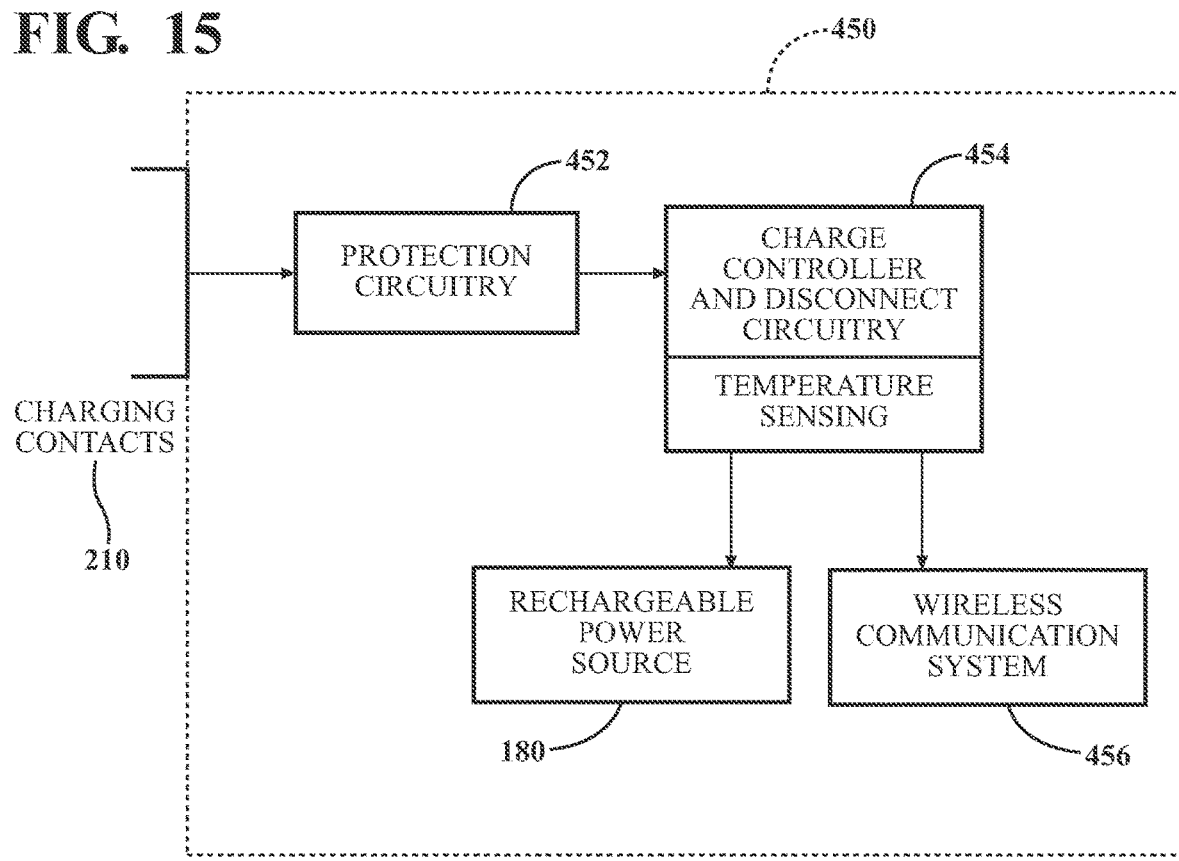
FIG. 15 is a schematic diagram of several components of a remote control device according to various aspects of the present invention.

FIG. 15 is a block-level functional diagram of the portions 450 of the remote control device 32 that relate to recharging the rechargeable power source 180. The other portions of the remote control device 32 such as, for example, those that relate to the mechanical actuators are not depicted in FIG. 15. As noted above, the remote control device 32 can include one or more charging contacts 210 that are configured to engage a corresponding charging element. In some embodiments, the charging elements may be the charging elements 220 of the charging station 50. In other embodiments, the charging elements may be those of an adapter that connects to a source of power to recharge the rechargeable power source 180.

The remote control device 32 can include protection circuitry 452 that limits electrical parameters such as voltage and/or current to be within expected operating ranges. Charge controller and disconnect circuitry 454 can monitor the voltage being received from the protection circuitry 452 as well as monitor the present state of charge of the rechargeable power source 180 in order to determine when to stop charging the rechargeable power source 180. For example, according to one exemplary embodiment, when the charge on the rechargeable power source 180 reaches 3V, the charge controller and disconnect circuitry 454 can operate to stop further charging. The charge controller and disconnect circuitry 454 can include temperature sensing capabilities or be connected to a temperature sensor so that the rechargeable power source 180 can be charged (or discharged) to different charging levels. In some embodiments, the rechargeable power source 180 is discharged to a high temperature state of charge, e.g., a less than fully charged state, if a sensed temperature is determined to be above a predetermined setpoint temperature. In one exemplary aspect of the invention, the sensed temperature is an ambient temperature. In an alternative aspect, the sensed temperature is a battery temperature. In some embodiments, the rechargeable power source 180 is charged at the charging station 50 to a predetermined charge level less than a 100% charge level if a sensed temperature is determined to be above a predetermined threshold temperature. This may help prevent damage to or degradation of the rechargeable power source 180.

As shown in FIG. 15, the remote control device 32 can include the wireless communication system 456 such as, for example, a BLE radio that can communicate with the BLE radio 402 of the charging station 50 via a BLE connection. The wireless communication system 456 and/or the BLE radio 402 of the charging station 50 can be configured, for example, to enter a low power mode when the remote control device 32 is being paired to the vehicle 10 and/or the rechargeable power source 180 of the remote control device 32 is being charged at the charging station 50, e.g., to ensure that only a remote control device 32 that is within a minimum distance, for example, less than five inches or less than three inches corresponding to the signal strength of the communications received from the remote control device 32, from the charging station 50 is recognized as the remote control device 32 to pair with. Additionally, if the BLE radio 402 of the charging station 50 were to identify two or more remote control devices 32 available for pairing and could not determine the correct one for pairing, the charging station 50 may not pair with any of the available remote control devices 32 and may require the operator to repeat the pairing process.

Associating/Pairing a Remote Control Device with a Vehicle

Figure 16:
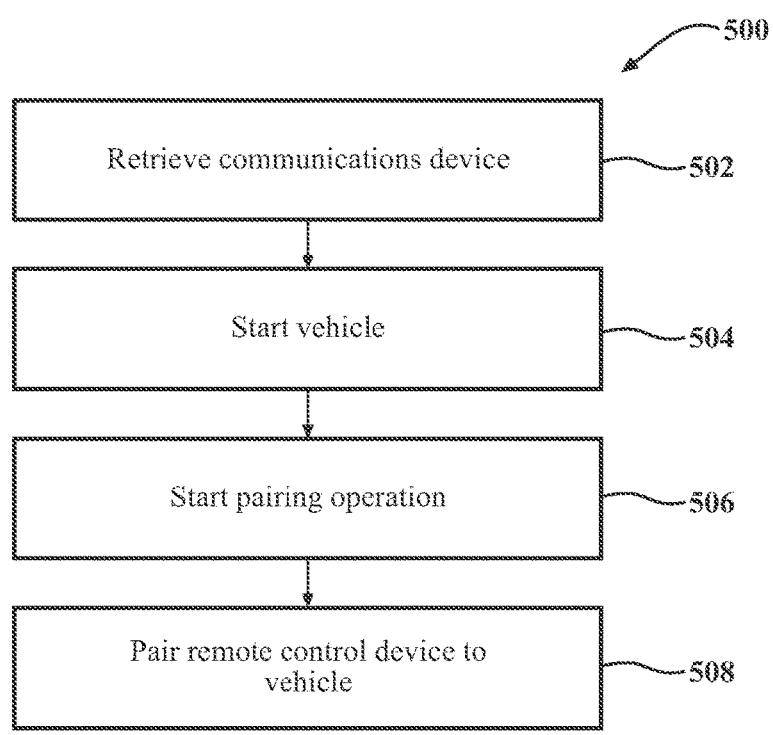
FIG. 16 depicts a method according to various aspects of the present invention.
Figure 17:
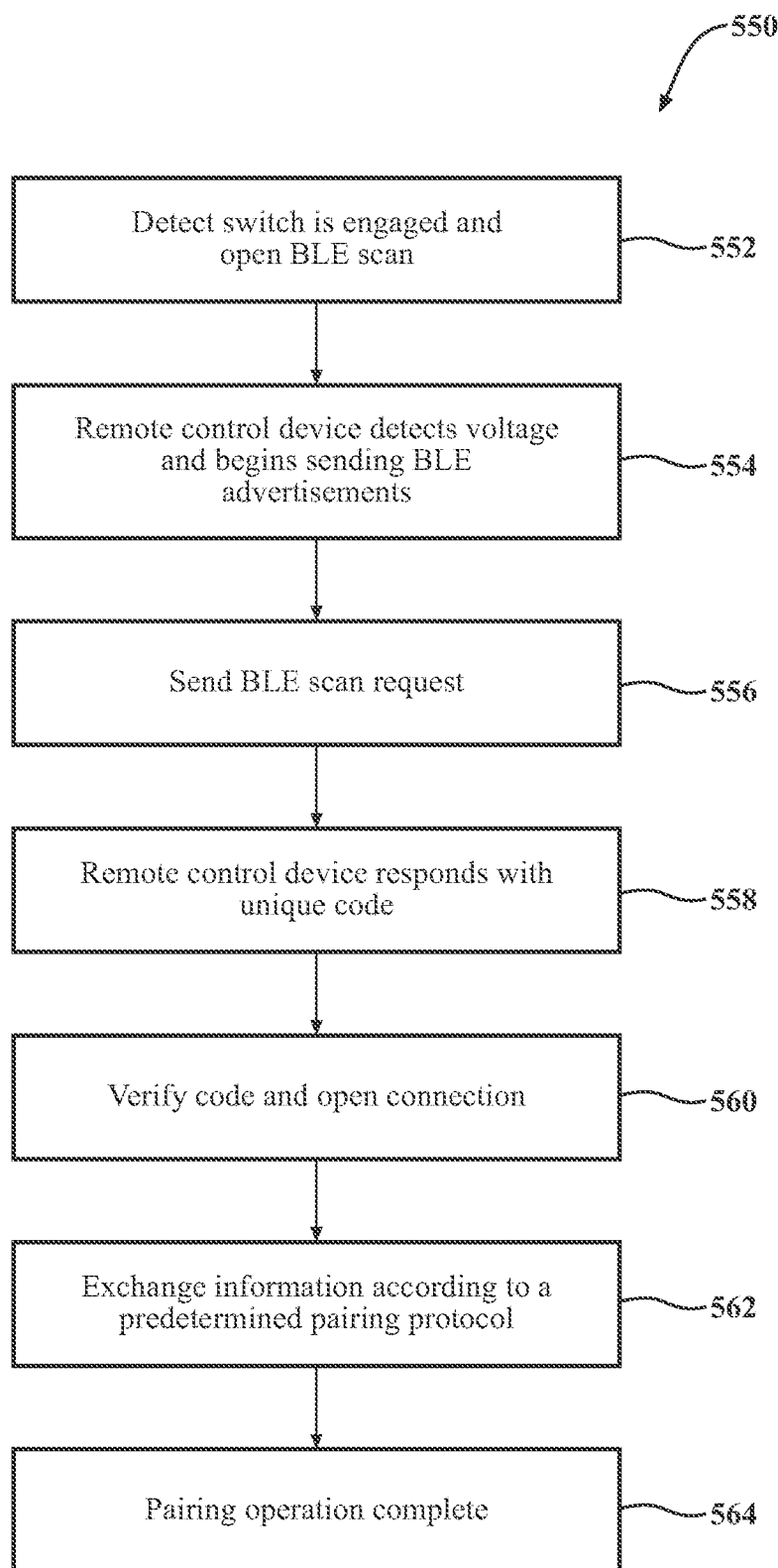
FIG. 17 depicts a pairing method according to various aspects of the present invention.
Figure 18:
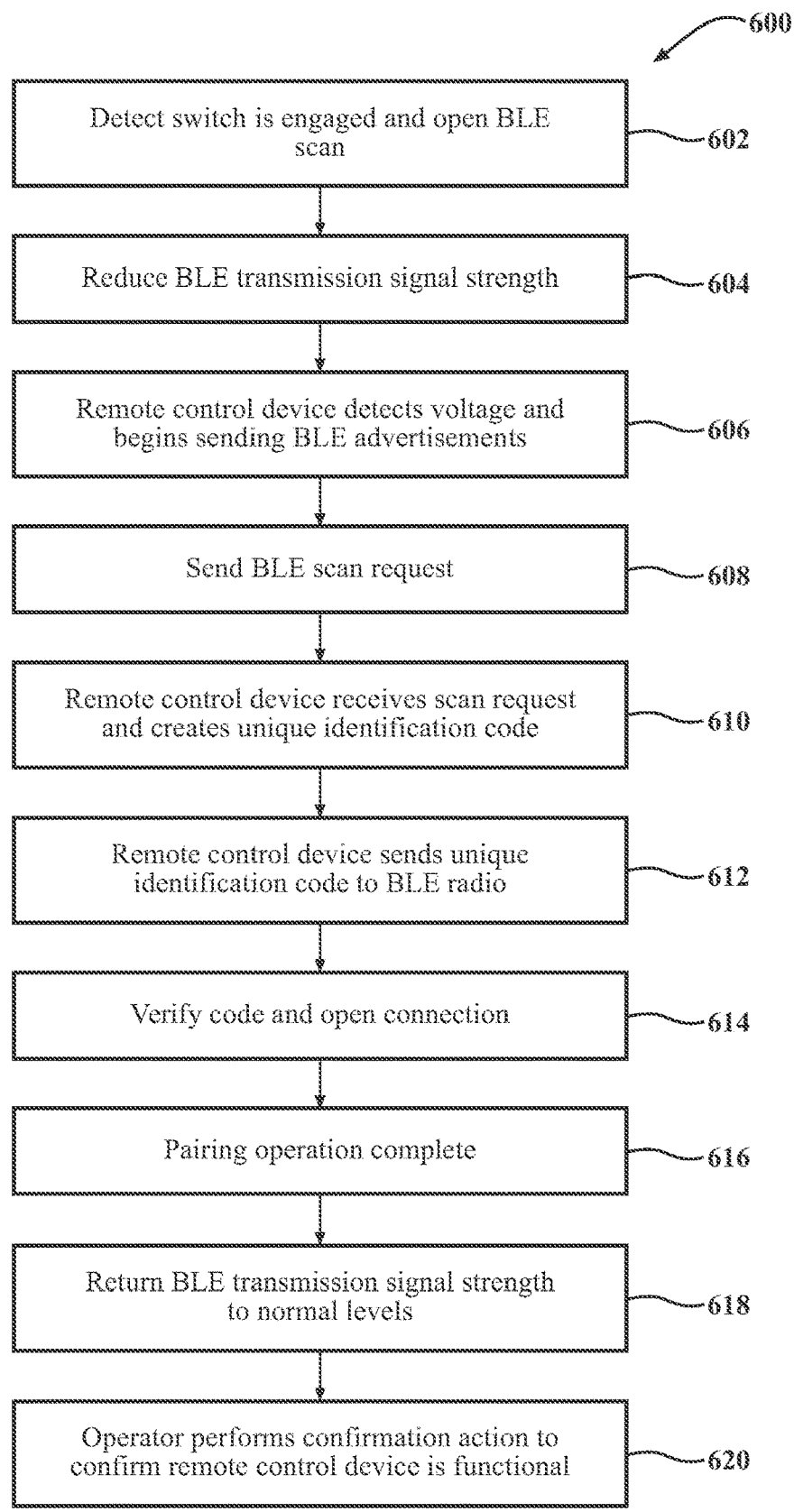
FIG. 18 depicts another pairing method according to various aspects of the present invention.

FIGS. 16-18 illustrate details of exemplary pairing processes in accordance with aspects of the invention. The remote control device 32 and vehicle 10 described above will be used in describing the pairing processes of FIGS. 16-18, but it is understood that other configurations/styles of the remote control device and vehicle could be paired together in accordance with the invention.

With reference to FIG. 16, the method 500 begins when the vehicle operator retrieves a remote control device 32 at 502. If the remote control device 32 is a wearable device as in the embodiments of FIGS. 4-8 and 9-10, the remote control device 32 is also donned by the operator, e.g., by securing the holding strap 190 to the operator's finger(s).

The vehicle operator then initiates a power on sequence to enable the vehicle 10 for operation, i.e., the operator starts the vehicle 10 at 504. In starting the vehicle 10, the operator may be required to provide login information to the vehicle 10. This information may be provided for by example, entering a personal identification number (PIN) into a control panel of the vehicle 10, by utilizing a key fob to provide the logon ID to the vehicle 10, or the operator's PIN may be encoded into a memory device, such as a radio-frequency identification (RFID) chip that is integrated into the remote control device 32.

The operator then starts a pairing operation with the vehicle 10 at 506, and the pairing system 34 then pairs the remote control device 32 used by the operator to the vehicle 10 at 508. Details of two exemplary pairing operations will be described in detail below with reference to FIGS. 17 and 18.

Once paired, the system 8 may provide a visual indication as such, e.g., by displaying a message on the vehicle 10, illuminating the LED 424 in a predetermined color, making an audible or visual queue, etc., that indicates that the pairing is complete.

In accordance with an aspect of the invention, the remote control device 32 may be unpaired from the vehicle 10 by powering down the vehicle 10. Other exemplary methods for unpairing the remote control device 32 from the vehicle 10 are described below in exemplary use cases.

The operation of two example pairing systems 34 are described in relation to FIGS. 17 and 18, respectively, which are flowcharts of example methods 550 and 600 for pairing a vehicle 10 and a remote control device 32 using a pairing system 34 that is part of the charging station 50 on board the vehicle 10. The descriptions of the methods 550 and 600 of FIGS. 17 and 18 begin as the remote control device 32 is inserted into the charging station 50, corresponding to step 506 of FIG. 16.

With reference to FIG. 17 and the method 550, at 552, when the second presence contact 222 is engaged by the first presence contact 212 as the remote control device 32 is inserted into the charging station 50, the BLE radio 402 of the charging station 50 is enabled so as to start scanning or listening for nearby BLE transmissions. As discussed above, the engagement of the second presence contact 222 by the first presence contact 212 can also cause the current limiter 406 to be enabled so that power from the vehicle 10 can be provided to the charging contacts 210 from the charging elements 220, which will cause the rechargeable power source 180 of the remote control device 32 to be recharged. Accordingly, pairing and charging operations are initiated by the single action of coupling the remote control device 32 with the charging station 50. In lieu of using BLE transmissions to pair the remote control device 32 to the vehicle controller 103, the remote control device 32 can be paired to the vehicle controller 103 by direct physical contact between, for example, the charging contacts 210 and the charging elements 220. Alternatively, dedicated pairing contacts (not shown) may be provided on the remote control device 32 and the vehicle 10, e.g., at the charging station 50, to pair the remote control device 32 to the vehicle controller 103 via direct physical contact. Such pairing contacts on the remote control device 32 and the vehicle 10 could be engaged with each other concurrently with the engagement of the charging contacts 210 to the charging elements 220, such that the pairing process could occur at the same time as the charging process. These pairing contacts could be used solely for performing message exchanges for pairing operations.

According to one aspect of the invention, where the pairing process is accomplished wirelessly, at 554, the remote control device 32 detects that a voltage is present at its charging contacts 210 and begins transmitting BLE advertisements via the wireless transmitter 178 indicating that the remote control device 32 is available for communicating with nearby devices.

In response, the BLE radio 402 of the charging station 50 can receive one of the transmitted advertisements and, at 556, issue a BLE scan request directed to the specific remote control device 32 associated with the received advertisement. If the BLE radio 402 of the charging station 50 were to identify two or more remote control devices 32 available for pairing, i.e., by receiving BLE advertisements from two or more remote control devices 32 while scanning or listening for nearby BLE transmissions, the vehicle 10 may not pair with any of the available remote control devices 32 and may require the operator to repeat the pairing process by removing the remote control device 32 from the charging station 50 and then reinserting the remote control device 32 into the charging station 50.

At 558, the remote control device 32 responds to the scan request with a unique identification code, which the BLE radio 402 receives.

At 560, the vehicle 10 verifies the code and instructs the BLE radio 402 to open a BLE connection and begin communicating with the remote control device 32.

At 562, once a communication session is established between the remote control device 32 and the charging station 50, a predetermined pairing algorithm can be implemented between the remote control device 32 and the charging station 50 to complete the pairing operation at 564. Once paired, the vehicle 10 wirelessly communicates with the remote control device 32, and the controller 103 of the vehicle 10 is capable of implementing wireless requests received from the remote control device 32.

In the example flowchart described above with respect to FIG. 17, a similar method can be performed to pair the remote control device 32 to the vehicle 10 using, for example, one or more of the charging elements 220 of the charging station 50 and the charging contacts 210 of the remote control device 32, or the dedicated pairing contacts noted above. Instead of the messages being transmitted and received via wireless/BLE radios, the same or equivalent types of messages can be communicated through the elements/contacts 220/210 via various protocols. The messages can be modulated and transmitted over one of the elements/contacts 220/210 providing the voltage. In either case, pairing of the vehicle 10 and the remote control device 32 can occur concurrently with the charging of the rechargeable power source 180 of the remote control device 32.

With reference to FIG. 18 and the method 600, at 602, when the second presence contact 222 is engaged by the first presence contact 212 as the remote control device 32 is inserted into the charging station 50, the BLE radio 402 of the charging station 50 is enabled with a predetermined, e.g., 1500 ms, timeout so as to start scanning or listening for nearby BLE transmissions from remote control devices 32. As discussed above, the engagement of the second presence contact 222 by the first presence contact 212 can also cause the current limiter 406 to be enabled so that power from the vehicle 10 can be provided to the charging contacts 210 from the charging elements 220, which will cause the rechargeable power source 180 of the remote control device 32 to be recharged. Accordingly, pairing and charging operations are initiated by the single action of coupling the remote control device 32 with the charging station 50 such that a component of the remote control device 32 physically contacts an element of the charging station 50. In lieu of using BLE transmissions to pair the remote control device 32 to the vehicle controller 103, the remote control device 32 can be paired to the vehicle controller 103 by direct physical contact between, for example, the charging contacts 210 and the charging elements 220. Alternatively, dedicated pairing contacts (not shown) may be provided on the remote control device 32 and the vehicle 10, e.g., at the charging station 50, to pair the remote control device 32 to the vehicle controller 103 via direct physical contact. Such pairing contacts on the remote control device 32 and the vehicle 10 could be engaged with each other concurrently with the engagement of the charging contacts 210 to the charging elements 220, such that the pairing process could occur at the same time as the charging process. These pairing contacts could be used solely for performing message exchanges for pairing operations.

At 604, the signal strength of the BLE transmissions between the wireless transmitter 178 and the BLE radio 402 may be decreased during the pairing process to help prevent any other nearby vehicles 10 from receiving the BLE transmissions from the remote control device 32.

According to one aspect of the invention, where the pairing process is accomplished wirelessly, at 606, the remote control device 32 detects that a voltage is present at its charging contacts 210 and begins transmitting BLE advertisements via the wireless transmitter 178 at a predetermined rate, e.g., a 20 ms rate with a predetermined timeout, e.g., 2000 ms timeout, indicating that the remote control device 32 is available for communicating with nearby vehicles 10. If the BLE radio 402 of the charging station 50 were to identify two or more remote control devices 32 available for pairing, i.e., by receiving BLE advertisements from two or more remote control devices 32 while scanning or listening for nearby BLE transmissions, the vehicle 10 may not pair with any of the available remote control devices 32 and may require the operator to repeat the pairing process by removing the remote control device 32 from the charging station 50 and then reinserting the remote control device 32 into the charging station 50.

The charging station 50 may provide power to charge the rechargeable power source 180 for up to about, e.g., 1000 ms before the BLE advertisements are sent from the wireless transmitter 178. Charging of the rechargeable power source 180 by the charging station 50 will be discussed in detail below.

In response to receiving the BLE advertisements from the wireless transmitter 178, the BLE radio 402 of the charging station 50 can, at 608, issue a BLE scan request.

At 610, the remote control device 32 receives the scan request from the BLE radio 402 and uses the address of the BLE radio 402 to create a unique identification code, which the remote control device 32 sends back to the BLE radio 402 at 612.

At 614, the vehicle 10 verifies the code and instructs the BLE radio 402 to open a BLE connection and begin communicating with the remote control device 32. It is noted that if the vehicle 10 receives more than one valid identification code during step 614, for example, if the vehicle 10 receives identification codes from two different remote control devices 32, pairing will fail, the vehicle 10 may issue an error message or other warning, and the operator will be required to repeat the pairing process by removing the remote control device 32 from the charging station 50 and then reinserting the remote control device 32 into the charging station 50.

At 616, once a communication session is established between the remote control device 32 and the charging station 50, the pairing operation may be completed, and the signal strength of the BLE transmissions between the wireless transmitter 178 and the BLE radio 402 may be increased back to their normal levels at 618.

The operator may be required to perform an action at 620 as a test to confirm that the remote control device 32 is functional and can communicate to the charging station 50, such as by pressing a button sequence on the remote control device 32, for example, by pressing the horn button 197B and brake button 197C concurrently.

Once paired, the vehicle 10 wirelessly communicates with the remote control device 32, and the controller 103 of the vehicle 10 is capable of implementing wireless requests received from the remote control device 32.

In accordance with aspects of the invention, a pairing period (which is a time period that it takes to establish communication between the remote control device 32 and the vehicle 10 and commences with steps 552/602 and ends with steps 564/616) may be less than the charging period (which is the time it takes to charge the rechargeable power source 180 to a desired charge state at the charging station 50), wherein charging of the rechargeable power source 180 will be discussed below in connection with FIGS. 21 and 22.

Figure 19:
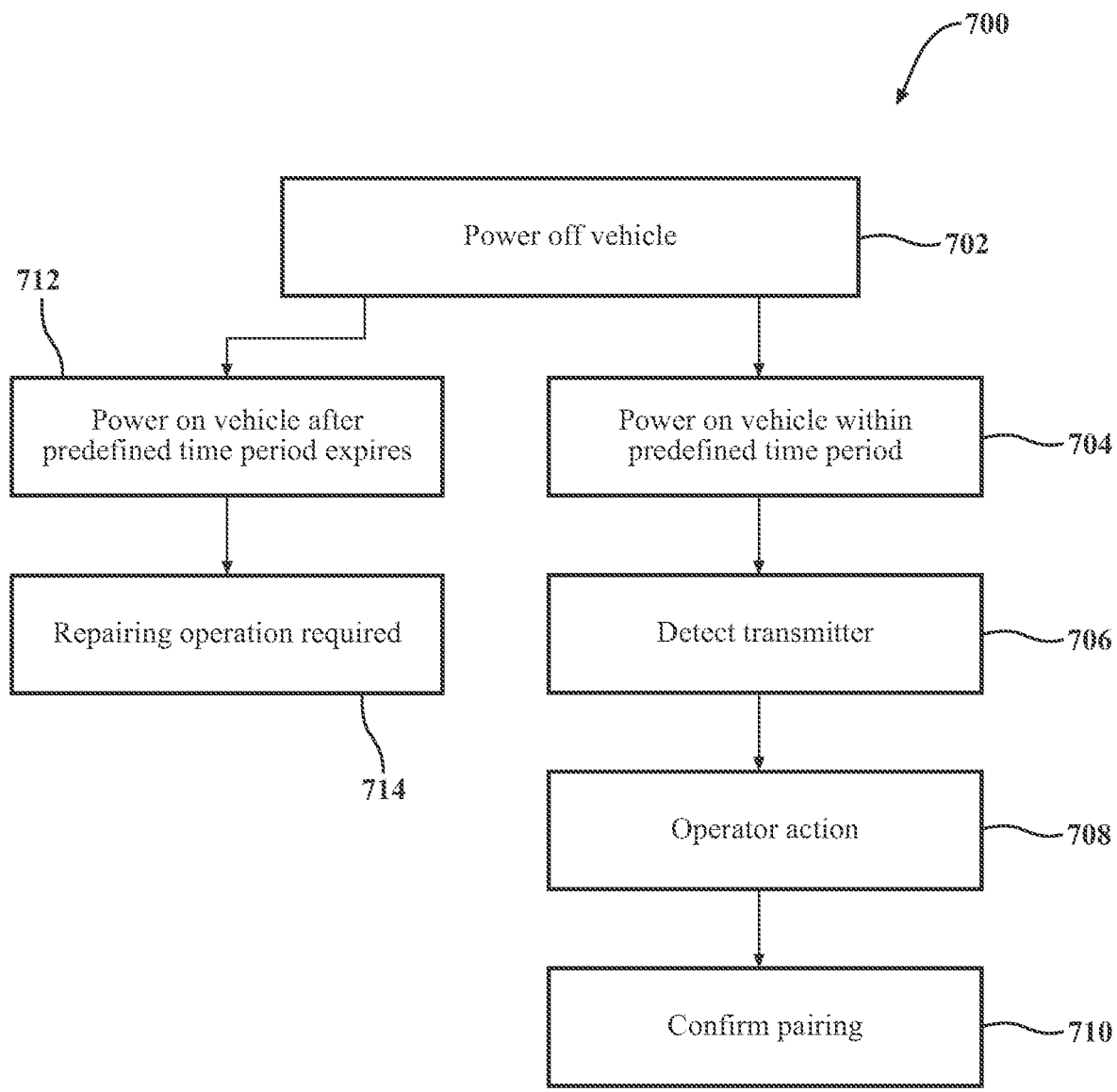
FIG. 19 depicts a method to re-pair a vehicle and a remote-control device according to various aspects of the present invention.

Referring to FIG. 19, in accordance with an additional aspect of the invention, after performing work operations, the vehicle operator may need to temporarily leave the vehicle 10, e.g., to take a break. An exemplary method 700 is illustrated for shutting down, restarting and re-pairing the vehicle 10 to the remote control device 32 used by the operator. The operator powers down the vehicle 10 at 702, so as to take a break, etc. After a time, the vehicle operator powers the vehicle 10 back up. During this time of the break, the remote control device 32 may continue to be paired with the vehicle 10 for up to a predefined time period. This state of maintained pairing between the vehicle 10 and the remote control device 32 may be indicated, for example, on a touchscreen (not shown) provided on the vehicle 10, by illuminating the LED 424 in a predetermined color, pattern, etc. Thus, if the operator powers the vehicle 10 back up before the predefined time period expires at 704, the vehicle 10 may detect the remote control device 32 at 706, wherein the remote control device 32 remains paired with the vehicle 10. In this regard, the operator may or may not have to take some type of action at 708, such as by pressing a button on the vehicle 10, e.g., on the charging station 50, on the touchscreen, etc., or by pressing a button sequence on the remote control device 32.

A successful operator action at 708 results in a confirmation of the pairing between the remote control device 32 and the vehicle 10 at 710. A visual queue may be displayed on the indicator (the LED 424) to signify the pairing, e.g., by illuminating the LED 424 in the second color noted above.

Alternatively, according to this aspect of the invention, if the operator powers the vehicle 10 back up after the predefined time period expires at 712, the operator may be required to re-pair the remote control device 32 to the vehicle 10 as with the initial pairing, e.g., by inserting the remote control device 32 into the charging station 50 at 714.

Figure 20:
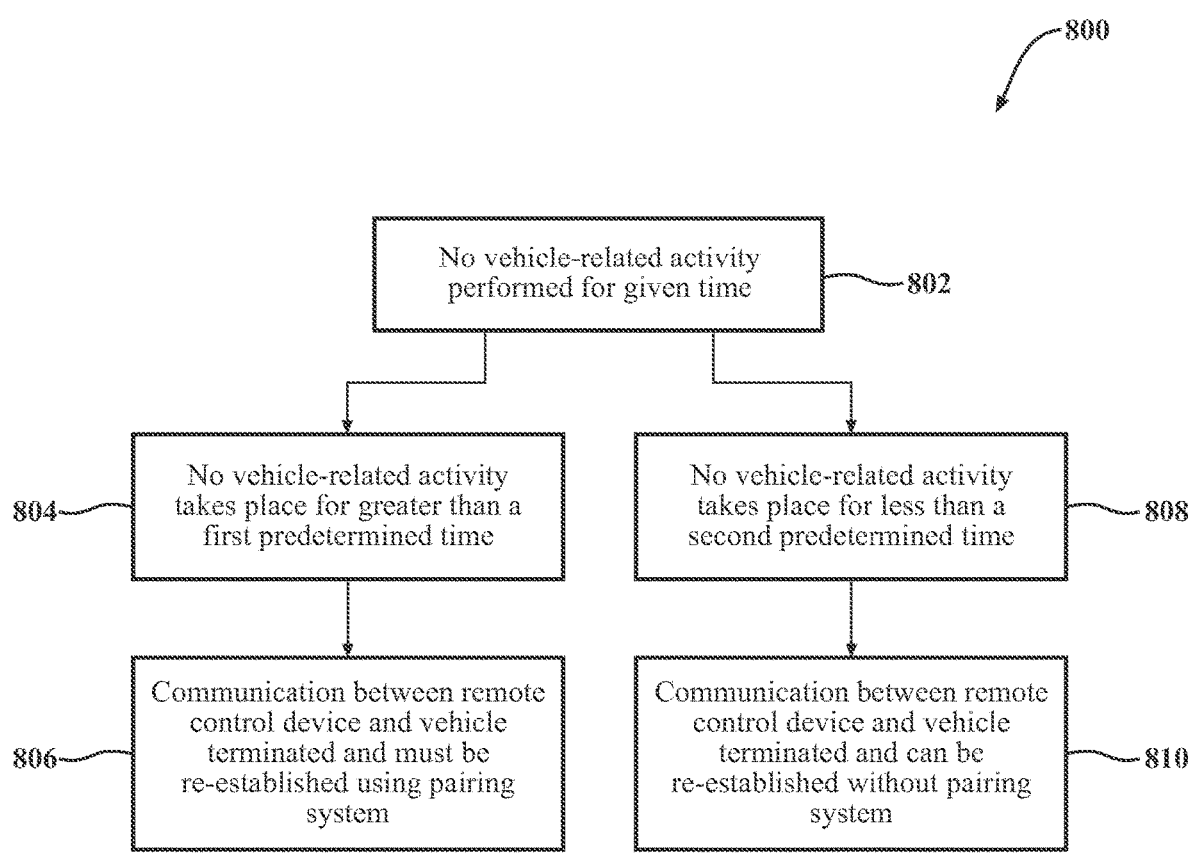
FIG. 20 depicts a method to reestablish communication between a vehicle and a remote-control device according to various aspects of the present invention.

With reference to FIG. 20, an example method 800 is illustrated for reestablishing communication between the remote control device 32 and the vehicle 10 after a period of no vehicle-related activity has been performed. At 802, the controller 103 on the vehicle 10 detects that no vehicle-related activity has been performed for a given period of time after communication between the remote control device 32 and the vehicle 10 has been established. Exemplary vehicle-related activities include driving the vehicle 10 (either manually using the manual controls in the operator's station 20, other manual controls, e.g., on the side of the vehicle 10, or via the remote control device 32), standing on the platform 21, moving or placing an item on the load handling assembly 12, etc. At 804, if no vehicle-related activity takes place for greater than a first predetermined amount of time after communication between the remote control device 32 and the vehicle 10 is established, the communication between the remote control device 32 and the vehicle 10 is terminated and must be re-established using the pairing system 34 at 806, i.e., by inserting the remote control device 32 into the charging station 50 at the vehicle 10. This state of terminated pairing between the vehicle 10 and the remote control device 32 may be indicated, for example, on the touchscreen, by illuminating the LED 424 in a predetermined color, pattern, etc.

At 808, if no vehicle-related activity takes place for less than a second predetermined amount of time after communication between the remote control device 32 and the vehicle 10 is established, the second predetermined amount of time equal to or less than the first predetermined amount of time, the communication between the remote control device 32 and the vehicle 10 is terminated but can be re-established without the pairing system 34, e.g., by performing a confirmation method utilizing the remote control device 32 at 810. The confirmation method may comprise, for example, the operator carrying out a button sequence on the remote control device 32, such as by long-pressing one or more of the buttons 197A-C. This state of pairing between the vehicle 10 and the remote control device 32 may be indicated, for example, on the touchscreen, by illuminating the LED 424 in a predetermined color, pattern, etc.

Figure 21:
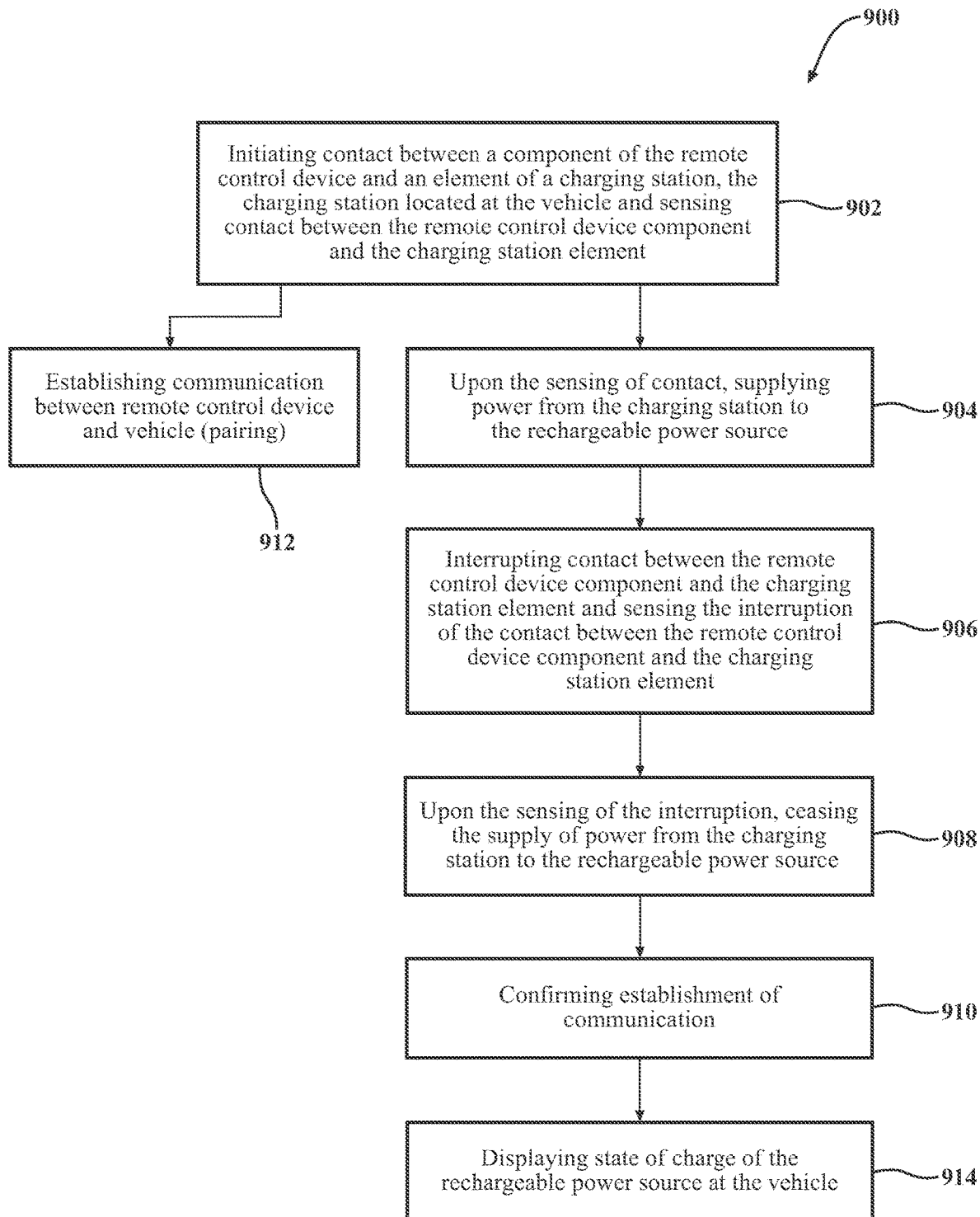
FIG. 21 depicts a method to charge a remote control device according to various aspects of the present invention.

FIG. 21 is a flowchart of an example method 900 for charging a remote control device in accordance with the principles of the present invention. In particular, the remote control device may be the same as or similar to the remote control device 32 discussed herein, and can include a wireless communication system 456 including a wireless transmitter 178 (e.g., capable of one or two-way communication), a rechargeable power source 180, and at least one control (e.g., controls 196A-C) that causes the wireless transmitter 178 to wirelessly transmit a request to a controller of a materials handling vehicle 10.

The method 900 for charging a remote control device 32 begins at 902 by initiating contact between a component of the remote control device 32 and an element of a charging station 50, the charging station 50 located at the vehicle 10, and then sensing contact between the remote control device component and the charging station element. As described above, the remote control device 32 can include one or more charging contacts 210 that are each arranged to engage a corresponding charging element 220 of the charging station 50, such that when they are engaged, a second presence contact 222 or a similar device engages a corresponding first presence contact 212 to detect or sense that the charging contact(s) 210 and charging element(s) 220 are in contact with one another. However, other components of the remote control device 32 and other elements of the charging station 50 may be used to detect/sense the initiation of contact.

Next, at 904, a charging period is started, wherein power is supplied from the charging station 50 to the rechargeable power source 180. As described above, as an example, circuitry of the charging station 50 is configured such that upon the sensing of contact between the charging contact(s) 210 and charging element(s) 220, power is supplied from the charging station 50 to the charging contacts 210 of the remote control device 32 to charge the rechargeable power source 180. Once the rechargeable power source 180 is substantially fully charged (or charged to the desired amount less than a substantially full state of charge), the remote control device 32 can be removed from the charging station 50.

Thus, the method of FIG. 21 continues, at 906, with interrupting contact between the remote control device component and the charging station element, and sensing the interruption of the contact between the remote control device component and the charging station element. As described above, the charging contact(s) 210 of the remote control device 32 and the charging element(s) 220 of the charging station 50 are arranged such that as the two systems are disengaged, that state can be detected or sensed. One example is the second presence contact 222 that can detect when the remote control device 32 is being removed from the charging station 50.

Finally, upon the sensing of this interruption at 906, the charging station 50 can cease the supply of power from the charging station 50 to the rechargeable power source 180 at 908, thus ending the charging period. It is noted that the second presence contact 222 can be located on the remote control device 32 and its disengagement can result in ceasing the supply of power from the charging station 50 to the rechargeable power source 180. The supply of power from the charging station 50 to the rechargeable power source 180 may also be ceased when the rechargeable power source 180 is charged up to the desired amount (either fully charged or charged up to a desired amount less than fully charged), as described herein.

The method 900 can include other optional steps shown in FIG. 21. For example, the method 900 can also include confirming the establishment of communication between the remote control device 32 and the vehicle 10 at 910, e.g., with at least one of an audible or visual queue. The method 900 can further include, while the remote control device component is in contact with the charging station element, establishing communication between the remote control device 32 and the vehicle 10 (e.g., pairing) during a pairing period at 912, such that the controller 103 receives transmissions from the remote control device 32 and is capable of implementing wireless requests from the remote control device 32. This communication between the remote control device 32 and the vehicle 10 can be established concurrently during charging of the rechargeable power source 180 at the charging station 50, such that the pairing period and the charging period overlap. In at least some embodiments the pairing period is less than or equal to the charging period.

Additionally, the method 900 may include, at 914, displaying a state of charge of the rechargeable power source 180 at the vehicle 10, e.g., at the charging station 50, wherein the state of charge of the rechargeable power source 180 may be displayed at the vehicle 10 both when charging the rechargeable power source 180 and during use of the remote control device 32. The state of charge of the rechargeable power source 180 may be displayed, for example, via a series of lights, each light representing a level of a state of charge of the rechargeable power source 180.

Figure 22:
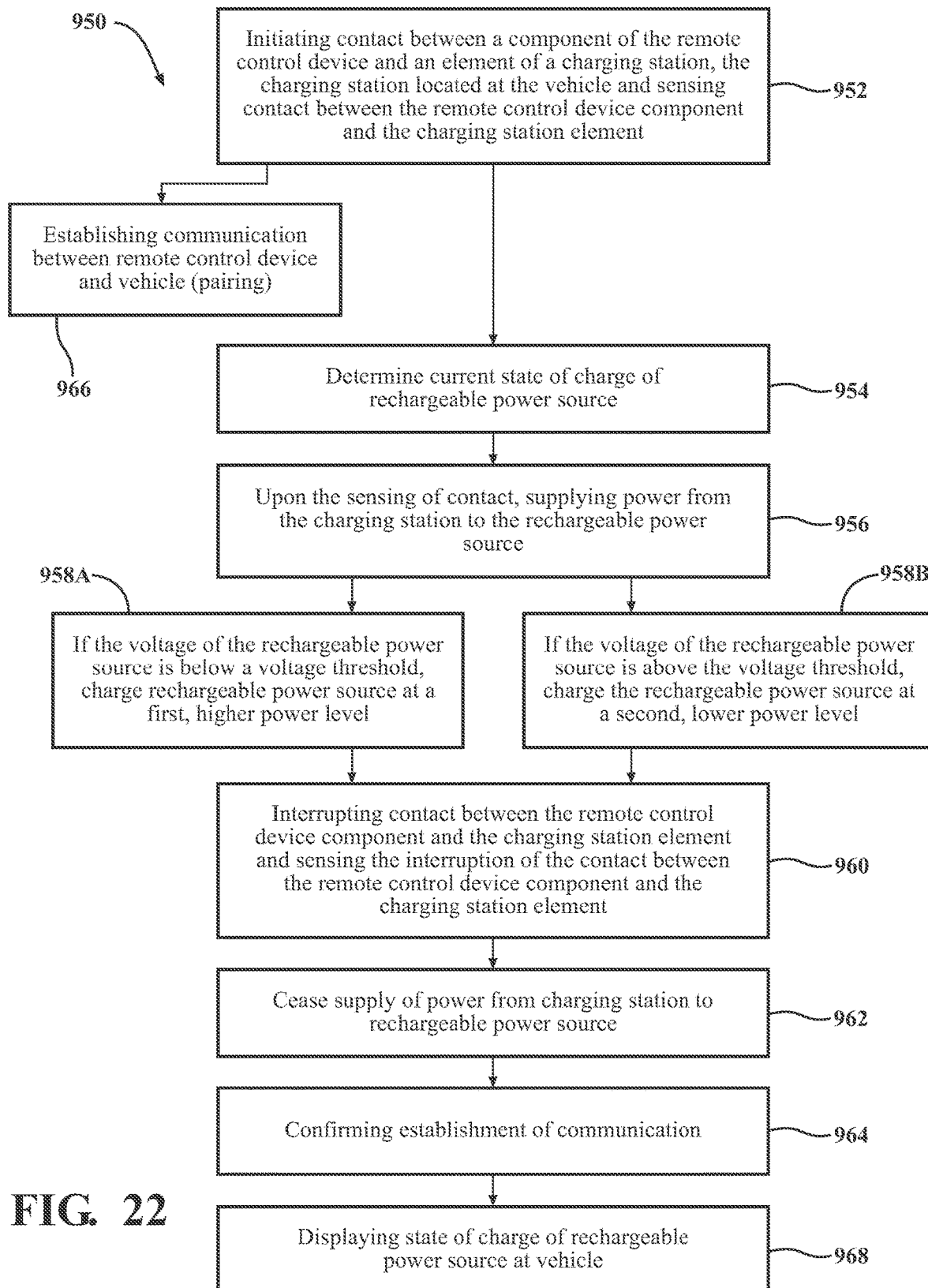
FIG. 22 depicts another method to charge a remote control device according to various aspects of the present invention.

FIG. 22 is a flowchart of another example method 950 for charging a remote control device in accordance with the principles of the present invention, such as the remote control device 32 discussed herein, which comprises a wireless communication system 456 including a wireless transmitter 178 (e.g., capable of one or two-way communication), a rechargeable power source 180, and at least one control (e.g., controls 196A-C) that causes the wireless transmitter 178 to wirelessly transmit a request to a controller of a materials handling vehicle 10. As used herein, the term "control", when used to describe a control of the remote control device 32, is meant to include any structure capable of providing the desired function, including but not limited to buttons, switches, dials, etc.

The method 950 for charging a remote control device 32 begins at 952 by initiating contact between a component of the remote control device 32 and an element of a charging station 50, the charging station 50 located at the vehicle 10, and then sensing contact between the remote control device component and the charging station element. As described above, the remote control device 32 can include one or more charging contacts 210 that are each arranged to engage a corresponding charging element 220 of the charging station 50, such that when they are engaged, a second presence contact 222 or a similar device engages a corresponding presence contact 212 to detect or sense that the charging contact(s) 210 and charging element(s) 220 are in contact with one another. However, other components of the remote control device 32 and other elements of the charging station 50 may be used to detect/sense the initiation of contact.

At 954, the current state of charge of the rechargeable power source 180 is determined. Step 954 can be performed before or after step 952, i.e., the state of charge of the rechargeable power source 180 may be communicated to the charging station 50 both when the remote control device 32 is coupled to the charging station 50, and during use of the remote control device 32 by the operator, as discussed herein.

Based on the current state of charge of the rechargeable power source 180 and after step 952 is performed, at 956, a charging period is started, wherein power is supplied from the charging station 50 to the rechargeable power source 180. In one exemplary embodiment, at step 958A, if the voltage of the rechargeable power source 180 is below a voltage threshold VT, the charging station 50 charges the rechargeable power source 180 at a first, higher power level PL1. According to this embodiment, at step 958B, if the voltage of the rechargeable power source 180 is above the voltage threshold VT, the charging station 50 charges the rechargeable power source 180 at a second, lower power level PL2. The resulting charging period in either case, i.e., at step 958A or step 958B, may be about the same, i.e., charging the rechargeable power source 180 up to the desired amount from above or below the voltage threshold VT may take about the same time. While only two power levels PL1, PL2 associated with a single voltage threshold VT are discussed herein, additional voltage thresholds and power levels could be used, wherein the charging period can always be about the same time, regardless of the charge level of the rechargeable power source 180 when it is inserted into the charging station 50. Additionally, an equation could be used to dynamically set the power level according to the current state of charge of the rechargeable power source 180.

Once the charging period is complete, that is, once the rechargeable power source 180 is charged to the desired amount, i.e., substantially fully charged or charged to an amount less than a substantially full state of charge, e.g., in view of the sensed temperature if that technology is present in the system 8, or if less than a full charge is desired, the remote control device 32 can be removed from the charging station 50.

Thus, the method of FIG. 22 continues, at 960, with interrupting contact between the remote control device component and the charging station element, and sensing the interruption of the contact between the remote control device component and the charging station element. As described above, the charging contact(s) 210 of the remote control device 32 and the charging element(s) 220 of the charging station 50 are arranged such that as the two systems are disengaged, that state can be detected or sensed. One example is the second presence contact 222 that can detect when the remote control device 32 is being removed from the charging station 50.

Finally, upon the sensing of this interruption at 960, or upon the rechargeable power source 180 being charged to the desired amount, the charging station 50 can cease the supply of power from the charging station 50 to the rechargeable power source 180 at 962, thus ending the charging period.

The method 950 can include other optional steps shown in FIG. 22. For example, the method 950 can also include confirming the establishment of communication between the remote control device 32 and vehicle 10 at 964, e.g., with at least one of an audible or visual queue. The method 950 can further include, while the remote control device component is in contact with the charging station element, establishing communication between the remote control device 32 and the vehicle 10 (e.g., pairing) during a pairing period at 966, such that the controller 103 receives transmissions from the remote control device 32 and is capable of implementing wireless requests from the remote control device 32. This communication between the remote control device 32 and the vehicle 10 can be established concurrently during charging of the rechargeable power source 180 at the charging station 50, such that the pairing period and the charging period overlap. In at least some embodiments, the pairing period is less than or equal to the charging period, although the pairing period may be greater than the charging period, as will be discussed in more detail below.

Additionally, the method 950 may include, at 968, displaying a state of charge of the rechargeable power source 180 at the vehicle 10, e.g., at the charging station 50, wherein the state of charge of the rechargeable power source 180 may be displayed at the vehicle 10 both when charging the rechargeable power source 180 and during use of the remote control device 32. The state of charge of the rechargeable power source 180 may be displayed, for example, via a series of lights, each light representing a level of a state of charge of the rechargeable power source 180.

In accordance with an aspect of the invention, the charging period may depend on the capacity of the rechargeable power source 180, the charge rate/power level supplied by the charging station 50, and/or the charge state of the rechargeable power source 180 when it is inserted into the charging station 50. Thus, a desired charging period could be achieved regardless of the current state of charge of the rechargeable power source 180 when the remote control device 32 is placed in the charging station 50. For example, the current state of charge of the rechargeable power source 180 may be known to the vehicle 10, e.g., the state of charge of the rechargeable power source 180 may be communicated to the charging station 50, as discussed herein. The charging station 50 may be instructed, e.g., by the controller 103, to supply power to the rechargeable power source 180 at different rates or levels based on the state of charge of the rechargeable power source 180 when the remote control device 32 is placed in the charging station 50, so that the charging period is generally about the same time regardless of the state of charge of the rechargeable power source 180 when the remote control device 32 is placed in the charging station 50. For example, as discussed above with reference to steps 958A/B of FIG. 22, if the state of charge of the rechargeable power source 180 is a first, lower state of charge, then a first, greater rate/level of power may be supplied from the charging station 50 to the rechargeable power source 180. If the state of charge of the rechargeable power source 180 is a second, higher state of charge, then a second, lesser rate/level of power may be supplied from the charging station 50 to the rechargeable power source 180. The resulting charging period in both cases could be about the same time, e.g., within about 0.5 seconds of the desired charging period. Any number of rechargeable power source states of charge and corresponding rates/levels of power could be implemented such that the time required to charge the rechargeable power 180 is within the desired charging period. Additionally, the usage life of the rechargeable power source 180 may be increased when it is charged at a lower power level. Hence, an additional advantage of a consistent charging period as with the present invention is that the rechargeable power source 180 is sometimes charged at a lower power level, e.g., when the charge state of the rechargeable power source 180 when it is inserted into the charging station 50 is the second, higher state of charge discussed above. Hence, charging the rechargeable power source 180 at different power levels as discussed herein may increase the usage life of the rechargeable power source 180, as opposed to if the rechargeable power source 180 was charged at a consistent, higher power level with each charge.

Additionally, while the pairing period, which is described herein as the time period it takes to establish communication between the remote control device 32 and the vehicle 10, may be less than or equal to the charging period, the charging period may also be less than the pairing period. As one example, it may be determined that the rechargeable power source 180 does not need to be fully charged in order to operate for a desired use period. For example, a full charge of the rechargeable power source 180 may provide an operation time that is greater than a desired use period (e.g., an operator's shift), such that the rechargeable power source 180 does not need to be fully charged in order to be operable for the desired use period. In this case, the charging station 50 may be programmed to charge the rechargeable power source 180 up to a less than full state of charge, which would still be sufficient for the remote control device to be operable for the entire desired use period. The time it takes to charge rechargeable power source 180 up to this less than full state of charge may be less than the pairing period. Other situations may also occur where the charging period may be less than the pairing period.

Figure 23:
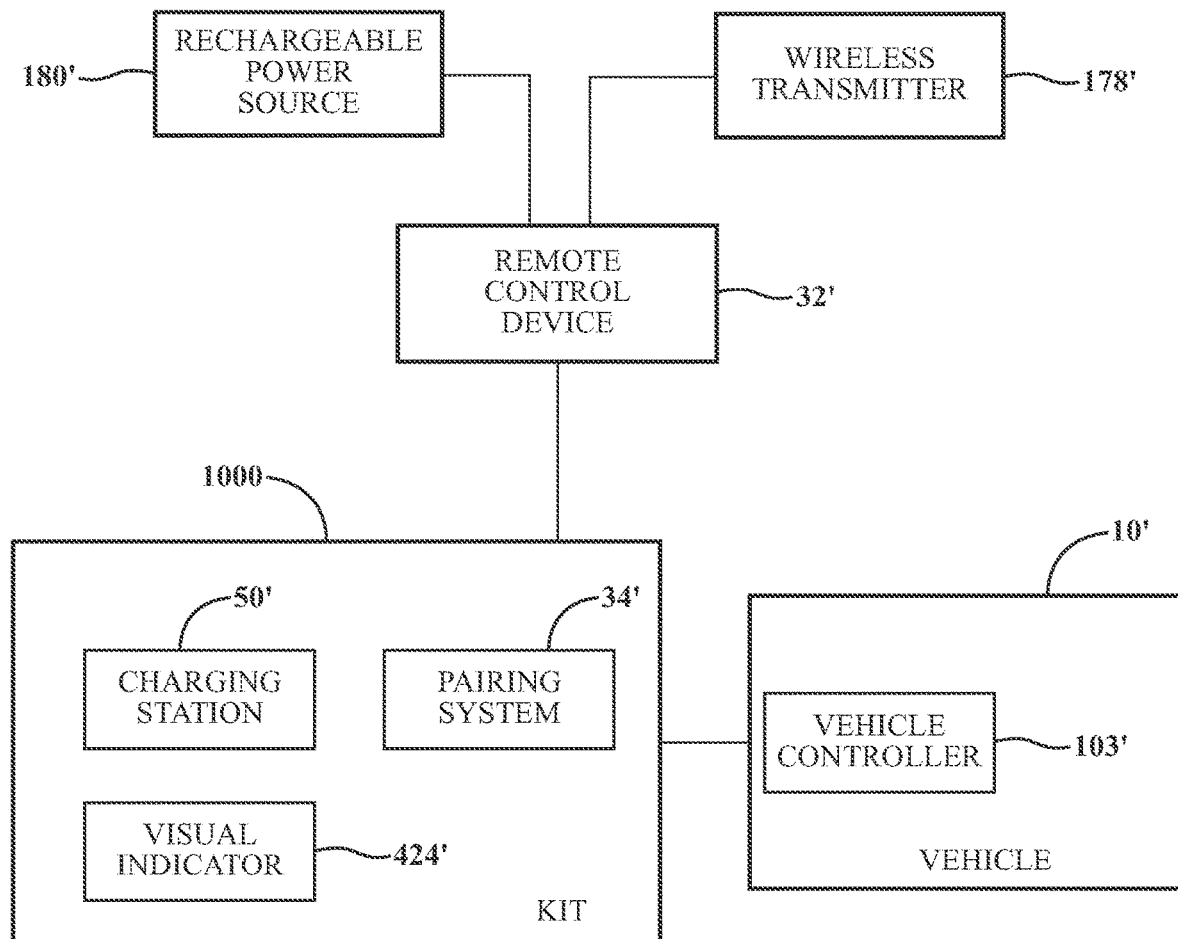
FIG. 23 is a schematic diagram of several components of a kit according to various aspects of the present invention.

With reference to FIG. 23, the principles of the present invention can also be implemented as a kit 1000 for retrofitting to a materials handling vehicle 10'. In FIG. 23, elements similar to or identical to those described above with reference to FIGS. 1-22 include the same reference number followed by a prime symbol ('). An element described with respect to FIG. 23 but not specifically shown in FIG. 23 are equivalent to the element having the same reference symbol as described above, but without the prime symbol.

The vehicle 10' can include a vehicle controller 103' that is responsive to wireless requests from an associated remote control device 32' that is used by an operator interacting with the vehicle 10' similar to those types of vehicles 10 and remote control devices 32 described above. An example kit 1000 would include a charging station 50' at the vehicle 10', the charging station 50' for charging a rechargeable power source 180' of the remote control device 32', wherein the charging station 50' is electrically coupled to a vehicle power source, and a receiver 102' such as a BLE radio communicably coupled to the controller 103' of the vehicle 10'. In particular, the charging station 50' is configured such that the rechargeable power source 180' is charged up to a desired amount (a full charge or less than full charge as discussed herein) at the charging station 50' within a desired charging period.

The kit 1000 may further include a pairing system 34' for establishing communication between the remote control device 32' and the vehicle 10', such that the controller 103' is capable of implementing wireless requests from the remote control device 32'. The pairing system 34' may, for example, be similar to pairing system 34 and can implement the pairing algorithm(s) detailed in FIG. 17 and/or FIG. 18. Thus, the kit 1000 can also include a pairing indicator, e.g., visual indicator 424', that confirms the establishment of communication between the remote control device 32' and the vehicle 10'. Furthermore, the pairing system 34' can be configured such that the pairing period (a time period that it takes to establish communication between the remote control device 32' and the vehicle 10') may be less than or equal to the charging period (a time period it takes to charge the rechargeable power source 180' to the desired amount). The pairing period may also be greater than the charging period. The pairing system 34' may be incorporated into the charging station 50' or may be a separate element.

It is contemplated that communication between the remote control device 32' and the vehicle 10' is established concurrently during charging of the rechargeable power source 180' at the charging station 50', i.e., the pairing period and the charging period may overlap. Furthermore, in some embodiments, communication between the remote control device 32' and the vehicle 10', and charging of the rechargeable power source 180' at the charging station 50' are initiated with a single action. For example, the single action can comprise physically contacting a component of the remote control device, for example, one or more charging contacts 210 as described above, with an element of the charging station, for example, one or more corresponding charging elements 220 as described above.

The remote control device 32' used in combination with the kit 1000 may be the same as the remote control devices 32 disclosed herein. Hence, a remote control device manufactured for use with a vehicle 10 including an integrated charging station 50 and related components could also be used with a kit 1000 for use with an existing vehicle 10'.

As described above with respect to the charging station 50, the charging station 50' of the kit 1000 can also include guide structure 420' to align the remote control device 32' in the proper orientation for charging the rechargeable power source 180'.

The kit 1000 can also include an indicator (e.g., LEDs 404', light, or similar structure) configurable to be attachable at the vehicle 10' for indicating a state of charge of the rechargeable power source 180'. The indicator can indicate the state of charge of the rechargeable power source 180' both when charging the rechargeable power source 180' at the charging station 50' and during use of the remote control device 32'. In some embodiments, the indicator comprises a series of lights, each light representing a level of the state of charge of the rechargeable power source 180'.

The kit 1000 includes at least one charging element 220' on the charging station 50' that engages at least one corresponding charging contact 210' of the remote control device 32'. Furthermore, at least one of the remote control device 32' or the charging station 50' includes a presence contact 212' or 222' that detects whether or not at least one corresponding charging contact 210' and at least one charging element 220' are correctly engaged with one another. If a correct engagement is detected, the transfer of power to the rechargeable power source 180' of the remote control device 32' is enabled by the charging station 50', and if a correct engagement is not detected, the transfer of power to the rechargeable power source 180' is not enabled by the charging station 50'. In at least some embodiments, the remote control device 32' comprises at least two charging contacts 210' or at least four charging contacts 210' that are positioned to engage corresponding charging elements 220' on the charging station 50'.

The arrangement of the remote control device 32' and the charging station 50' of the kit 1000 is configured such that the presence contact 212' or 222' indicates the removal of the remote control device 32' from the charging station 50', which ceases the transfer of power to the rechargeable power source 180' from the charging station 50', before the at least one charging contact 210' is disengaged from the at least one corresponding charging element 220'. Hence, the transfer of power from the charging station 50' to the rechargeable power source 180' is ceased before the at least one charging contact 210' is disengaged from the at least one corresponding charging element 220'.

The kit 1000 may also utilize contactless, or induction, charging in which the rechargeable power source 180' of the remote control device 32' can be charged by being in close proximity to, or on the surface of, a compatible induction charging station (not shown). Such an induction charging station may be located, for example, in a driving or steering control of the vehicle 10' such that the rechargeable power source 180' may be charged while the operator is manually driving the vehicle 10' from the operator's station 20'. The kit 1000 according to this aspect of the invention may be at least partially located in the vehicle steering control or other vehicle component that facilitates the contactless/induction charging of rechargeable power source 180', e.g., the rechargeable power source 180' may be charged by the operator grasping the driving/steering control.

The kit 1000 may utilize any of the other features and/or functions of the remote control device 32' and the charging station 50' described above for FIGS. 1-22. It is noted that if the vehicle 10' to be used with the kit 1000 was previously set up for interacting with a wireless remote control device, the controller logic in the vehicle controller 103' may need to be updated to be used with the kit 1000, and a receiver that was already provided at the vehicle 10', i.e., for receiving wireless requests from a remote control device that was used with the vehicle 10' before the kit 1000 was installed on the vehicle 10', may be turned off in lieu of the receiver 102' of the kit 1000, i.e., for use with the remote control device 32' associated with the kit 1000.

Figure 24:
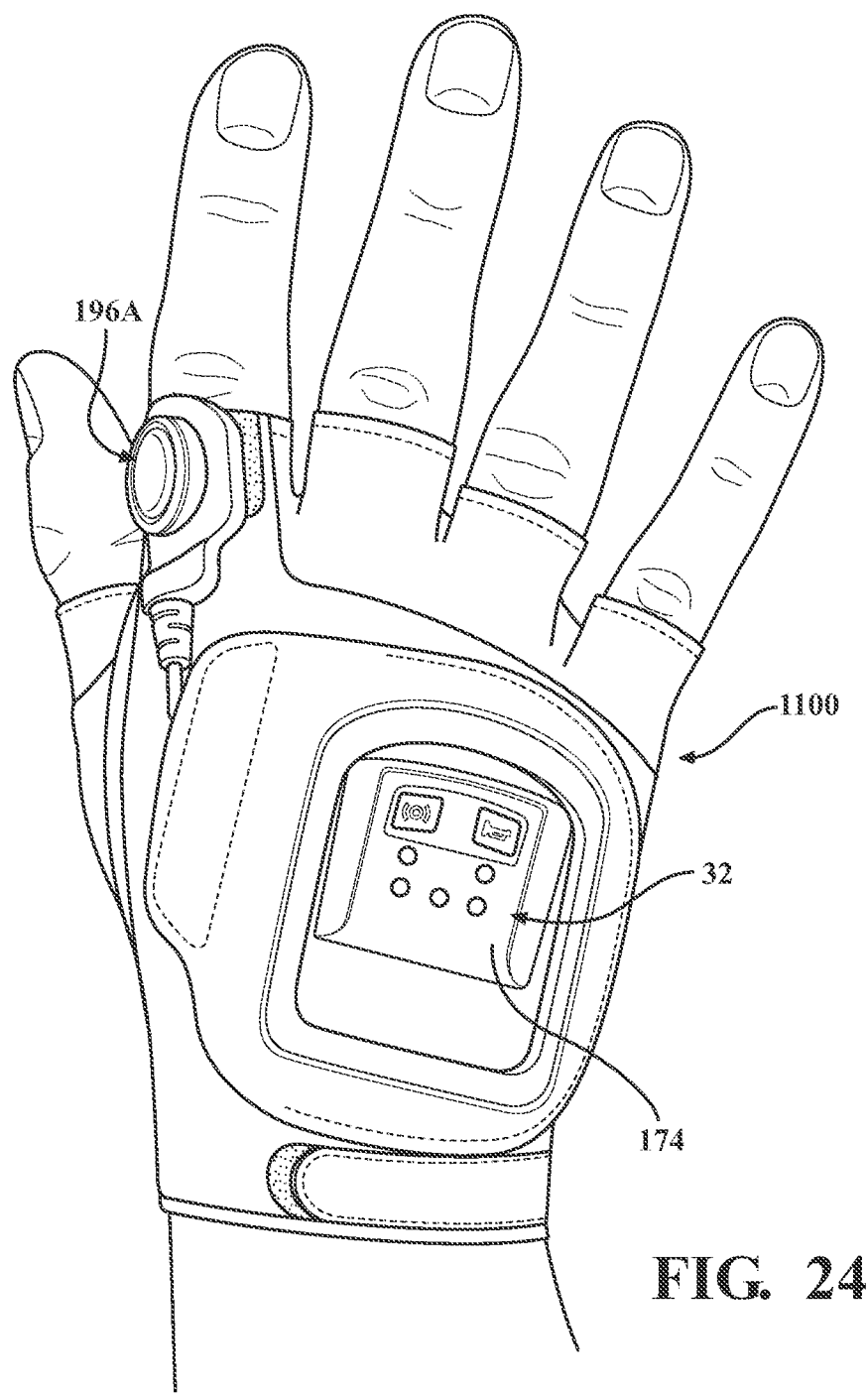
FIG. 24 is a view of another remote control device according to various aspects of the present invention.

With reference now to FIG. 24, a remote control device 32 in accordance with an embodiment of the invention may be incorporated into a glove garment 1100. The use of the glove garment 1100 eliminates the need for the holding strap 190, and the first control 196A may be provided on a finger of the glove garment 1100 as opposed to being a part of the upper housing 174, but the remaining components of the remote control device 32 illustrated in FIG. 24 may be the same or similar to those of the remote control device 32 of FIGS. 4-7, including a shape of the portion of the upper housing 174 that engages with the charging station 50 at the vehicle 10. Hence, the charging station 50 at the vehicle 10 may be the same as the charging station 50 described above, i.e., since the charging station-engaging portion of the upper housing 174 of the remote control device 32 incorporated into the glove garment 1100 can have the same dimensions as the charging station-engaging portion of the upper housing 174 of the remote control device 32 in the embodiment of FIGS. 4-7, the same charging station 50 could be used with either the finger-mounted remote control device 32 of FIGS. 4-7, or the remote control device 32 incorporated into the glove garment 1100 of FIG. 24.

If the remote control device 32 incorporated into the glove garment 1100 were used in combination with the inductive charging technology disclosed herein, inductive charging structures may be incorporated, for example, into the palm of the glove garment 1100. Such charging structures in the glove garment 1100 could be used with charging elements incorporated, for example, into a steering control of a vehicle paired to the remote control device 32, in which case a rechargeable power source of the remote control device 32 could be charged while the operator is grasping the steering control.

According to additional aspects of the present invention, there may be conditions and/or events that cause the vehicle 10 to become unpaired from the remote control device 32, wherein a complete pairing process utilizing the pairing system 34, as described herein, may be required to re-pair the vehicle 10 with the remote control device 32. There may be other conditions or events that cause the vehicle 10 to become unpaired from the remote control device 32, wherein something other than a complete pairing process utilizing the pairing system 34, as described herein, may be required to re-pair the vehicle 10 with the remote control device 32. Several exemplary use cases with regard to unpairing and re-pairing will now be described.

A first exemplary use case may occur by powering down the vehicle 10. According to this first use case, the remote control device 32 is unpaired from the controller 103 and requires a complete pairing process utilizing the pairing system 34, as described herein, to re-pair the vehicle 10 with the remote control device 32. In accordance with this exemplary first use case, a complete pairing process utilizing the pairing system 34 may be required to re-pair the remote control device 32 to the vehicle 10 whenever the vehicle 10 is powered down.

A second exemplary use case may be substantially as described above with respect to FIG. 19, wherein the vehicle operator temporarily leaves the vehicle 10, e.g., to take a break. The details of this second exemplary use case are discussed above with reference to FIG. 17 and will not be repeated again.

Third and fourth exemplary use cases may occur if no vehicle-related activity takes place for greater than a first predetermined amount of time after communication between the remote control device 32 and the vehicle 10 is established (third use case) or if no vehicle-related activity takes place for less than a second predetermined amount of time after communication between the remote control device 32 and the vehicle 10 is established (fourth use case). The details of these third and fourth exemplary use cases are discussed above with reference to FIG. 20 and will not be repeated again.

A number of exemplary use cases may arise where multiple remote control devices 32 and/or multiple vehicles 10 are concerned. In a fifth exemplary use case, assume a first remote control device 32 is currently paired with a first vehicle 10, and a second remote control device 32 is currently paired with a second vehicle 10. In this fifth use case, the first remote control device 32 is inserted into the charging station 50 of the second vehicle 10. Under this circumstance, the charging station 50 of the second vehicle 10 may charge the rechargeable power source 180 of the first remote control device 32, the first remote control device 32 may become unpaired from the first vehicle 10, and the second remote control device 32 may become unpaired from the second vehicle 10. The first remote control device 32 will not be paired to the second vehicle 10 in the fifth use case.

In a sixth exemplary use case and with reference to FIG. 24, assume a remote control device 32 is currently paired with a first vehicle 10A such that the remote control device 32 wirelessly communicates with the first vehicle 10A, and a second vehicle 10B is not currently paired with a remote control device. In this sixth use case, the remote control device 32 is paired with the second vehicle 10B using a pairing process, for example, by inserting the remote control device 32 into the charging station 50 of the second vehicle 10B. Using this pairing process, the charging station 50 of the second vehicle 10B may charge the rechargeable power source 180 of the remote control device 32, and the remote control device 32 may become paired with the second vehicle 10B such that the remote control device wirelessly communicates with the second vehicle 10B. This pairing process may also cause the remote control device to become unpaired from the first vehicle 10A, such that the remote control device no longer wirelessly communicates with the first vehicle 10A. Once the remote control device 32 is paired with the second vehicle 10B and unpaired from the first vehicle 10A, the second vehicle 10B may respond to remote requests from the remote control device 32, while the first vehicle 10A may no longer respond to remote requests from the remote control device 32.

As described above, the wireless communication system 456 of the remote control device 32 and/or the BLE radio 402 of the charging station 50 can be configured, for example, to enter a low power mode when the remote control device 32 is being paired to the second vehicle 10B and/or the rechargeable power source 180 of the remote control device 32 is being charged at the charging station 50, e.g., to ensure that only a remote control device 32 that is within a minimum distance, corresponding to the signal strength of the communications received from the remote control device 32, from the charging station 50 is recognized as the remote control device 32 for the second vehicle 10B to pair with.

According to the sixth exemplary use case, prior to the pairing process, the second vehicle 10B may be sent, e.g., by a Warehouse Management System WMS in communication with the second vehicle 10B, to a designated location, such as, for example, the location of the operator, the location of the first vehicle 10A, the end of an aisle in which the operator and/or first vehicle 10A are located, a designated waiting area, etc. The second vehicle 10B may be an unloaded vehicle, i.e., free from a load and thus ready to carry items to be picked by the operator. The second vehicle 10B may be instructed to move to the designated location by the Warehouse Management System WMS, for example, when the first vehicle 10A is loaded with a desired amount of pick items and is ready to be sent to a different location, i.e., a location that is different than the current location of the vehicle 10, such as a loading dock LD or other location where the pick items on the first vehicle 10A are to be sent. The operator may also request that the second vehicle 10B be sent to the designated location, for example, using a control on the first vehicle 10A, over a headset, etc. Once the second vehicle 10B is paired to the remote control device 32, the second vehicle 10B may no longer implement commands from the Warehouse Management System WMS, such that the second vehicle 10B will only implement wireless commands from the remote control device 32 with which it is paired.

Once the remote control device 32 is unpaired from the first vehicle 10A, the Warehouse Management System WMS may send instructions to the first vehicle 10A to move to the loading dock LD and/or to another location, such as a vehicle charging station (not shown). Using this sixth exemplary use case, an operator may quickly switch between vehicles 10A, 10B, resulting in an increase in work productivity and efficiency.

In a seventh exemplary use case, assume a first remote control device 32 is currently paired with a vehicle 10, and a second remote control device 32 is not paired with a vehicle. In this seventh use case, the second remote control device 32 is inserted into the charging station 50 of the vehicle 10. Under this circumstance, the charging station 50 of the vehicle 10 may charge the rechargeable power source 180 of the second remote control device 32, the first remote control device 32 may become unpaired from the vehicle 10, and the second remote control device 32 will not be paired to the vehicle 10.

In an eighth exemplary use case, the remote control device 32 is moved out of range of the vehicle 10, i.e., such that the wireless transmitter 178 is no longer able to communicate with the receiver 102 for a predetermined time period. According to the eighth use case, the remote control device 32 may become unpaired from the vehicle 10. According to the eighth use case, if the remote control device 32 moves back into range of the vehicle 10 after a predetermined time period, the vehicle 10 may need to be shut down and restarted to pair with a remote control device 32 utilizing the pairing system 34, including pairing with the previously-paired remote control device 32, or a different remote control device 32. If the remote control device 32 moves back into range of the vehicle 10 within the predetermined time period, the vehicle 10 may not need to be shut down and restarted to pair with the previously paired remote control device 32, e.g., the previously paired remote control device 32 may be re-paired with the vehicle 10 by inserting the remote control device 32 into the charging station 50 of the vehicle. Pairing the vehicle 10 to a different remote control device 32 may require a vehicle shut down and restart, regardless of how long the previously paired remote control device 32 was out of range of the vehicle 10.

Additional exemplary use cases concerning pairing and/or charging periods will now be described.

In a ninth exemplary use case, a desired charge state, e.g., a substantially full charge state, of the rechargeable power source 180 can be achieved by charging the rechargeable power source 180 at the charging station 50 in five seconds or less. According to this use case, the substantially full charge state of the rechargeable power source 180 may yield a use period of the remote control device 32 of at least eight hours.

In a tenth exemplary use case, the charging station 50 varies the power level supplied to the rechargeable power source 180 depending on the state of charge of the rechargeable power source 180 when the remote control device 32 is inserted into the charging station 50, as described herein with respect to FIG. 22. A charging period according to the tenth use case will always be about four seconds, regardless of the state of charge of the rechargeable power source 180 when the remote control device 32 is inserted into the charging station 50. Hence, a predictable charging period is achieved.

It is noted that the type of transmissions sent by the remote control device 32 to the vehicle 10, e.g., requests, such as travel requests, may be other types of transmissions. As one example, the transmissions may comprise location-based transmissions that inform the controller 103 of the vehicle 10 where the remote control device 32 is located relative to the vehicle 10. These type of location transmissions may be used by the controller 103, e.g., to follow the remote control device 32. Hence, the vehicle 10 may follow an operator wearing, holding, or carrying the remote control device 32. Such a remote control device 32 could be charged by the charging station 50 and paired to the vehicle 10 as described herein.

In accordance with another aspect of the present invention, charging of the rechargeable power source 180 by the charging station 50 may be disabled while the vehicle 10 is in motion. This aspect of the invention may not apply to inductive charging of the rechargeable power source 180.

Furthermore, when an operator is attempting to pair a remote control device 32 to a vehicle 10 that is in communication with the Warehouse Management System WMS, the Warehouse Management System WMS can determine if one or more remote control device operational checks have been performed within a predetermined time period, for example, within the last 12 hours. Such operational checks may include, for example, checks to ensure the operability of controls of the remote control device 32, such as the horn and/or brake buttons 197B, 197C. If such operational check(s) have not been performed within the predetermined time period, the vehicle 10 may communicate to the operator that operational check(s) must be performed prior to the remote control device 32 being pairable with the vehicle 10, i.e., the remote control device 32 is only allowed to pair with the vehicle 10 if the one or more remote control device operational checks have been performed within the predetermined time period. The operational checks may be performed by the operator implementing the controls, e.g., by holding down the horn and/or brake buttons 197B, 197C.

Additionally, when an operator is attempting to pair a remote control device 32 to a vehicle 10 that is in communication with the Warehouse Management System WMS, the Warehouse Management System WMS can determine if the operator is authorized to operate the vehicle 10 that the operator is attempting to pair to the remote control device 32. For example, vehicles that are to be used only in a certain location, such as in a freezer, may only be pairable with remote control devices 32 where the operator will use the vehicle in that location. As another example, operators may be limited to operating certain vehicles. Remote control devices 32 in these situations may only be authorized to pair with such vehicles when these condition(s) are met.

In accordance with an aspect of the invention, the charge life of the rechargeable power source 180 over a given operating cycle may be increased by turning off or reducing the power consumption of one or more components of the remote control device 32, e.g., the components of the wireless communication system 456 including the wireless transmitter 178, when an operator is determined to be standing on the platform 21 of the vehicle 10, e.g., as detected by the presence sensors 22.

The terms "pairing" and "synchronizing" (as used herein and in the various patents and published patent applications incorporated by reference herein) are used interchangeably herein to describe a secure process whereby a wireless remote control device and vehicle controller identify each other as valid command and response devices.

Having thus described the invention of the present application in detail and by reference to embodiments thereof, it will be apparent that modifications and variations are possible without departing from the scope of the invention defined in the appended claims.

What is claimed is:

1. A system comprising:
   a materials handling vehicle;
   a remote control device comprising:
      a wireless communication system including a wireless transmitter; and
      a rechargeable power source;
   a receiver at the vehicle for receiving transmissions from the wireless transmitter;
   a controller at the vehicle that is communicably coupled to the receiver, the controller being responsive to receipt of the transmissions from the remote control device;
   a charging station at the vehicle, the charging station for charging the rechargeable power source of the remote control device; and
   an indicator at the vehicle for indicating a state of charge of the rechargeable power source, wherein the indicator indicates the state of charge of the rechargeable power source both when charging the rechargeable power source at the charging station and during use of the remote control device.

2. The system according to claim 1, wherein the rechargeable power source is a super capacitor.

3. The system according to claim 1, further comprising a pairing system for establishing communication between the remote control device and the vehicle.

4. The system according to claim 3, wherein communication between the remote control device and the vehicle is established concurrently during charging of the rechargeable power source at the charging station.

5. The system according to claim 3, wherein communication between the remote control device and the vehicle, and charging of the rechargeable power source at the charging station are initiated with a single action.

6. The system according to claim 5, wherein the single action comprises physically contacting a component of the remote control device with an element of the charging station.

7. The system according to claim 3, further comprising a pairing indicator that confirms the establishment of communication between the remote control device and the vehicle.

8. The system according to claim 3, wherein if no vehicle-related activity takes place for greater than a first predetermined amount of time after communication between the remote control device and the vehicle is established, the communication between the remote control device and the vehicle is terminated and must be re-established using a pairing system.

9. The system according to claim 8, wherein if no vehicle-related activity takes place for less than a second predetermined amount of time after the communication between the remote control device and the vehicle is established, the second predetermined amount of time equal to or less than the first predetermined amount of time, the communication between the remote control device and the vehicle is terminated but can be re-established, without requiring the pairing system, by performing a confirmation method utilizing the remote control device.

10. The system according to claim 9, wherein the confirmation method comprises carrying out a button sequence on the remote control device.

11. The system according to claim 1, wherein a substantially full charge state of the rechargeable power source is achieved by charging the rechargeable power source at the charging station in five seconds or less, and wherein the substantially full charge state of the rechargeable power source yields a use period of the remote control device of at least two hours.

12. The system according to claim 1, wherein the remote control device comprises at least one charging contact that engages at least one corresponding charging element on the charging station.

13. The system according to claim 12, wherein at least one of the remote control device or the charging station includes a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station.

14. The system according to claim 13, wherein the arrangement of the remote control device and the charging station is configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element.

15. The system according to claim 1, wherein the rechargeable power source is discharged to a high temperature state of charge if a sensed temperature is determined to be above a predetermined setpoint temperature, the sensed temperature being:
an ambient temperature; or
a temperature of the rechargeable power source.

16. The system according to claim 1, wherein the rechargeable power source is charged at the charging station to a predetermined charge level less than a 100% charge level if a sensed temperature is determined to be above a predetermined threshold temperature.

17. The system according to claim 1, wherein the charging station is located on a side portion of the vehicle.

18. The system according to claim 1, wherein the wireless communication system enters a low power mode when the rechargeable power source of the remote control device is being charged at the charging station.

19. The system according to claim 1, wherein one or more components of the remote control device are turned off or the power supplied thereto is reduced when an operator is positioned on the vehicle.

20. The system according to claim 1, wherein:
if the voltage of the rechargeable power source is below a voltage threshold before being charged by the charging station, the charging station charges the rechargeable power source at a first power level;
if the voltage of the rechargeable power source is above the voltage threshold before being charged by the charging station, the charging station charges the rechargeable power source at a second power level; and
the first power level is greater than the second power level.

21. The system according to claim 20, wherein the charging station charges the rechargeable power source to a substantially full charge state in about the same time regardless of whether the voltage of the rechargeable power source is above or below the voltage threshold before being charged by the charging station.

22. The system according to claim 1, wherein the remote control device includes at least one control communicably coupled to the wireless communication system, wherein actuation of the control causes the wireless transmitter to wirelessly transmit a request to the vehicle.

23. A system comprising:
a materials handling vehicle;
a remote control device comprising:
a wireless communication system including a wireless transmitter;
a rechargeable power source; and
at least one charging contact;
a receiver at the vehicle for receiving transmissions from the wireless transmitter;
a controller at the vehicle that is communicably coupled to the receiver, the controller being responsive to receipt of the transmissions from the remote control device; and a charging station at the vehicle, the charging station for charging the rechargeable power source of the remote control device and including at least one charging element that is adapted to be engaged by the at least one charging contact of the remote control;
wherein at least one of the remote control device or the charging station includes a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station.

24. The system according to claim 23, wherein the rechargeable power source is a super capacitor.

25. The system according to claim 23, further comprising a pairing system for establishing communication between the remote control device and the vehicle.

26. The system according to claim 25, wherein communication between the remote control device and the vehicle is established concurrently during charging of the rechargeable power source at the charging station.

27. The system according to claim 25, wherein communication between the remote control device and the vehicle, and charging of the rechargeable power source at the charging station are initiated with a single action.

28. The system according to claim 27, wherein the single action comprises physically contacting a component of the remote control device with an element of the charging station.

29. The system according to claim 25, further comprising a pairing indicator that confirms the establishment of communication between the remote control device and the vehicle.

30. The system according to claim 25, wherein:
if no vehicle-related activity takes place for greater than a first predetermined amount of time after communication between the remote control device and the vehicle is established, the communication between the remote control device and the vehicle is terminated and must be re-established using a pairing system; and
if no vehicle-related activity takes place for less than a second predetermined amount of time after the communication between the remote control device and the vehicle is established, the second predetermined amount of time equal to or less than the first predetermined amount of time, the communication between the remote control device and the vehicle is terminated but can be re-established, without requiring the pairing system, by performing a confirmation method utilizing the remote control device.

31. The system according to claim 23, wherein the arrangement of the remote control device and the charging station is configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element.

32. The system according to claim 23, wherein the rechargeable power source is discharged to a high temperature state of charge if a sensed temperature is determined to be above a predetermined setpoint temperature, the sensed temperature being:
an ambient temperature; or
a temperature of the rechargeable power source.

33. The system according to claim 23, wherein the rechargeable power source is charged at the charging station to a predetermined charge level less than a 100% charge level if a sensed temperature is determined to be above a predetermined threshold temperature.

34. The system according to claim 23, wherein the wireless communication system enters a low power mode when the rechargeable power source of the remote control device is being charged at the charging station.

35. The system according to claim 23, wherein one or more components of the remote control device are turned off or the power supplied thereto is reduced when an operator is positioned on the vehicle.

36. The system according to claim 23, wherein:
if the voltage of the rechargeable power source is below a voltage threshold before being charged by the charging station, the charging station charges the rechargeable power source at a first power level;
if the voltage of the rechargeable power source is above the voltage threshold before being charged by the charging station, the charging station charges the rechargeable power source at a second power level; and
the first power level is greater than the second power level.

37. A system comprising:
a materials handling vehicle;
a remote control device comprising:
a wireless communication system including a wireless transmitter; and
a rechargeable power source;
a receiver at the vehicle for receiving transmissions from the wireless transmitter;
a controller at the vehicle that is communicably coupled to the receiver, the controller being responsive to receipt of the transmissions from the remote control device; and
a charging station at the vehicle, the charging station for charging the rechargeable power source of the remote control device;
wherein the wireless communication system enters a low power mode when the rechargeable power source of the remote control device is being charged at the charging station.

38. The system according to claim 37, wherein the rechargeable power source is a super capacitor.

39. The system according to claim 37, further comprising a pairing system for establishing communication between the remote control device and the vehicle.

40. The system according to claim 39, wherein communication between the remote control device and the vehicle is established concurrently during charging of the rechargeable power source at the charging station.

41. The system according to claim 39, wherein:
if no vehicle-related activity takes place for greater than a first predetermined amount of time after communication between the remote control device and the vehicle is established, the communication between the remote control device and the vehicle is terminated and must be re-established using a pairing system; and
if no vehicle-related activity takes place for less than a second predetermined amount of time after the communication between the remote control device and the vehicle is established, the second predetermined amount of time equal to or less than the first predetermined amount of time, the communication between the remote control device and the vehicle is terminated but can be re-established, without requiring the pairing system, by performing a confirmation method utilizing the remote control device.

42. The system according to claim 37, wherein:
the remote control device comprises at least one charging contact that engages at least one corresponding charging element on the charging station;
at least one of the remote control device or the charging station includes a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station; and
the arrangement of the remote control device and the charging station is configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element.

43. A system comprising:
a materials handling vehicle;
a remote control device comprising:
a wireless communication system including a wireless transmitter; and
a rechargeable power source;
a receiver at the vehicle for receiving transmissions from the wireless transmitter;
a controller at the vehicle that is communicably coupled to the receiver, the controller being responsive to receipt of the transmissions from the remote control device; and
a charging station at the vehicle, the charging station for charging the rechargeable power source of the remote control device;
wherein one or more components of the remote control device are turned off or the power supplied thereto is reduced when an operator is positioned on the vehicle.

44. The system according to claim 43, wherein the rechargeable power source is a super capacitor.

45. The system according to claim 43, further comprising a pairing system for establishing communication between the remote control device and the vehicle.

46. The system according to claim 45, wherein communication between the remote control device and the vehicle is established concurrently during charging of the rechargeable power source at the charging station.

47. The system according to claim 45, wherein:
if no vehicle-related activity takes place for greater than a first predetermined amount of time after communication between the remote control device and the vehicle is established, the communication between the remote control device and the vehicle is terminated and must be re-established using a pairing system; and if no vehicle-related activity takes place for less than a second predetermined amount of time after the communication between the remote control device and the vehicle is established, the second predetermined amount of time equal to or less than the first predetermined amount of time, the communication between the remote control device and the vehicle is terminated but can be re-established, without requiring the pairing system, by performing a confirmation method utilizing the remote control device.

48. The system according to claim 43, wherein:

the remote control device comprises at least one charging contact that engages at least one corresponding charging element on the charging station;

at least one of the remote control device or the charging station includes a presence contact that detects whether or not the at least one charging contact is correctly engaged with the at least one corresponding charging element for charging the rechargeable power source, wherein if a correct engagement is detected, the transfer of power to the rechargeable power source is enabled by the charging station, and if a correct engagement is not detected, the transfer of power to the rechargeable power source is not enabled by the charging station; and the arrangement of the remote control device and the charging station is configured such that the presence contact indicates removal of the remote control device from the charging station, which ceases the transfer of power to the rechargeable power source from the charging station, before the at least one charging contact is disengaged from the at least one corresponding charging element, such that the transfer of power from the charging station to the rechargeable power source is ceased before the at least one charging contact is disengaged from the at least one corresponding charging element.

49. The system according to claim 43, wherein the wireless communication system enters a low power mode when the rechargeable power source of the remote control device is being charged at the charging station.

* * * * *